US012632634B2

(12) United States Patent
Sreenivasan et al.

(10) Patent No.: US 12,632,634 B2
(45) Date of Patent: May 19, 2026

(54) NANOFABRICATION AND DESIGN TECHNIQUES FOR 3D ICS AND CONFIGURABLE ASICS

(71) Applicant: Board of Regents, The University of Texas System, Austin, TX (US)

(72) Inventors: Sidlgata V. Sreenivasan, Austin, TX (US); Paras Ajay, Austin, TX (US); Aseem Sayal, Austin, TX (US); Mark McDermott, Austin, TX (US); Jaydeep Kulkarni, Austin, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 197 days.

(21) Appl. No.: 18/081,165

(22) Filed: Dec. 14, 2022

(65) Prior Publication Data

US 2023/0118578 A1 Apr. 20, 2023

Related U.S. Application Data

(63) Continuation of application No. 17/273,713, filed as application No. PCT/US2019/049875 on Sep. 6, 2019, now Pat. No. 12,079,557.

(Continued)

(51) Int. Cl.
*G06F 30/39* (2020.01)
*H01L 21/67* (2006.01)
(Continued)

(52) U.S. Cl.
CPC ........ *G06F 30/39* (2020.01); *H01L 21/67144* (2013.01); *H01L 21/6835* (2013.01);
(Continued)

(58) Field of Classification Search
CPC .............. G06F 2111/14; G06F 2113/18; G06F 2117/10; G06F 30/39; G06F 30/392;
(Continued)

(56) References Cited

U.S. PATENT DOCUMENTS 6,664,132 B1 12/2003 Buchner et al.
12,079,557 B2 * 9/2024 Sreenivasan ...... H01L 21/67144
(Continued)

FOREIGN PATENT DOCUMENTS

CN 101636848 B 11/2012
JP 2017054938 A 3/2017
(Continued)

OTHER PUBLICATIONS

Notice of Reasons for Refusal for Japanese Patent Application No. 2021-512602 dated Oct. 4, 2024, pp. 1-7.
(Continued)

*Primary Examiner* — Binh C Tat
(74) *Attorney, Agent, or Firm* — Robert A. Voigt, Jr.; Shackelford, McKinley & Norton, LLP

(57) ABSTRACT

Various embodiments of the present technology provide for the ultra-high density heterogenous integration, enabled by nano-precise pick-and-place assembly. For example, some embodiments provide for the integration of modular assembly techniques with the use of prefabricated blocks (PFBs). These PFBs can be created on one or more sources wafers. Then using pick-and-place technologies, the PFBs can be selectively arranged on a destination wafer thereby allowing Nanoscale-aligned 3D Stacked Integrated Circuit (N3-SI) and the Microscale Modular Assembled ASIC (M2A2) to be efficiently created. Some embodiments include systems and techniques for the construction of construct semiconductor
(Continued)

devices which are arbitrarily larger than the standard photolithography field size of 26×33 mm, using pick-and-place assembly.

54 Claims, 66 Drawing Sheets

Related U.S. Application Data

(60) Provisional application No. 62/884,524, filed on Aug. 8, 2019, provisional application No. 62/727,886, filed on Sep. 6, 2018.

(51) Int. Cl.

| *H01L 21/683* | (2006.01) |
| *H01L 25/00* | (2006.01) |
| *H01L 25/065* | (2023.01) |
| *G06F 111/14* | (2020.01) |
| *G06F 113/18* | (2020.01) |

(52) U.S. Cl.
CPC .......... *H01L 25/0657* (2013.01); *H01L 25/50* (2013.01); *G06F 2111/14* (2020.01); *G06F 2113/18* (2020.01); *H01L 2221/68327* (2013.01); *H01L 2221/68363* (2013.01); *H01L 2221/68381* (2013.01); *H01L 2225/06544* (2013.01)

(58) Field of Classification Search
CPC ...... G06F 30/396; G06F 30/398; G06F 11/10; H01L 2223/54426; H01L 25/50; H01L 2221/68368; H01L 2225/06513; H01L 27/1203; H01L 27/1266; H01L 29/7843; H01L 2221/68359; H01L 24/32; H01L 21/823437; H01L 24/83; H01L 29/1045; H01L 21/6836; H01L 2223/54473; H01L 21/6835; H01L 21/76254; H01L 21/76898; H01L 21/2007; H01L 21/67144; H01L 21/32134; H01L 21/6838; H01L 21/30604; H01L 21/78; H01L 21/7806; H01L 21/02381; H01L 21/02488; H01L 21/02527; H01L 21/02595; H01L 21/0262; H01L 21/02664; H01L 21/20; H01L 21/3065; H01L 21/32137; H01L 21/67069; H01L 21/67132; H01L 21/67259; H01L 21/68; H01L 21/6833; H01L 21/68721; H01L 21/68771; H01L 21/743

USPC .................................................. 716/106–115
See application file for complete search history.

(56) References Cited

U.S. PATENT DOCUMENTS

| 2004/0117744 | A1 | 6/2004 | Nation et al. | |
| 2005/0191791 | A1 | 9/2005 | Hartwell et al. | |
| 2006/0121645 | A1 | 6/2006 | Ball | |
| 2008/0217615 | A1 | 9/2008 | Kerber | |
| 2009/0127686 | A1 | 5/2009 | Yang et al. | |
| 2014/0242780 | A1* | 8/2014 | Gauldin | H01L 21/3065 |
| | | | | 438/463 |
| 2015/0200154 | A1 | 7/2015 | Choi et al. | |
| 2015/0228622 | A1 | 8/2015 | Koyanagi et al. | |
| 2016/0111407 | A1 | 4/2016 | Krasulick | |
| 2016/0146740 | A1* | 5/2016 | Lu | G03F 7/70633 |
| | | | | 356/620 |
| 2016/0343601 | A1 | 11/2016 | Ishida et al. | |
| 2017/0207214 | A1* | 7/2017 | Or-Bach | H10D 84/85 |
| 2018/0017881 | A1* | 1/2018 | Van Der Schaar | |
| | | | | G03F 7/70633 |
| 2018/0096952 | A1* | 4/2018 | Miccoli | H01L 23/562 |

FOREIGN PATENT DOCUMENTS

| WO | 2018118278 A1 | 6/2018 |
| WO | 2018119451 A1 | 6/2018 |

OTHER PUBLICATIONS

Second Notice of Reasons for Refusal for Japanese Patent Application No. 2021-512602 dated Jul. 25, 2024, pp. 1-3.
International Search Report for International Application No. PCT/US2019/049875 dated Jan. 9, 2020, pp. 1-4.
Written Opinion of the International Searching Authority for International Application No. PCT/US2019/049875 dated Jan. 9, 2020, pp. 1-6.
Office Action for Chinese Patent Application No. 201980073188.3 dated Sep. 10, 2024, pp. 1-6.
Notice of Preliminary Rejection for Korean Application No. 10-2021-7010124 issued by Korean Intellectual Property Office on Nov. 29, 2024, pp. 1-4.
Office Action for Taiwan Patent Application No. 113144839 dated Mar. 12, 2025, pp. 1-3.
Office Action for Chinese Patent Application No. 201980073188.3 dated May 15, 2025, pp. 1-5.
Decision of Final Rejection for Japanese Patent Application No. 2021-512602 dated Feb. 14, 2025, pp. 1-3.

* cited by examiner

400

410

470

420

460

430

480 440 450

2700

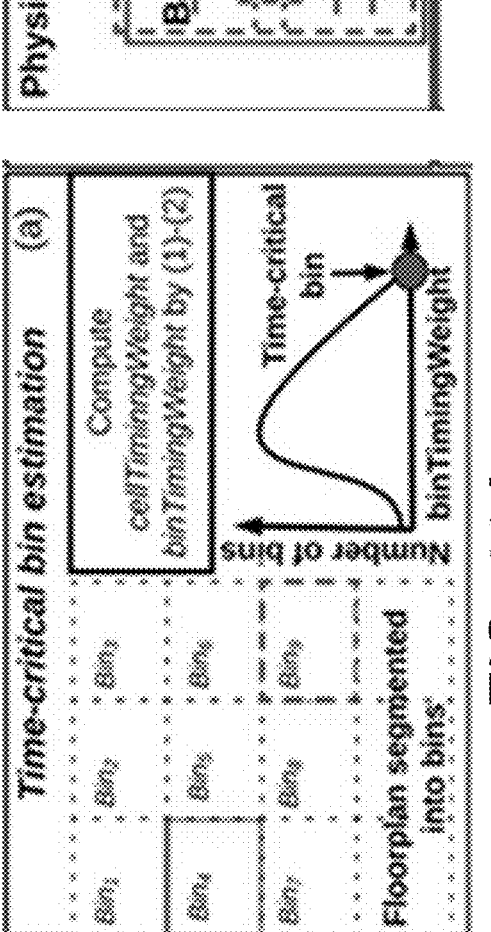
FIG. 28A
FIG. 28B
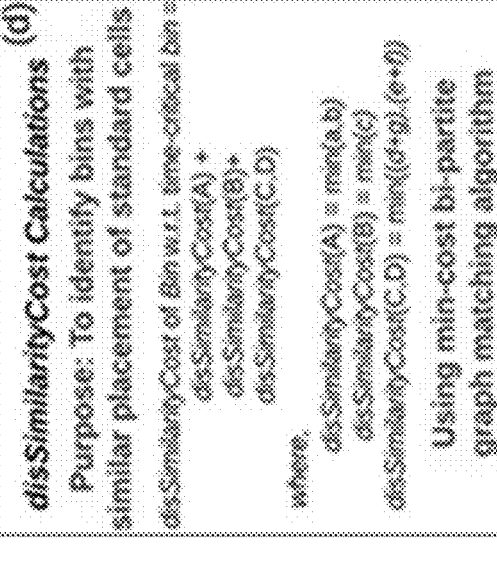
FIG. 28D
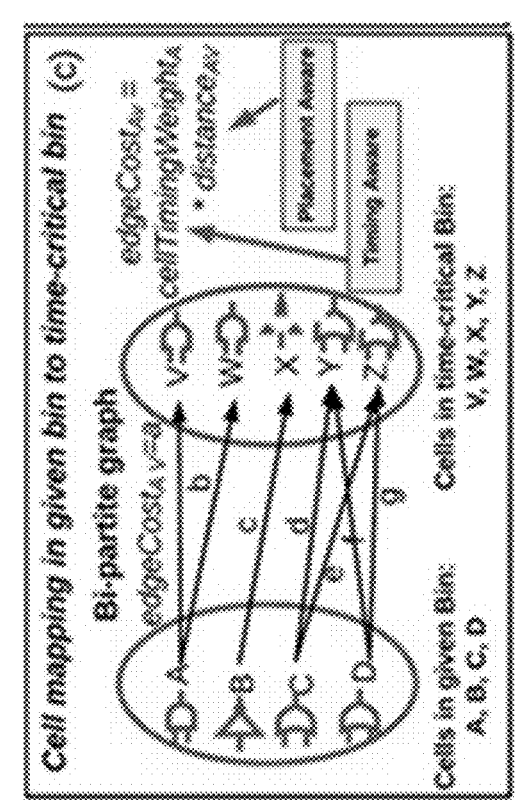
FIG. 28C

3500

3800

Untrusted Facilities
3810

Trusted Facilities
3820

PFB type 1 at
Foundry P1

PFB type 1 at
Foundry P2

PFB type 1 at
Foundry P3

Pick-and-
place
assembly

Front-end of SoC 3830

CMD 1 at
Foundry C1

Pick-and-place
assembly on top
of front-end layer

CMD 2 at
Foundry C2

Completed SoC 3840

Superstrate pins seal the PFB access-holes, as well as support the PFB against vacuum suction Vapor-form etchant Air at ~1atm pressure Vacuum PFB pickup Tether etch PFB chuck 1

5100

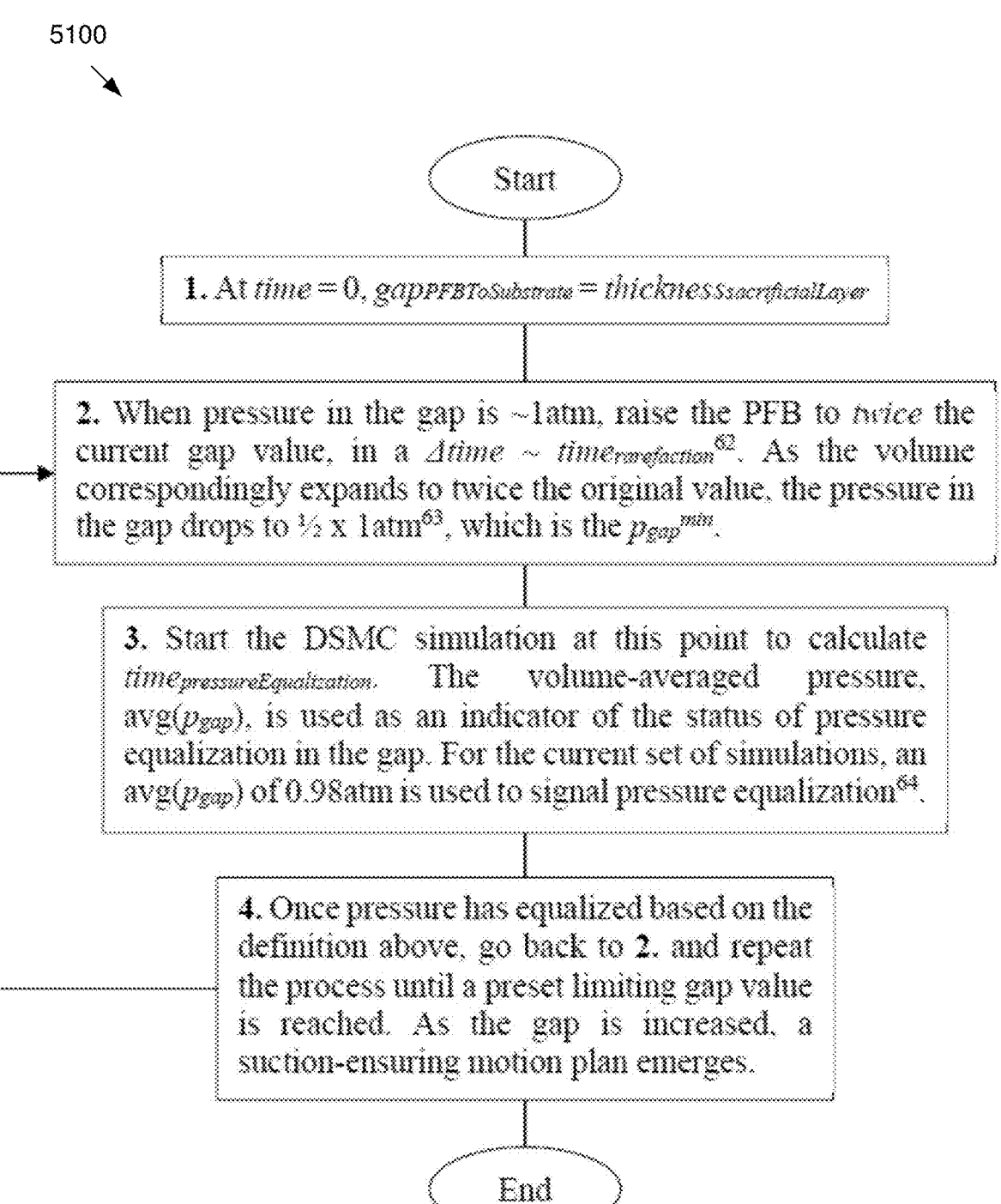

1. At $time = 0$, $gap_{PFBToSubstrate} = thickness_{sacrificialLayer}$

2. When pressure in the gap is ~1atm, raise the PFB to *twice* the current gap value, in a $\Delta time \sim time_{rarefaction}$[62]. As the volume correspondingly expands to twice the original value, the pressure in the gap drops to ½ x 1atm[63], which is the $p_{gap}^{min}$.

3. Start the DSMC simulation at this point to calculate $time_{pressureEqualization}$. The volume-averaged pressure, avg($p_{gap}$), is used as an indicator of the status of pressure equalization in the gap. For the current set of simulations, an avg($p_{gap}$) of 0.98atm is used to signal pressure equalization[64].

4. Once pressure has equalized based on the definition above, go back to 2. and repeat the process until a preset limiting gap value is reached. As the gap is increased, a suction-ensuring motion plan emerges.

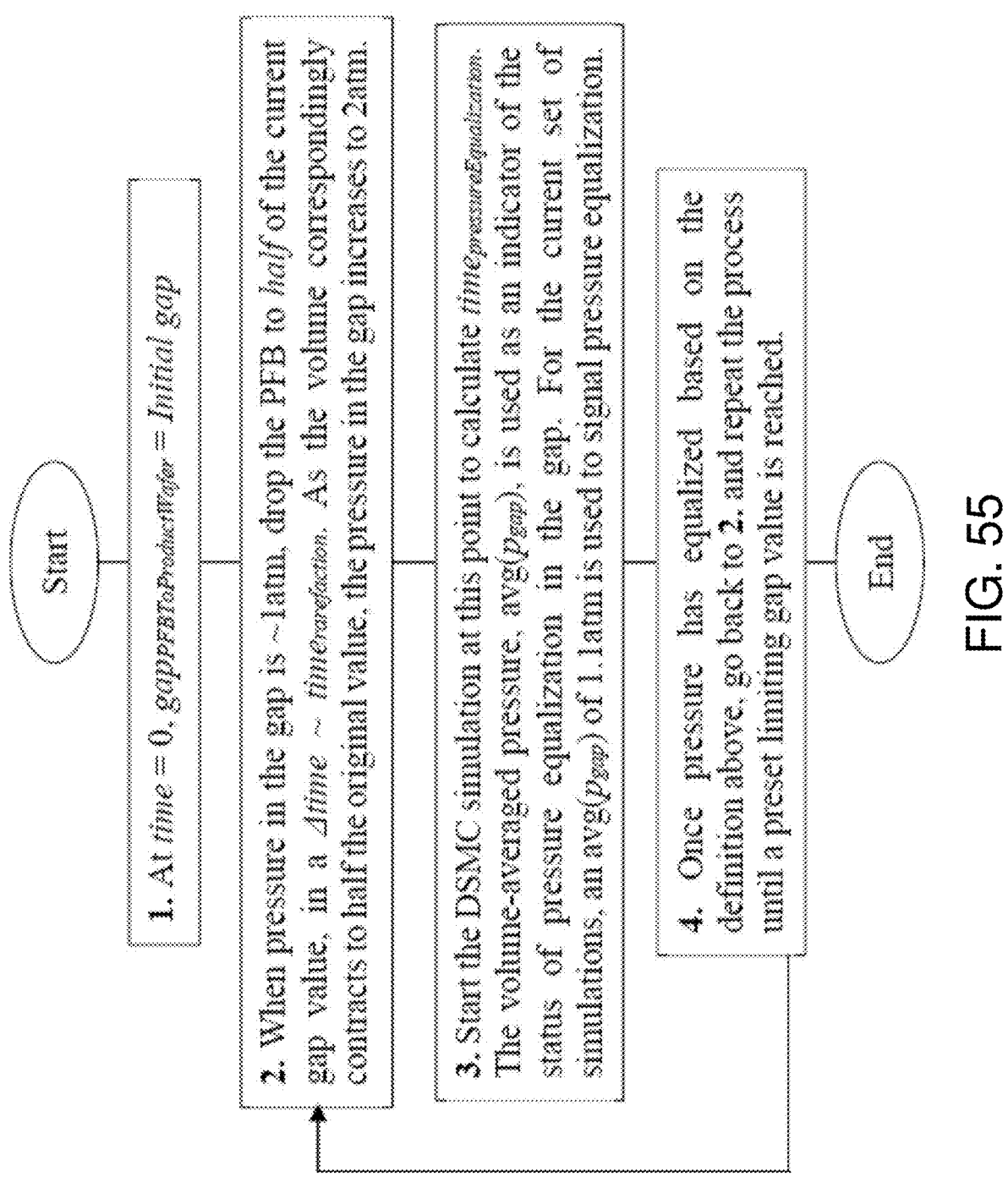

5500

Start

1. At *time* = 0, *gap*PFBToProductWafer = *Initial gap*

2. When pressure in the gap is ~1atm, drop the PFB to *half* of the current gap value, in a *Δtime* ~ *time*evaporation. As the volume correspondingly contracts to half the original value, the pressure in the gap increases to 2atm.

3. Start the DSMC simulation at this point to calculate *time*gapPressureEqualization. The volume-averaged pressure, avg($p_{gap}$), is used as an indicator of the status of pressure equalization in the gap. For the current set of simulations, an avg($p_{gap}$) of 1.1atm is used to signal pressure equalization.

4. Once pressure has equalized based on the definition above, go back to 2. and repeat the process until a preset limiting gap value is reached.

End

Section of a fab processed bulk
silicon wafer (with circuit elements
shown at the top)

Access hole etch
*depth*$_{hole}$ > 0.5 x *pitch*$_{hole}$

Encapsulation layer coating

Opening up encapsulation layer at
the bottom of the access holes

Porous silicon oxidization

Silicon anodization

5800

Section of a fab processed bulk
silicon wafer (with circuit elements
shown at the top)

Thin dielectric layer coating and
patterning of metal pads on top

Access hole etch

Encapsulation layer coating

Opening up encapsulation layer at
the bottom of the access holes

Silicon anodization with the
metal pads at a suitable voltage

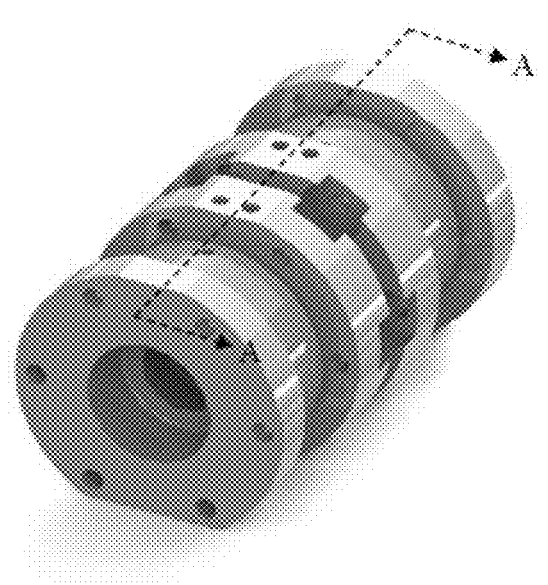
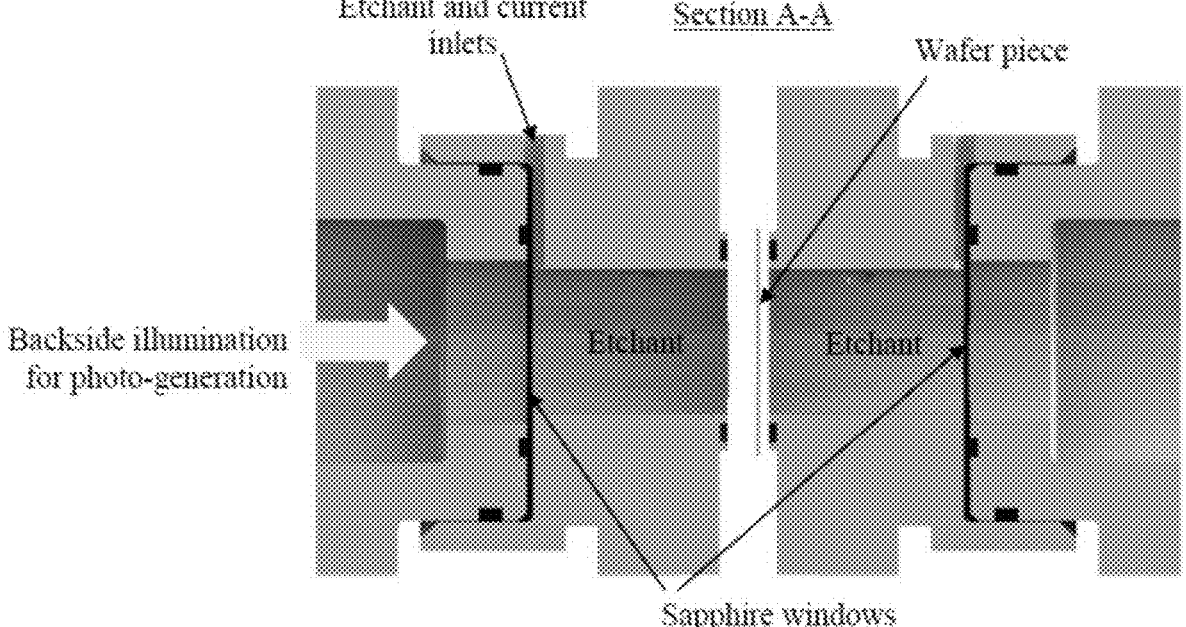
FIG. 60

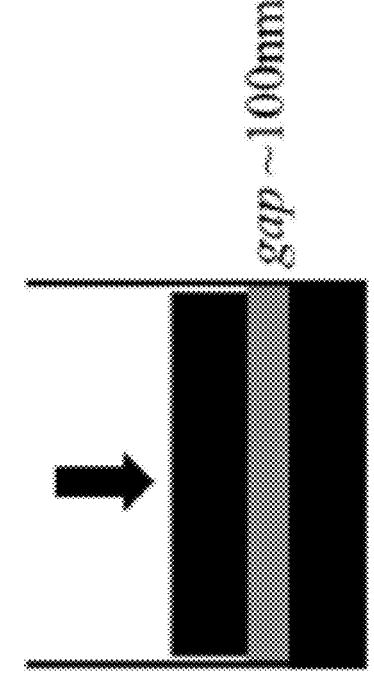
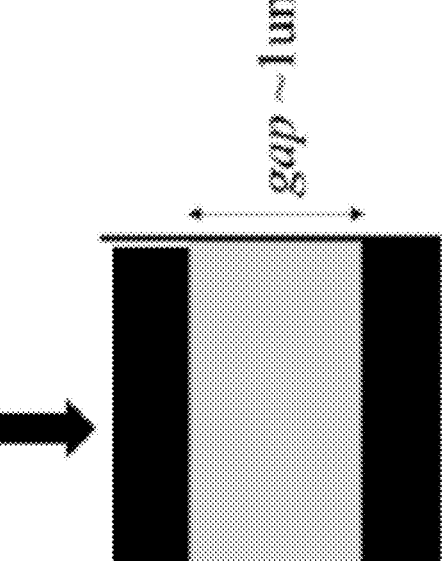
FIG. 62

6500

NANOFABRICATION AND DESIGN TECHNIQUES FOR 3D ICS AND CONFIGURABLE ASICS

TECHNICAL FIELD

Various embodiments of the present invention generally relate to nanofabrication and design of integrated circuits. More specifically, some embodiments of the present technology relate to Nanoscale-aligned 3D Stacked Integrated Circuit (N3-SI) and the Microscale Modular Assembled ASIC (M2A2) technologies for advanced semiconductor devices.

BACKGROUND

A mere 70 years ago, inexpensive and ubiquitously available high-performance computers would have been considered a pipe dream. Rapid and consistent transistor scaling is the primary reasons for today's cost-effective, high-performance computing devices. Transistor scaling, for the majority of the past 50 years, has been consistent enough to be codified it into a law—the Moore's law. However, future progress in scaling faces several hard challenges, with the proximal ones related to patterning sub-20 nm (half-pitch) features using photolithography in an economically viable manner.

While individual transistors are routinely made at sub-20 nm scales today, it is increasingly apparent that the room at the bottom is rapidly shrinking; progress in computing can no longer depend on performance gains through conventional scaling of transistors. There are several challenges including physical challenges, material challenges, power-thermal challenges, technological challenges, economic challenges, and others.

Physical challenges, for example, arise as transistors become smaller tunneling and leakage currents increase as a fraction of the signal currents which negatively impacting the performance and functionality of CMOS devices. Material challenges arise as feature sizes shrink due the use presently used dielectrics and wiring materials can no longer provide reliable insulation and conduction. Power-thermal challenges arise with the transistor supply voltage not scaling as rapidly as the transistor size. As such, the power density in transistors is increasing. This creates challenges for the power dissipation technology. Examples of technological challenges include, but are not limited to, patterning sub-20 nm features which require complex multiple-patterning using 193 nm immersion tools, or a switch to problematic EUV exposure tools.

Each of these factors lead to a significant increase in the cost of production and testing, without commensurate increase in functionality and performance. This is driving down the profits for semiconductor manufacturers, ultimately decreasing the incentives for aggressive scaling.

SUMMARY

In one embodiment of the present invention, a method for assembling die onto a product substrate comprises selectively picking one or more die from a source wafer by a superstrate attached to the one or more die. The method further comprises placing and bonding the selectively picked one or more die onto the product substrate with precision overlay, where the precision overlay is enabled by a volatile liquid deployed between the one or more die and the product substrate, where the volatile liquid comprises one of the following: isopropyl alcohol and water, and where the precision overlay comprises a difference between a vector position of points on the one or more die and a vector position of corresponding points on the product substrate.

In another embodiment of the present invention, a method for assembling die onto a product substrate comprises selectively picking one or more die from a source wafer by a vacuum superstrate attached to the one or more die. The method further comprises placing the selectively picked one or more die onto the product substrate with precision overlay, where the precision overlay is enabled by a volatile liquid deployed between the one or more die and the product substrate. The method additionally comprises securely attaching the selectively picked one or more die onto the product substrate using direct bonding by holding onto the one or more die using the vacuum superstrate until the attachment occurs.

In a further embodiment of the present invention, a system to fabricate a semiconductor device comprises a nano-precise pick-and-place assembly unit, where the nano-precise pick- and place assembly unit picks up multiple die from one or more source wafers and places the picked-up multiple die onto a product substrate with precision overlay, where the precision overlay is enabled by a fluid deployed between the multiple die and the product substrate, and where the precision overlay comprises a difference between a vector position of points on the one or more die and a vector position of corresponding points on the product substrate. The system further comprises a plasma chamber for holding process gas in a low pressure. The system additionally comprises a storage unit having stored therein the one or more source wafers and the product substrate. Furthermore, the system comprises a transfer arm for transferring a target substrate.

While multiple embodiments are disclosed, still other embodiments of the present invention will become apparent to those skilled in the art from the following detailed description, which shows and describes illustrative embodiments of the invention. As will be realized, the invention is capable of modifications in various aspects, all without departing from the scope of the present invention. Accordingly, the drawings and detailed description are to be regarded as illustrative in nature and not restrictive.

BRIEF DESCRIPTION OF THE DRAWINGS

Embodiments of the present technology will be described and explained through the use of the accompanying drawings.

FIGS. 28A-28D illustrates and an example of a disSimilarityCost analysis in the PFB design algorithm that may be used in one or more embodiments of the present technology.

FIG. 51 is a flowchart illustrating an example of a set of operations that may be used for derivation of a suction-ensuring pickup plan in accordance with some embodiments of the present technology.

FIG. 55 is a flowchart illustrating an example of a set of operations for derivation of placement time estimate that may be used in some embodiments of the present technology.

FIG. 60 illustrate a photoelectrochemical etcher for porosity creation that may be used in various embodiments of the present technology.

FIG. 62 illustrates an example of an air bearing gap decreasing 10-fold.

Figure 1:
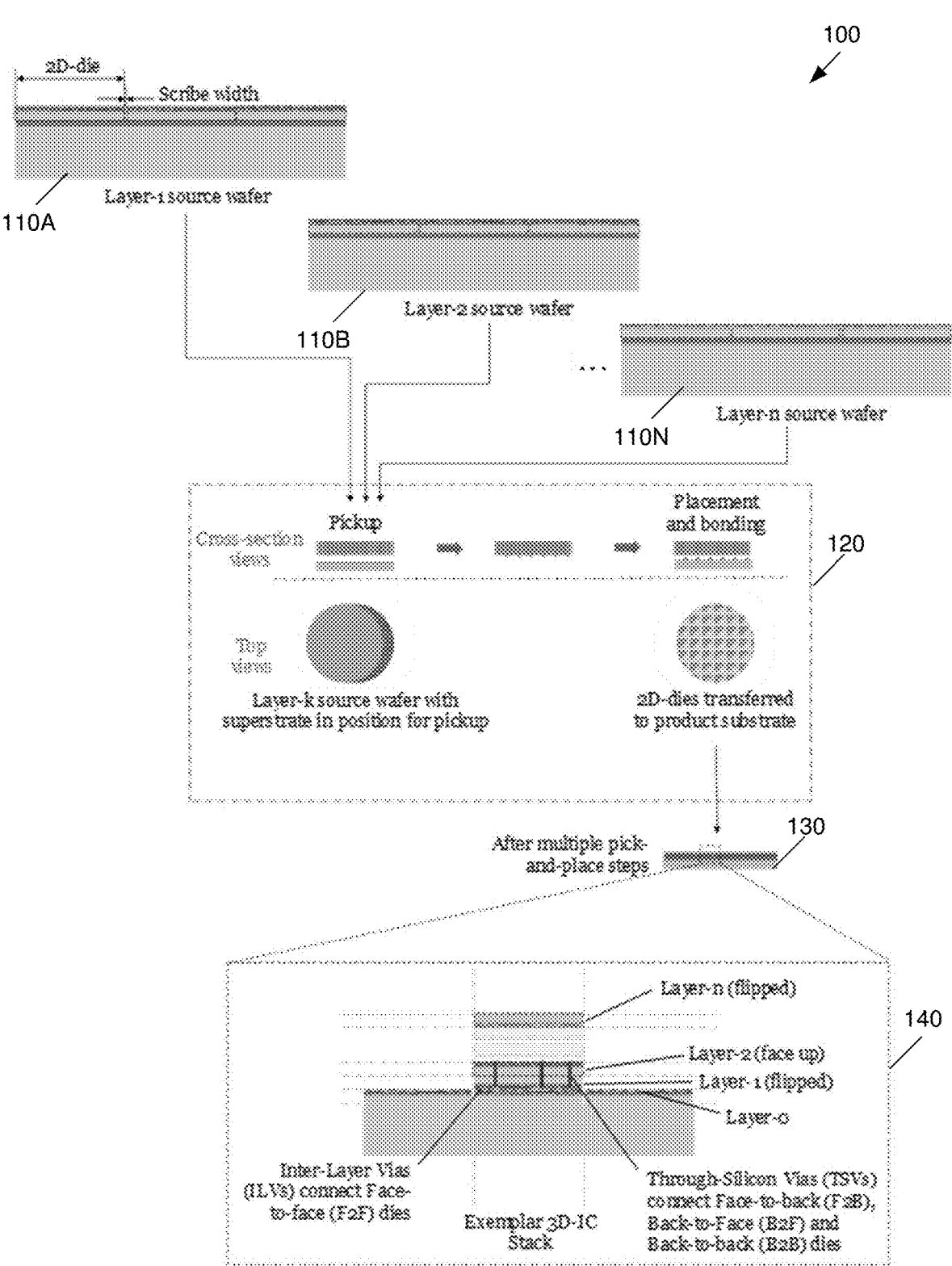
FIG. 1 illustrates an example of a pick-and-place sequence for assembling 3D ICs that may be used in various embodiments of the present technology.

The drawings have not necessarily been drawn to scale. Similarly, some components and/or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Various embodiments of the present invention generally relate to nanofabrication and design of integrated circuits. More specifically, some embodiments of the present technology relate to Nanoscale-aligned 3D Stacked Integrated Circuit (N3-SI) and the Microscale Modular Assembled ASIC (M2A2) technologies for advanced semiconductor devices. The conventional integration architecture for semiconductor devices consists of a single transistor-layer fabricated on high-quality silicon, and many layers of conducting wires that connect the transistors in a hierarchical manner. Devices have historically been limited to such an architecture, i.e. a single, densely-packed, transistor layer, instead of several stacks of heterogeneously-integrated transistor layers, because of challenges related to the growth of high-quality crystalline silicon on top of previously fabricated layers.

However, scaling challenges are finally pushing the industry towards heterogenous integration schemes. A continuum of methods are being explored, ranging from package and bond-pad level integration, to sequential monolithic integration at the level of individual transistors. Various embodiments of the present technology provide for the ultra-high density heterogenous integration, enabled by nano-precise pick-and-place assembly. For example, some embodiments provide for the integration of modular assembly techniques with the use of prefabricated blocks (PFBs). These PFBs can be created on one or more sources wafers. Then using pick-and-place technologies, the PFBs can be selectively arranged on a destination wafer thereby allowing N3SI and M2A2 to be efficiently created. Some embodiments include systems and techniques for the construction of construct semiconductor devices which are arbitrarily larger than the standard photolithography field size of 26×33 mm, using pick-and-place assembly.

While scaling is a central issue for the semiconductor industry, there are other problems which can also be addressed using the methods explored here. Hardware security is one such problem. For a device to go from initial design to large-scale fabrication and deployment, it is necessary to share sensitive intellectual property across many organizational and state borders. With the relevant pieces of information, an untrusted member in the supply chain can potentially counterfeit the original designs, and/or insert malicious components into the device.

It is estimated that the semiconductor industry loses up to $4 billion annually because of the IP right violations, and an estimated $169 billion annually due to counterfeit ICs (which includes recycled, remarked, tampered, and overproduced ICs). Various embodiments of the present technology provide for a split-fabrication approach as a solution to the hardware security problem. This can involve fabricating the high-resolution front-end part of the circuit at an advanced and possibly untrusted foundry, with the lower-resolution circuit fabrication happening at a trusted (possibly local or in-house), but less advanced foundry. As such, some embodiments allow for the construction of semiconductor devices in which hardware security is ensured, even though parts of the device are fabricated at untrusted facilities.

In addition, some embodiments provide for related circuit design methodologies for the above applications. Some embodiments also include systems and methods to transform bulk silicon source wafers into ones which contain a buried sacrificial layer, for pick-and-place assembly. In addition, methods to enable nano-precise assembly through nano-scale airflow modeling during the pick-and-place assembly. The concept of a semiconductor fabrication facility—a mini-fab, which has significantly smaller footprint and capital requirements than conventional large-scale fabs, but can be used in conjunction with large-scale fabs for fabrication of custom semiconductor devices by entities/companies which don't necessarily specialize in semiconductor fabrication.

Various embodiments of the present technology provide for a wide range of technical effects, advantages, and/or improvements to fabrication systems and components. For example, various embodiments include one or more of the following technical effects, advantages, and/or improvements: 1) enable a number of applications which require nano-meter precise assembly of circuit elements (e.g., applications such as 3D integrated circuits, dies with super-lithographic form factors, hardware security and high-mix, low-volume ASICs, etc.); 2) a nano-meter precise assembly that is achieved by utilizing a variety of techniques including a novel process to produce buried sacrificial layers inside bulk silicon source wafers; 3) use of nanoscale-airflow-aware superstrate designs which pick circuit elements from the source wafers while maintaining lithographic precision to create a nano-meter precise assembly; 4) integration of an in-air overlay correction method, which additionally utilizes moire-based alignment metrology for nano-precise placement of circuit elements onto the product wafer to create a nano-meter precise assembly that is achieved by utilizing a variety of techniques including; and/or 5) a novel circuit design (EDA) schemes for high-mix, low-volume ASICs. Some embodiments may include other technical effects, advantages, and/or improvements as discussed herein.

In the following description, for the purposes of explanation, numerous specific details are set forth in order to provide a thorough understanding of embodiments of the present technology. It will be apparent, however, to one skilled in the art that embodiments of the present technology may be practiced without some of these specific details.

The techniques introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions which may be used to program a computer (or other electronic devices) to perform a process. The machine-readable medium may include, but is not limited to, floppy diskettes, optical disks, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

The phrases "in some embodiments," "according to some embodiments," "in the embodiments shown," "in other embodiments," and the like generally mean the particular feature, structure, or characteristic following the phrase is included in at least one implementation of the present technology, and may be included in more than one implementation. In addition, such phrases do not necessarily refer to the same embodiments or different embodiments.

Various embodiments of the present technology relate to systems and methods for fabricating 3D ICs and Microscale Modular Assembled ASICs (M2A2), using nano-precise pick-and-place assembly techniques. Generic pick-and-place sequences for assembling 3D ICs and M2A2 in accordance with various embodiments are shown in FIGS. 1 and 2, respectively.

FIG. 1 illustrates an example of a pick-and-place sequence 100 for assembling 3D ICs that may be used in various embodiments of the present technology. As illustrated in FIG. 1, multiple different source wafers 110A-110N can include a variety of 2D dies that can be assembled using pick and place process 120 to create 3D IC 130. Various embodiments of the 3D IC process shown in FIG. 1 may be configured so that the assembly could happen in a face-to-face (F2F), face-to-back (F2B), back-to-face (B2F) or back-to-back (B2B) fashion. B2F, F2B and B2B stacked 3D ICs could later be connected, for instance, using through-silicon vias (TSVs). F2F stacked 3D ICs could be connected using inter-layer vias (ILVs) as illustrated in callout 140 showing an enlarged portion of 3D IC 130.

Figure 2:
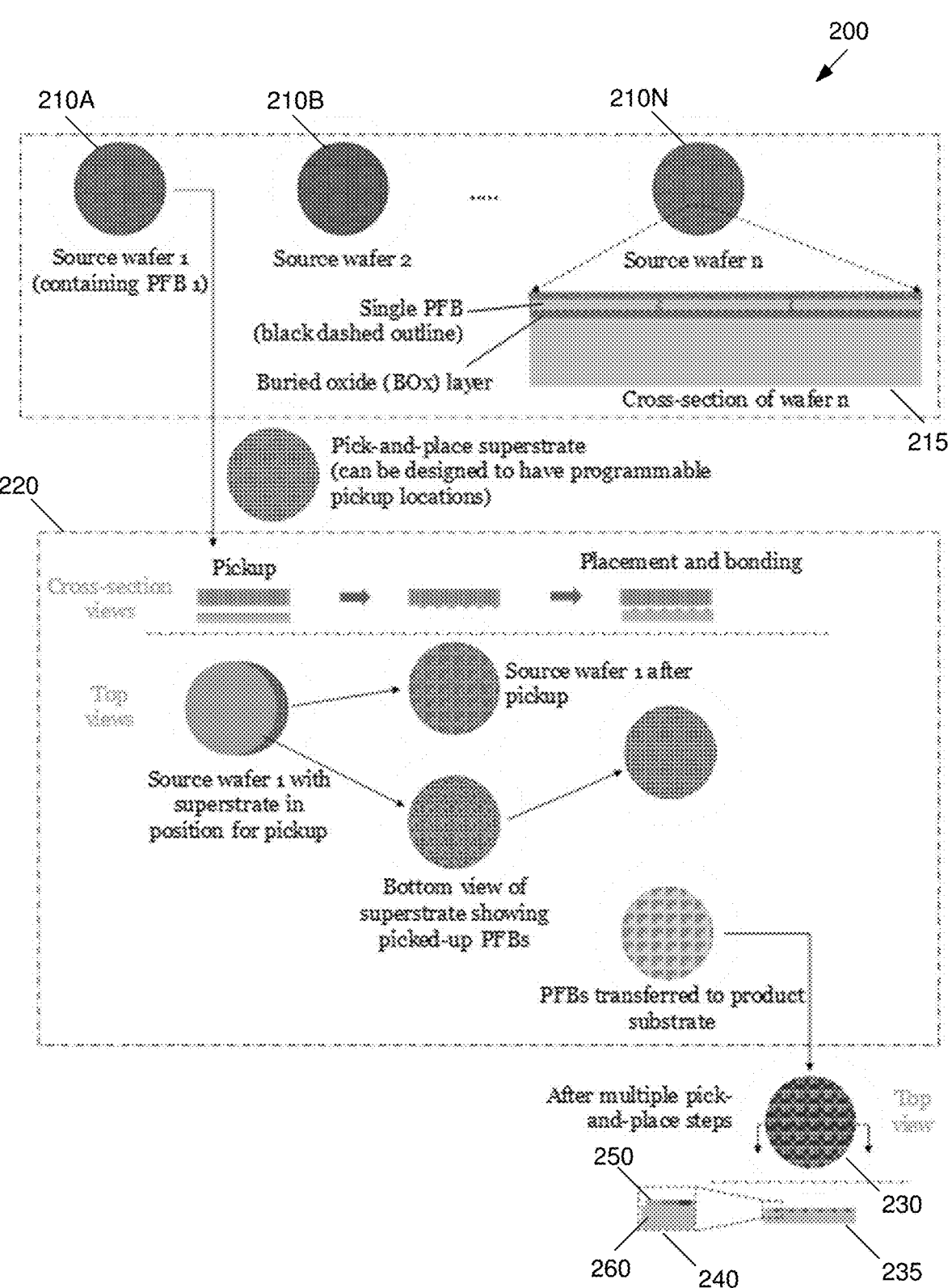
FIG. 2 illustrates an example of a pick-and-place sequence for Microscale Modular Assembled ASIC (M2A2) that may be used in some embodiments of the present technology.

FIG. 2 illustrates an example of a pick-and-place sequence 200 for Microscale Modular Assembled ASIC (M2A2) that may be used in some embodiments of the present technology. As illustrated in the embodiments shown in FIG. 2, can include multiple source wafers 210A-210N each containing different prefabricated blocks (PFBs). In accordance with various embodiments, source wafers 210A-210N can include a plurality of PFBs on top of a sacrificial layer (e.g., Buried Oxide Layer). This is illustrated in cross section 215 of source wafer 210N.

Pick-and-Place superstrate can be designed to have programmable pickup locations allowing for the pick and place process 220 to pick up a source wafer and transfer one or more PFBs from the source wafer to the product substrate to create a customized assembled ASIC 230. As seen in callout 240 showing an enlarged cross sectional view of a portion 235 of ASIC 230, different PFBs 250 can be placed side by side in a desired order on the product substrate 260.

For any generic pick-and-place assembly sequence, errors can be generated during various intermediate steps, all potentially contributing to the final overlay error. Table I provides a summary of these error sources.

TABLE I

OVERLAY ERROR SOURCES DURING PICK-AND-PLACE ASSEMBLY

| | Error source | Vector designation* | Sub-components |
|---|---|---|---|
| 1 | Registration error during fabrication of source wafers | $\delta_{Registration@fabrication}^{Overlay}$ | $\delta_{-,RB}^{Overlay} + \delta_{-,nRB}^{Overlay}$ |
| 2 | Stick-slip behavior between superstrate and 2D-die during pickup and placement steps | $\delta_{SS@pickup,\ placement}^{Overlay}$ | |

TABLE I-continued

OVERLAY ERROR SOURCES DURING PICK-AND-PLACE ASSEMBLY

| Error source | Vector designation* | Sub-components |
|---|---|---|
| 3  Overlay errors due to thermal mismatch between 2D-die, superstrate and substrate (in temperature, and/or thermal expansion coefficient) during pickup and placement steps. | $\delta_{Therm@pickup, placement}^{Overlay}$ | |
| 4  Overlay errors due to topography mismatch between 2D-die and substrate during pickup and placement steps. | $\delta_{Topo@pickup, placement}^{Overlay}$ | |
| 5  Viscoelastic creep during the adhesive curing | $\delta_{Creep@curing}^{Overlay}$ | |
| 6  Distortions during the permanent attachment step | $\delta_{Distortion@attachment}^{Overlay}$ | |

*Vector of errors at alignment points in a 2D-die
** RB = Rigid body components, nRB = non-rigid body components Various embodiments provide for a variety of techniques to reduce and/or eliminate the above overlay error sources. Said overlay control techniques, described in subsequent sections, can be referred to as "overlay control architecture" for brevity. Unless otherwise stated, the methods disclosed could be applied to any of the applications explored herein.

J-FIL Stepper Based Machine Design

Figure 3:
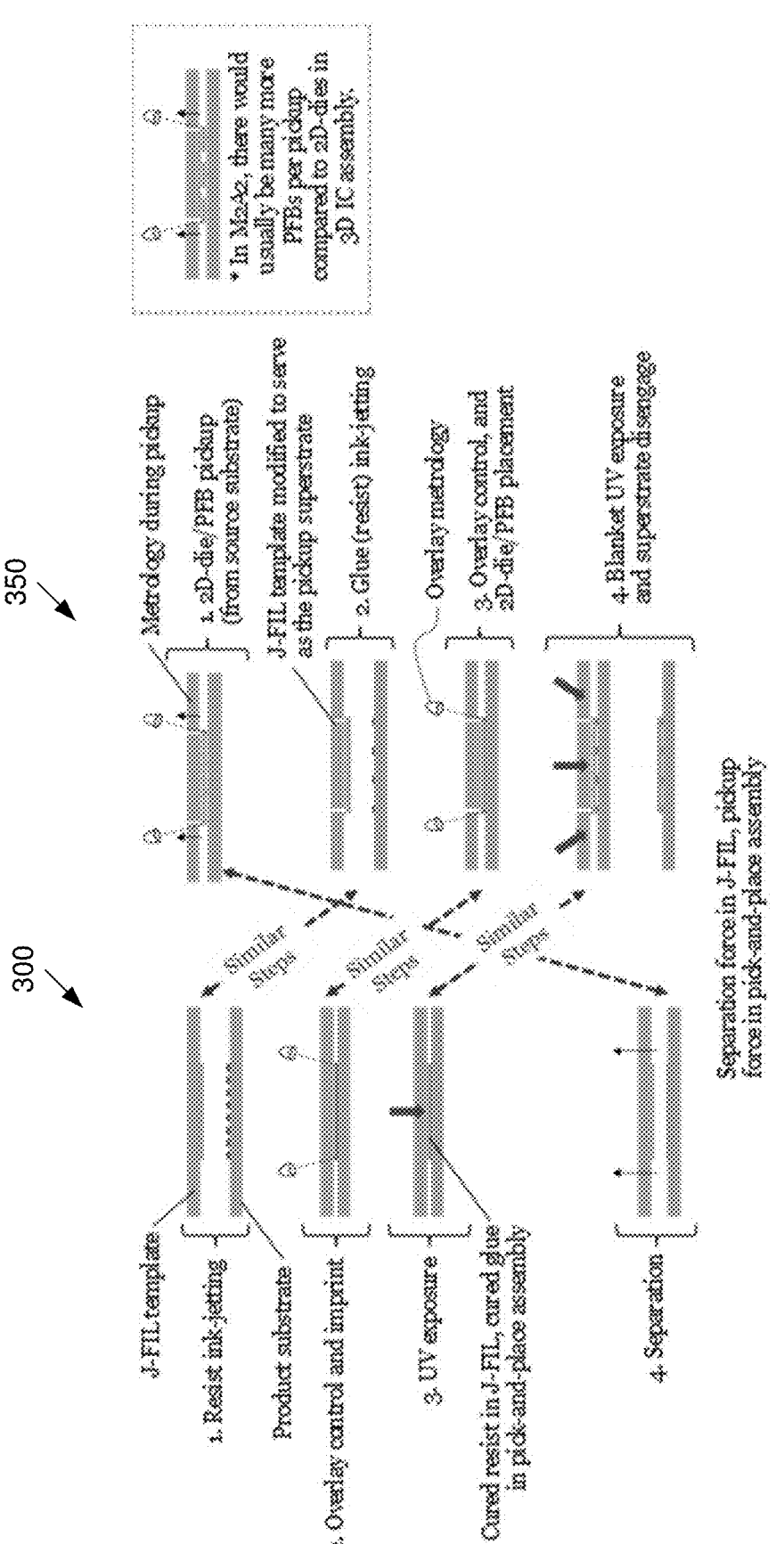
FIG. 3 is an illustration of the similarities between unit steps in nano-imprint lithography and pick-and-place assembly used in one or more embodiments of the present technology.

Various embodiments of the present technology provide for new designs of a generic pick-and-place tool integrating design elements from a nano-imprint lithography stepper. FIG. 3 shows a generic pick-and-place assembly sequence 300 and a nano-imprint lithography sequence 350 side-by-side, illustrating the parallels between them. For example, NIL/J-FIL uses a glass template while some embodiments of the present technology incorporate a pick-and-place stepper that uses a vacuum superstrate. In some embodiments, the pick-and-place stepper could essentially be a NIL template modified to have vacuum lines. NIL/J-FIL uses a UV-curable resist. Some embodiments of the present technology can incorporate a pick-and-place stepper that could use a UV-curable liquid. This could be similar in formulation to a UV-curable resist. NIL/J-FIL uses moiré-based overlay metrology, and MSCS based overlay correction. Overlay metrology in a pick-and-place stepper could be conducted using moiré-based metrology as well in various embodiments. NIL/J-FIL, after UV exposure, includes a separation step, where care is taken to not damage the cured resist. A pick-and-place stepper used in various embodiments of the present technology could use a similar controlled separation to pick up 2D-dies from their source substrates.

Figure 4:
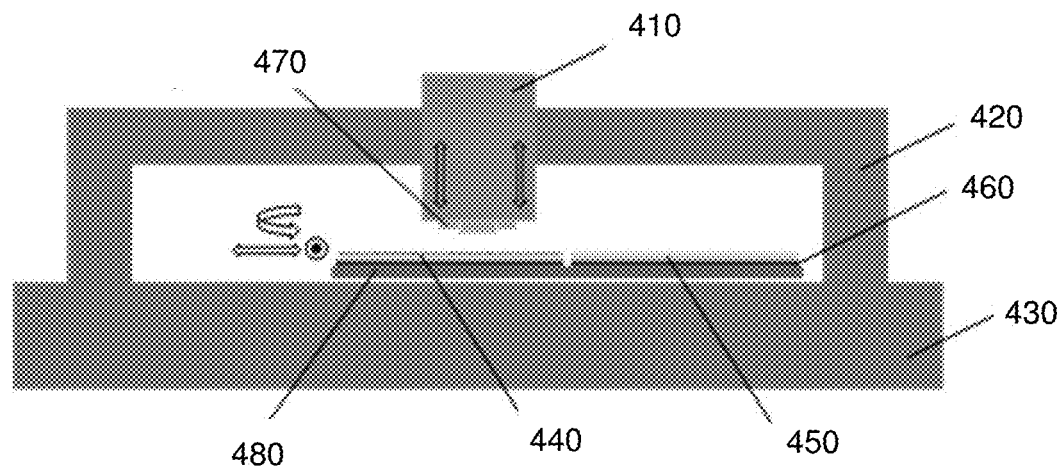
FIG. 4 illustrates an example of a pick-and-place stepper that may be used in various embodiments of the present technology.

FIG. 4 shows a pick-and-place stepper 400 modelled along the lines of a nano-imprint stepper. In the embodiments shown in FIG. 4, stepper 400 can include a z-head assembly 410. Z-head assembly 410 can have one or more of the following features: movement z axes, inline overlay metrology, superstrate chuck, and vacuum and etchant routing. Z-head assembly 410 can be moveably mounted on granite bridge 420 on a granite base 430. Source wafer 440 and product wafer 450 can be positioned on wafer chuck assembly 460 allowing for pick and place by superstrate 470 located on z-head assembly 410. Some embodiments may include motion state 480 which both source and product substrate mounted on the same carriage.

Figures 5A, 5B:
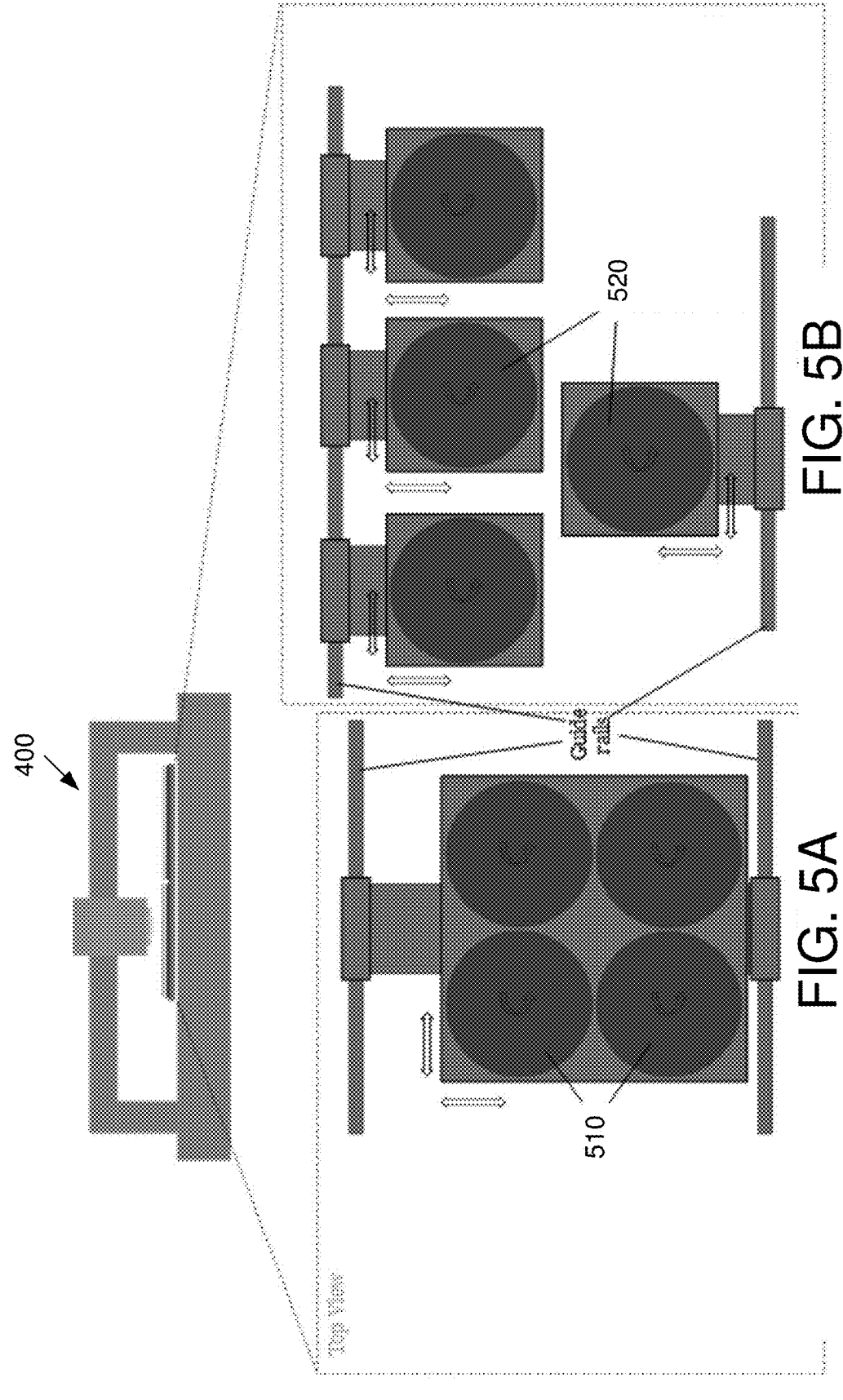
FIG. 5A illustrates an example of a wafer stage configuration having a single stage with both source and product wafers on the same carriage in accordance with various embodiments of the present technology.
FIG. 5B illustrates an example of a wafer stage configuration having a multiple T-configuration stages in accordance with some embodiments of the present technology.

Various embodiments of stepper 400 can have one or more wafer stages, which could be air bearing stages, roller bearing stages, or any other variety/combination of stages that are able to produce planar motion with nanometer precision, while being able to tolerate forces in the normal direction without losing precision. FIGS. 5A-5B illustrate examples of wafer stage configurations that may be used in some embodiments. In FIG. 5A, a single stage is shown with both source and product wafers on the same carriage. In FIG. 5A, the source and product wafers 510 (and the chuck assemblies) can be included in a signal stage carriage. The cuck assemblies can share their (X, Y) degrees-of-freedom but can have independent theta, and higher order actuation. In case of a single stage, the stage could have a multitude of chucks to hold a variety of source and product wafers (FIG. 5A).

FIG. 5B illustrates embodiments with a multiple T-configuration stages. In a multiple T-configuration, source and product wafers 520 (and the chuck assemblies) can be positioned in the shape of the letter "T" (e.g., top row having three chuck assemblies with a single chuck assembly positioned directly below). In these embodiments, the (X, Y, theta) degrees of freedom can be independently controlled for each of the wafers 520. In some embodiments, additional higher degrees of freedom can be independently controlled. As such, the stepper 400 could have multiple independently moving stages, each with its own single chuck or multitude of chucks (FIG. 5B).

Figure 6:
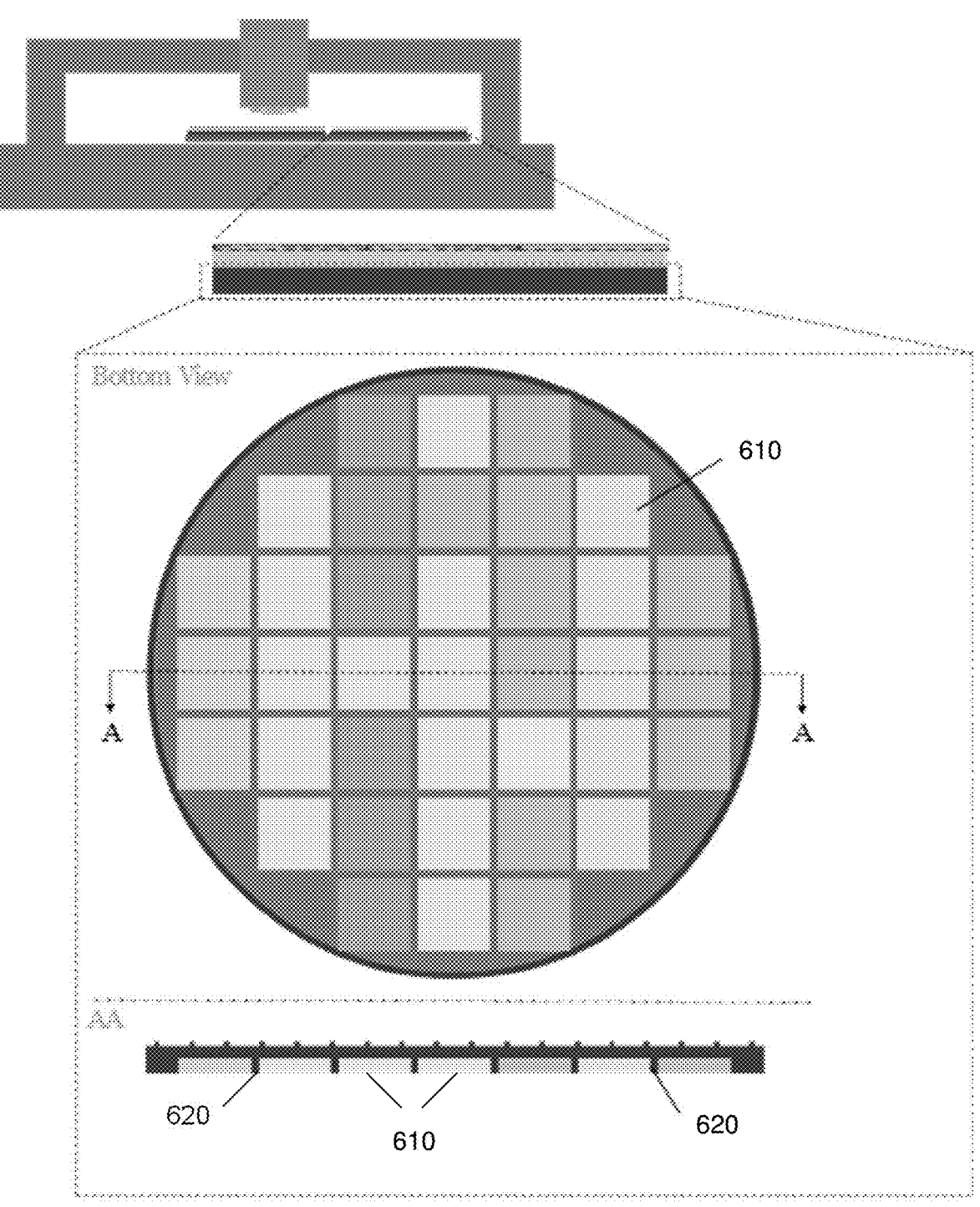
FIG. 6 is an example of a thermally-actuated wafer chuck that may be used in some embodiments of the present technology.

The wafer chucks could have thermal actuator units (heating/cooling elements) embedded inside them. An example design of such a chuck is shown in FIG. 6. The additional number of electrical wires and components needed to control the multitude of thermal actuators could be housed in an assembly on the stage carriage, along with an on-board multiplexer to reduce the number of wiring connections running through the stage wire track. The thermal actuators could not only be used to maintain the chuck at a desired constant temperature, but also be used to intentionally vary the thermal profile to attain a specific distortion profile as illustrated in heating cooling elements 610. In the cross-sectional view of the chuck at the bottom of FIG. 6, fins 620 separating the heating elements can be seen. The following reference, which is hereby incorporated by reference in its entirety for all purposes, describes such a feature: Ajay, Paras, et al. "Multifield sub-5 nm overlay in imprint lithography." Journal of Vacuum Science & Technology B, Nanotechnology and Microelectronics: Materials, Processing, Measurement, and Phenomena 34.6 (2016): 061605.

Figure 7:
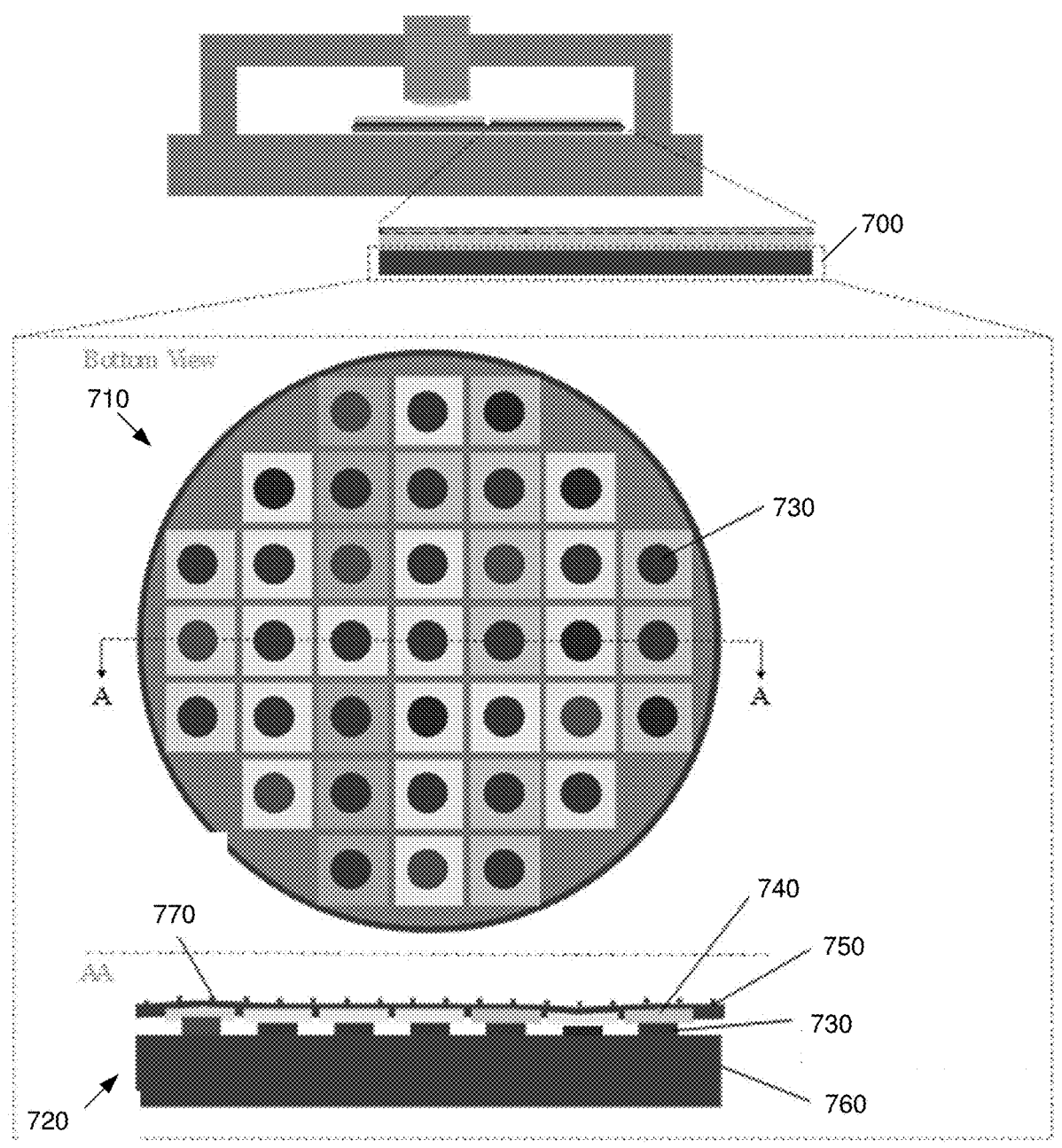
FIG. 7 is an example of a topography-controlled thermally-actuated wafer chuck that may be used in one or more embodiments of the present technology.

In accordance with various embodiments, the wafer chucks could be made of transparent materials (in the relevant spectra), such as alumina and transparent SiC, to allow for metrology and adhesive-liquid curing from the bottom. FIG. 7 is an example of a topography-controlled thermally-actuated wafer chuck that may be used in one or more embodiments of the present technology. In the embodiments, illustrated in FIG. 7, wafer chuck 700 could further have arrays of embedded z-actuators (piezo-electric, voice coil based, etc.) to change the topography of the wafer during a pick-and-place step. In FIG. 7, a bottom view 710 is shown along with a cross-sectional view 720 along line AA.

Wafer chuck 700 can include topographical control elements 730. As illustrated in the cross-sectional view 720, each of these elements can include thermal actuators 740, thin top section 750, topographical control elements 730 sandwiched in between thermal actuators 740 and a thick bottom section 760. As such, wafer chuck 700 can set the desired topography at the pin surface 770. For example, in some embodiments, topography errors (as well as in-plane distortions) could be sensed in an inline manner using chirped moiré alignment marks patterned on the wafers. Superstrate-substrate topography matching is important in pick-and-place assembly, more so than NIL, because during the pickup step, if 2D-dies/PFBs make contact with the superstrate at different instances, as they would if superstrate-substrate topography is not well matched, it could create localized regions where premature breakage of sacrificial tethers happens, increasing the likelihood of overlay loss. In addition, during the placement step, there is reduced scope for in-liquid alignment to correct overlay errors due to topography mismatch (or other sources, for that matter), since 2D-dies/PFBs are held to the superstrate over significantly smaller areas in comparison to NIL templates (which leads to reduced frictional resistance to sliding). To reduce the above eventualities, various embodiments correct both topography and overlay errors "in-air".

Superstrate Design

Figure 8:
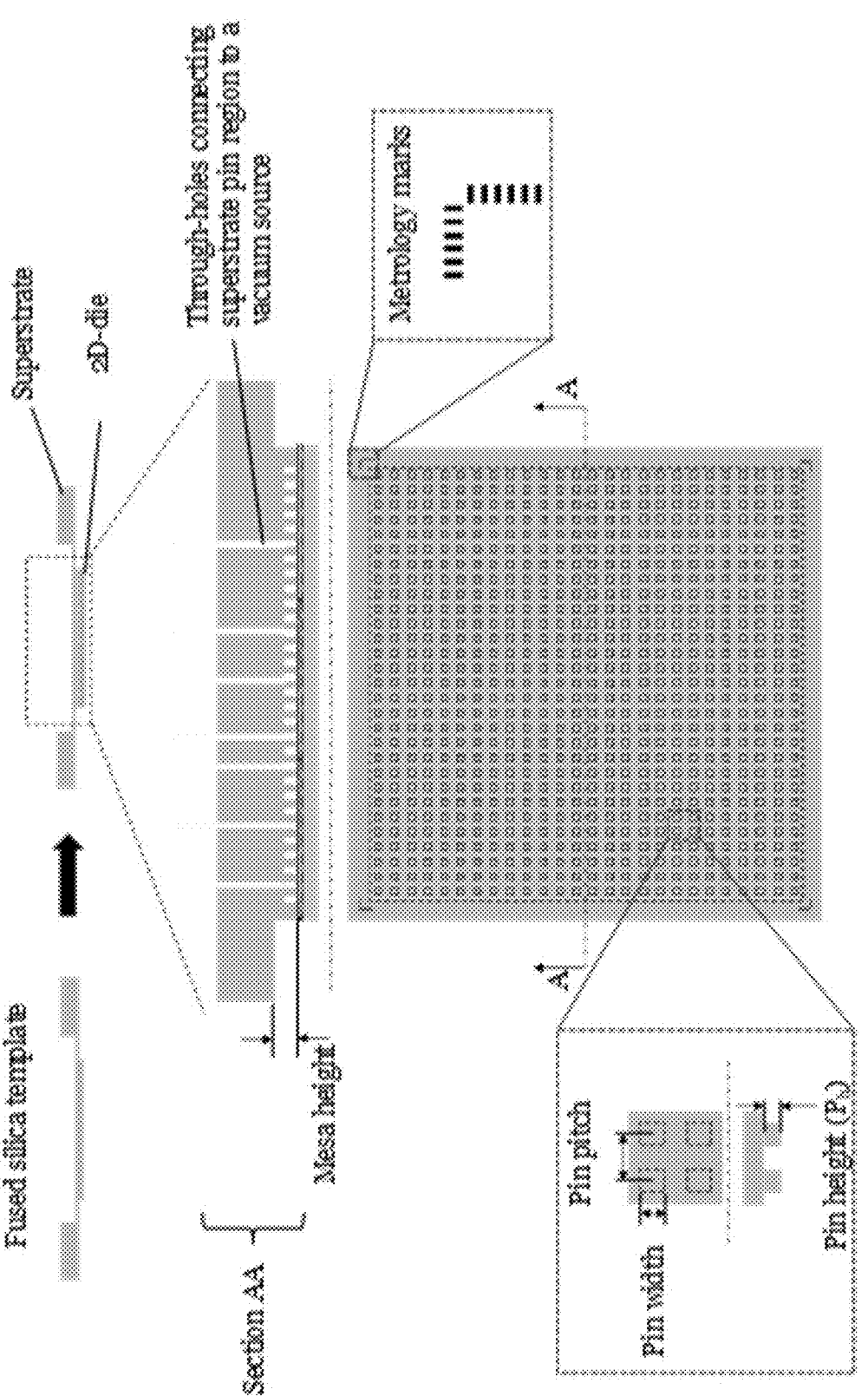
FIG. 8 is an example of a NIL-template-based superstrate for 2D-die pickup that may be used in various embodiments of the present technology.
Figure 9:
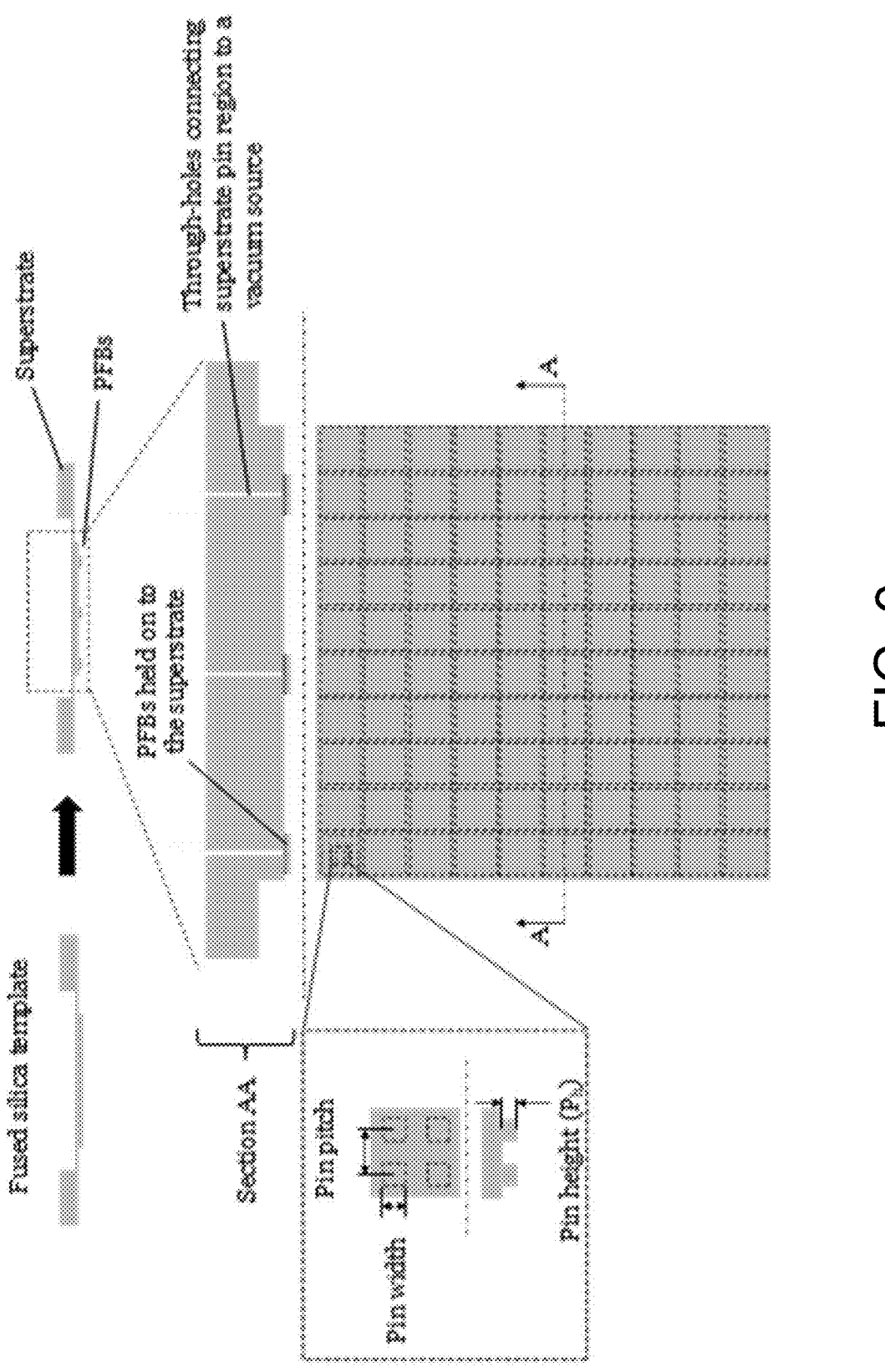
FIG. 9 is an example of a NIL-template-based superstrate for PFB pickup that may be used in some embodiments of the present technology.

Various embodiments of the present technology include designs for superstrates which are based off of NIL fused silica templates. FIG. 8. is an example of a NIL-template-based superstrate for 2D-die pickup that may be used in various embodiments of the present technology. FIG. 9 is an example of a NIL-template-based superstrate for PFB pickup that may be used in some embodiments of the present technology. Fused silica has a low coefficient of thermal expansion, which makes it suitable as a thermally stable substrate during pick-and-place assembly. It is also transparent to visible, UV and near-IR spectra, which permits light transmission during metrology and resist/adhesive curing. It is also relatively easier to machine compared to other hard substrates such as SiC and alumina. Fused silica templates for NIL are commercially available. Unless otherwise stated, two methods will primarily be explored in this disclosure—vapor HF based detack and tether fracture based detack. However, other embodiments of the present technology may use different techniques.

TABLE II

| VAPOR-HF VS TETHER-FRACTURE BASED DETACK | | |
|---|---|---|
| | Vapor HF based detack | Tether Fracture based detack |
| 1 Pickup force magnitude required | Low | High (can be reduced by reducing tether neck dimension and a sparse tether distribution) |
| 2 Pickup time | Few minutes (depends on tether neck dimension, HF etch rate, chamber sealing time and purge time) | Few seconds |

The superstrate assembly could have a single superstrate or multiple connected or unconnected sub-superstrates. In the continuum of possible design choices for the superstrate, one possible asymptotic case is of a superstrate assembly with thousands of individually actuatable sub-superstrates for the thousands of possible picked PFBs.

Figure 10:
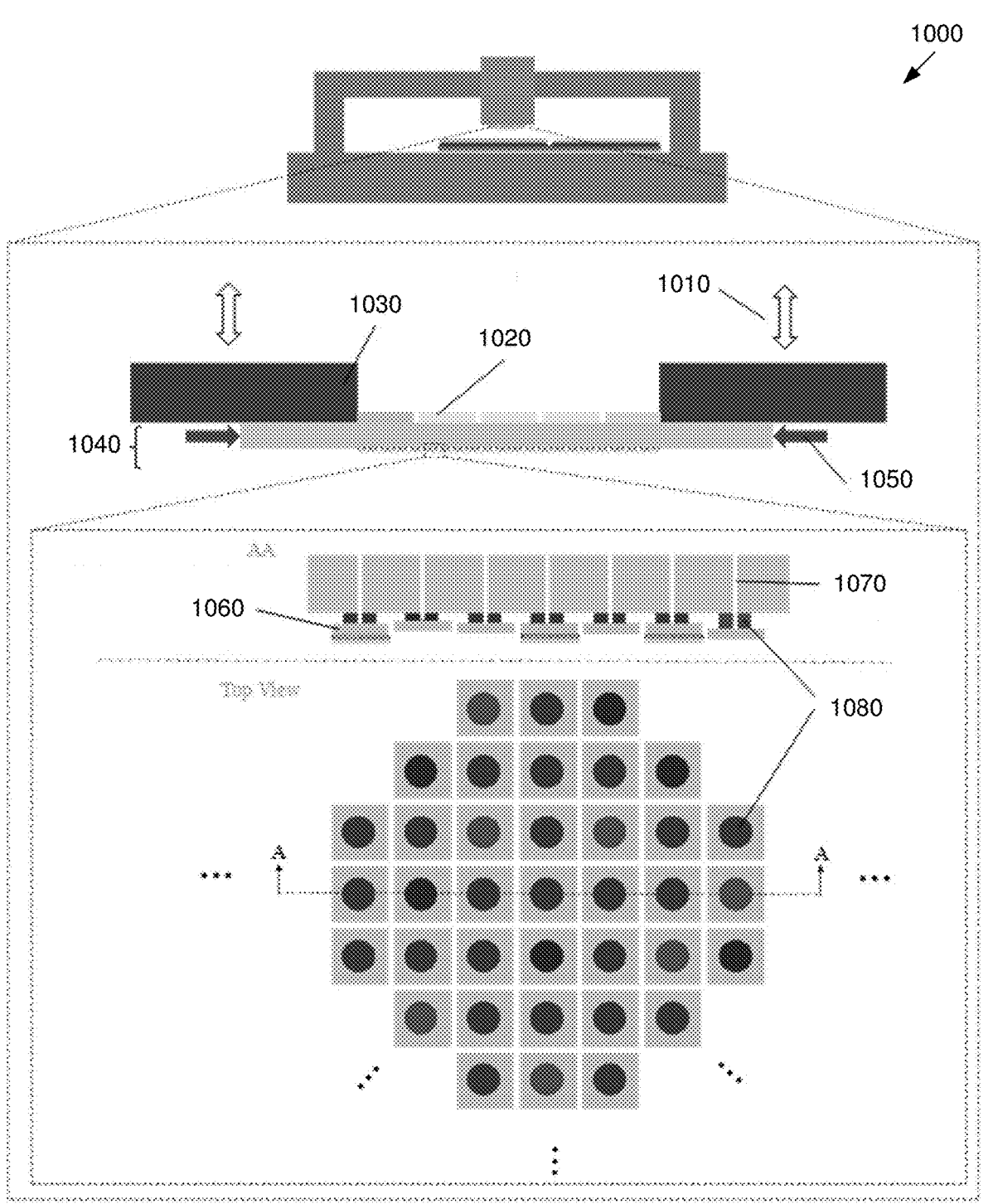
FIG. 10 is an example of a massively-parallel superstrate design that may be used in one or more embodiments of the present technology.

FIG. 10 is an example of a massively-parallel superstrate design 1000 that may be used in one or more embodiments of the present technology. As illustrated in the embodiments shown in FIG. 10, the system can include global z-actuation axes 1010, thermal actuators 1020, superstrate chuck 1030 (e.g., with global airflow and/or etchant routing), massively-parallel superstrate assembly 1040, and magnetic actuators 1050. In some embodiments, the global z-actuation axes 1010 could be voice coil actuators, piezo actuators, etc.

In some embodiments, each sub-superstrate 1060 could be actuated using actuators 1080 (e.g., microscale piezo-electric elements). The global superstrate assembly 1040 and/or sub-superstrates 1060 could have attached thermal actuators 1020, to keep the superstrate at a fixed temperature, or alternatively, to actively vary the temperature of the superstrate for distortion control, for instance, in conjunction with the wafer thermal actuators. The superstrates could additionally use a mag-actuator 1050 setup to distort the superstrate in a controlled manner for overlay correction. Each sub-superstrate assembly could have routing 1070 for sacrificial layer etchants to etch PFB/2D-die tethers in-situ, as well as airflow routing for vacuum pickup.

Figure 11:
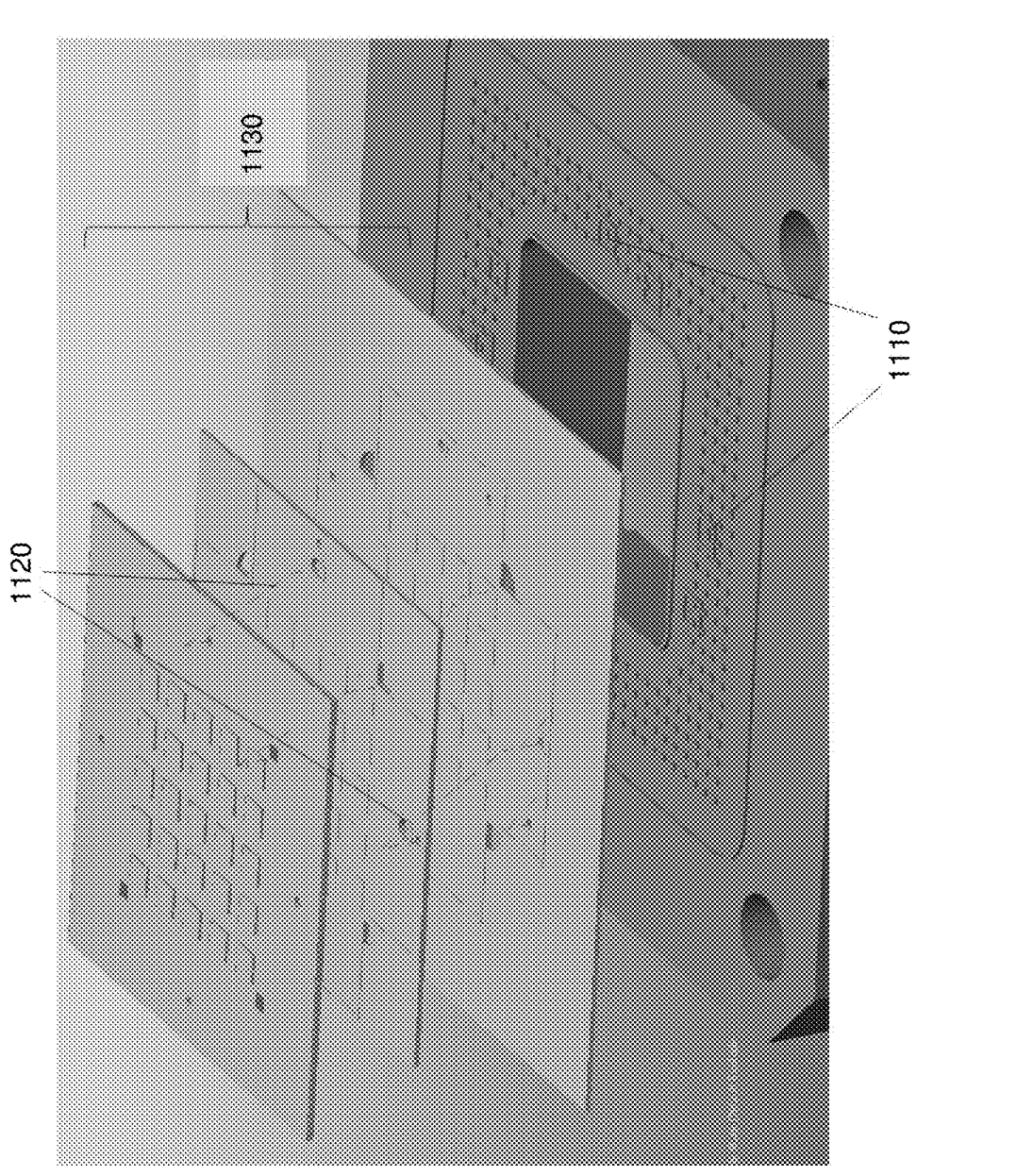
FIG. 11 is an example of a multi-zone superstrate chuck that may be used in various embodiments of the present technology.

FIG. 11 is an example of a multi-zone superstrate chuck 1100 that may be used in various embodiments of the present technology. The embodiments of the superstrate chuck illustrated in FIG. 11 could have multiple zones 1110, to provide a global source for airflow and etchant routes 1120 within a multi-layer superstrate assembly 1130. In some embodiments, to protect the tool from corrosive etchants, the gas route could be coated with Teflon, aluminum oxide, or some other inert material. Additionally, to ensure further protection from leaks, and or corrosion, the global air-flow could be directed away from the critical parts in the tool and into a waste outlet. Additionally, air curtains could be established to further arrest the spread of any leaked etchant.

To contain the gaseous etchants inside the in-situ etch chamber, o-rings made of Teflon, for instance, could be used to seal the chamber. Since the intent in vapor HF based detack is only to separate the 2D-die as quickly as possible, and not the transient rate-uniformity of the etch, the vapor HF etching could be done at elevated temperatures using thermal actuators on the superstrate and the wafer chuck, and/or heating the vapor HF itself prior to entry into the etch chamber.

The superstrate vacuum holes, in a superstrate made of fused silica, could be made using computer numerical controlled (CNC) machining, laser machining, or a variety of other material removal techniques. The pins shown in FIGS. 8 and 9 could be made using chemical etching techniques such as buffered oxide etching, vapor HF etching etc.

Heterogenous Material Assembly

Figure 12:
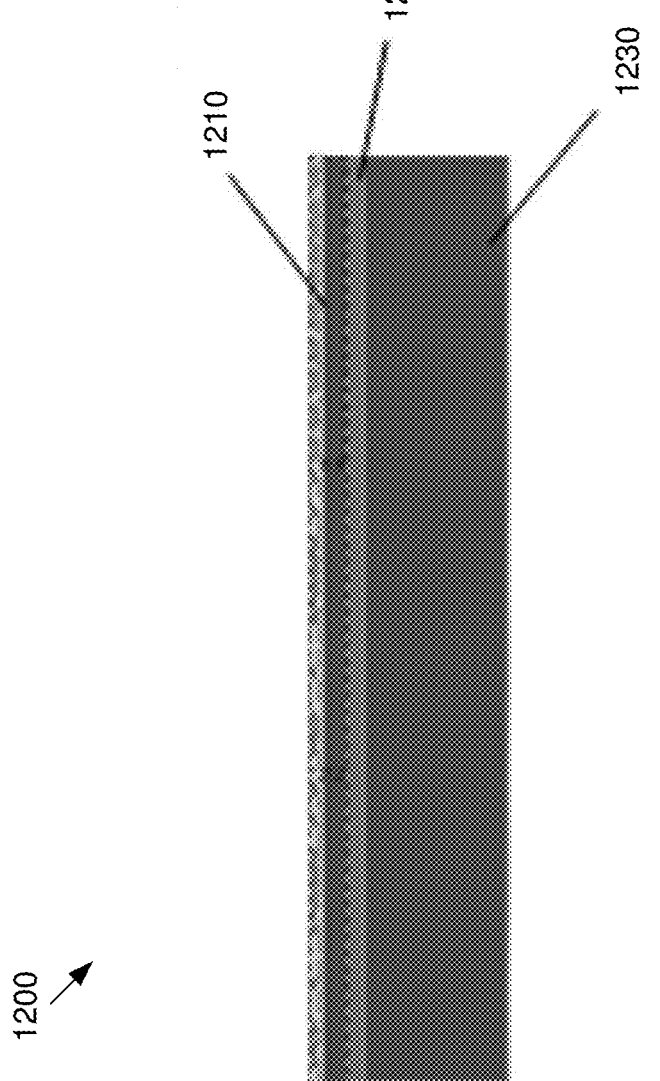
FIG. 12 is an example of a non-silicon source wafer for pick-and-place that may be used in some embodiments of the present technology.

Various embodiments of the present technology can use 2D-dies/PFBs made of non-silicon semiconductor materials such as GaAs, InP, etc in pick-and-place assembly. One possible method for pick-and-place of 2D-dies/PFBs made of GaAs, InP, etc. is to have a suitable buried sacrificial layer that can be selectively etched-off, preferably using a gaseous reactant. The encapsulation layer for these PFBs could consist of materials such as PTFE, parylene, spin-on-carbon, etc which are resistant to the vapor etchant. FIG. 12 is an example of a non-silicon source wafer 1200 for pick-and-place that may be used in some embodiments of the present technology. In the embodiments illustrated in FIG. 12, non-silicon source wafer 1200 can include device layer 1210, sacrificial layer 1220, and bulk layer 1230. Multiple groups have explored this previously. See Table III for a summary of these efforts.

TABLE III

| | III-V SACRIFICIAL LAYER AND ETCHANT CHOICES | | |
|---|---|---|---|
| | Material (device and bulk) | Sacrificial layer | Etchant |
| 1 | GaAs | AlAs, InAlP | HCl |
| 2 | GaN | ZnO | HCl |
| 3 | InAs | AlSb | HF |
| 4 | InP | InGaAs, InAlAs | FeCl3:H2O |

M2A2 Cost-Sharing Paradigm

Figure 13:
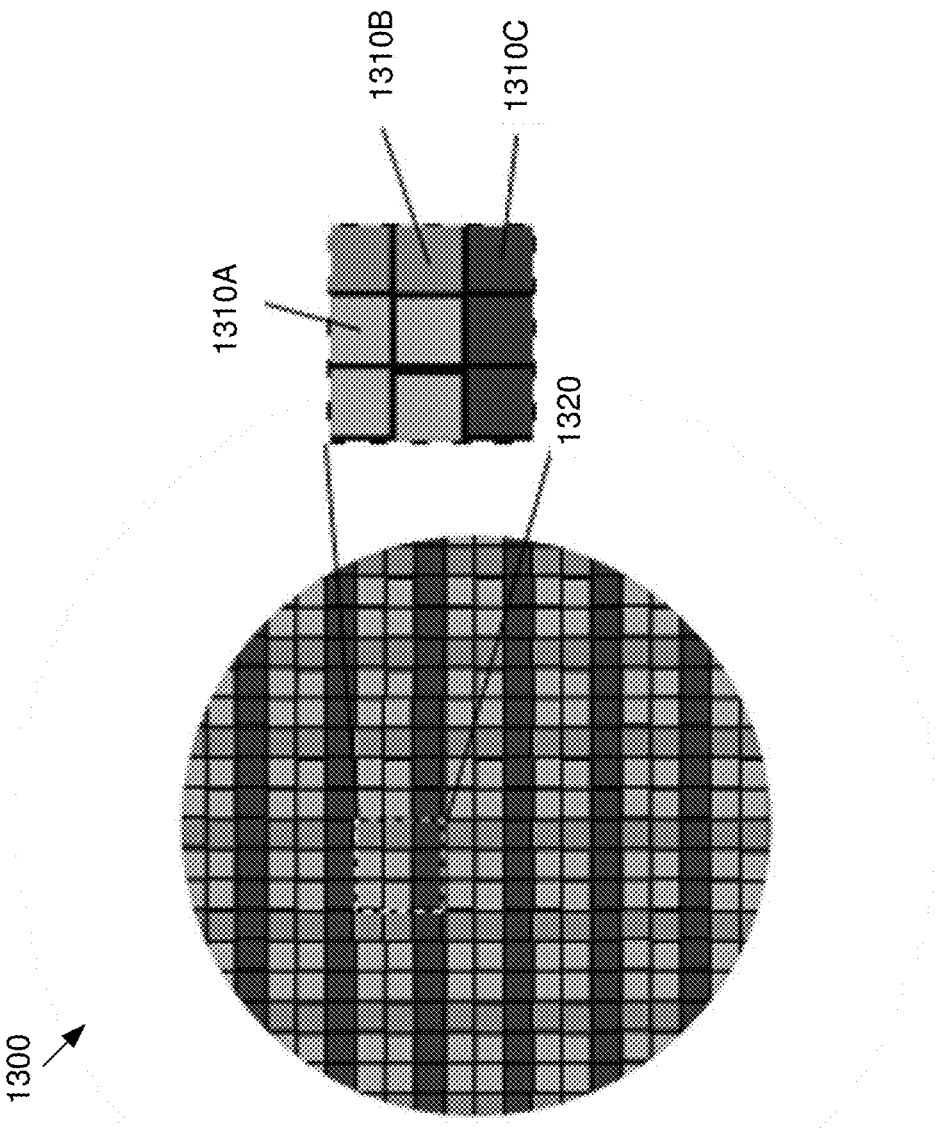
FIG. 13 illustrates an example of a source wafer containing all PFBs in each wafer field in accordance with one or more embodiments of the present technology.

Some embodiments may use separate source wafers for individual PFBs. However, this does not necessarily have to be the case. A single source wafer could possibly have multiple kinds of PFBs. FIG. 13 illustrates an example of a source wafer 1300 containing all PFBs 1310A-1310C in each wafer field 1320 in accordance with one or more embodiments of the present technology. Other embodiments may include more or less types of PFBs on the source wafer. When every PFB needed for the design is present on a single wafer only one high-expense mask would have to be made, and the maximal mask-cost amortization would be achieved. M2A2 Paradigm: PFB Assembly+Custom Metal Dies (CMDS)

While in some embodiments, once the PFB layer is assembled the wafer may be sent back into a fab for subsequent metallization. For many situations/applications this might not be preferred. For instance, a metallization fab might not accept wafers which have been processed using a non-standard equipment such as the pick-and-place assembler. For applications with security concerns (e.g., defense applications) and in highly competitive domains (e.g., emerging machine learning applications), the designer might not prefer for the wafer to go back into a third-party metallization fab, but might not have the resources to own a personal fab.

As one possible solution to the above, the metallization structure itself could be made as a 2D-die on a wafer with a buried sacrificial layer—a Custom Metal Die (CMD), and picked-and-placed on top of the PFB layer. This way, the pick-and-place assembly step would now be the last step in the entire circuit fabrication process. It should be noted that PFB and CMD fabrication could be performed at separate fabs. This might be valuable in case the designer has a preferred fab for CMDs which is distinct from the PFB fab.

Figure 14:
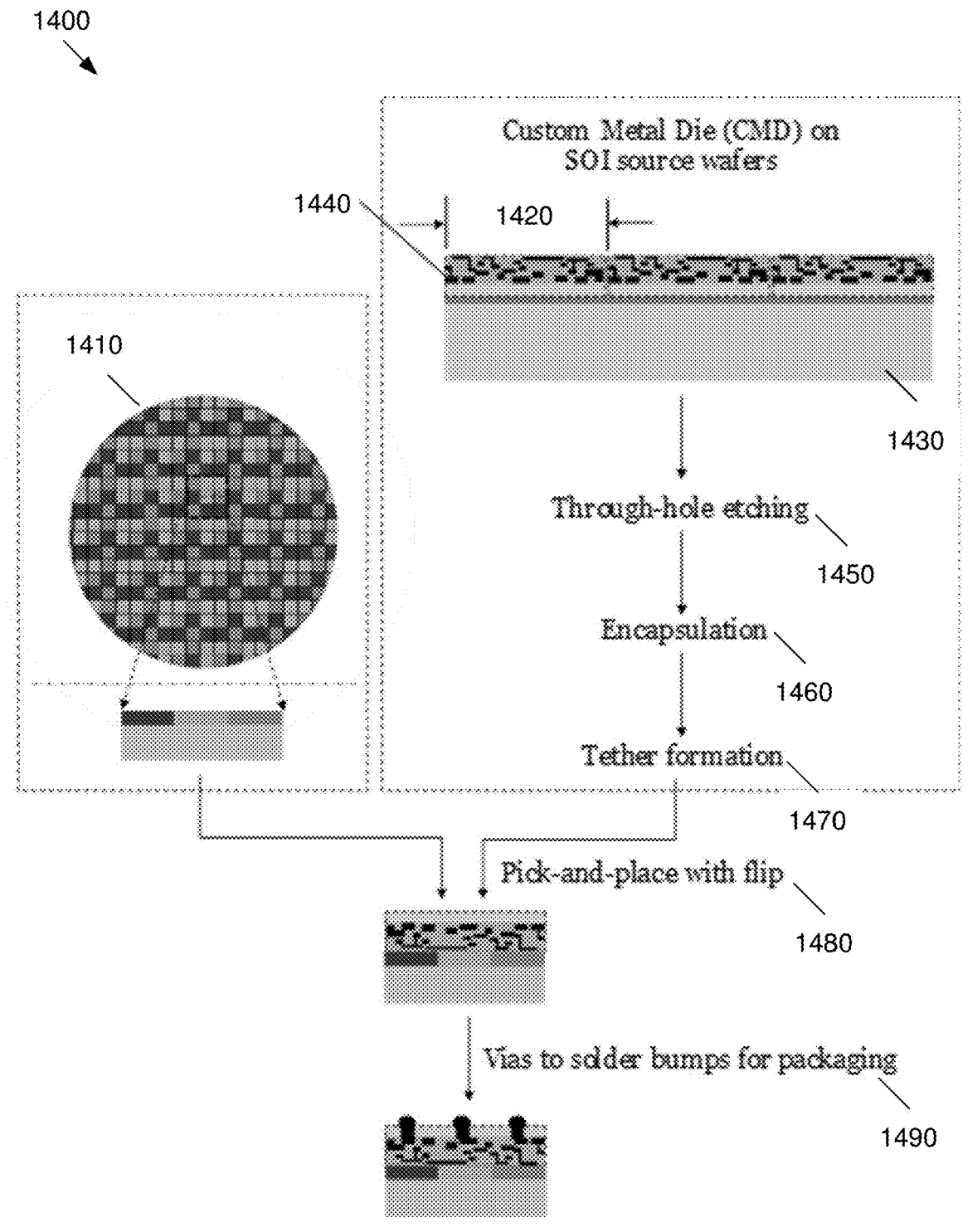
FIG. 14 is an example of a sequence for assembly of CMDs fabricated on SOI wafers in accordance with various embodiments of the present technology.

FIG. 14 is an example of a sequence 1400 for assembly of CMDs fabricated on Sal wafers in accordance with various embodiments of the present technology. As illustrated in FIG. 14, a product wafer 1410 with assembled PFB layer can be used along CMD 1420 on Sol wafer 1430. Note that the metal size (and pitch) can decrease with increasing layer number 1440. This allows the correct metal pitch to face the PFB upon flipping of the CMD. As illustrated in FIG. 14, the process can include variety of steps such as through-hole etching 1450, encapsulation 1460, tether formation 1470, and pick-and-place 1480 (with or without flip) could be performed using processes that have previously been described in D1, D2 and this disclosure. In addition, in the embodiments shown in FIG. 14, vias would have to be drilled through the thin silicon layer in the flipped CMD to access solder bumps 1460 for circuit packaging.

Figure 15:
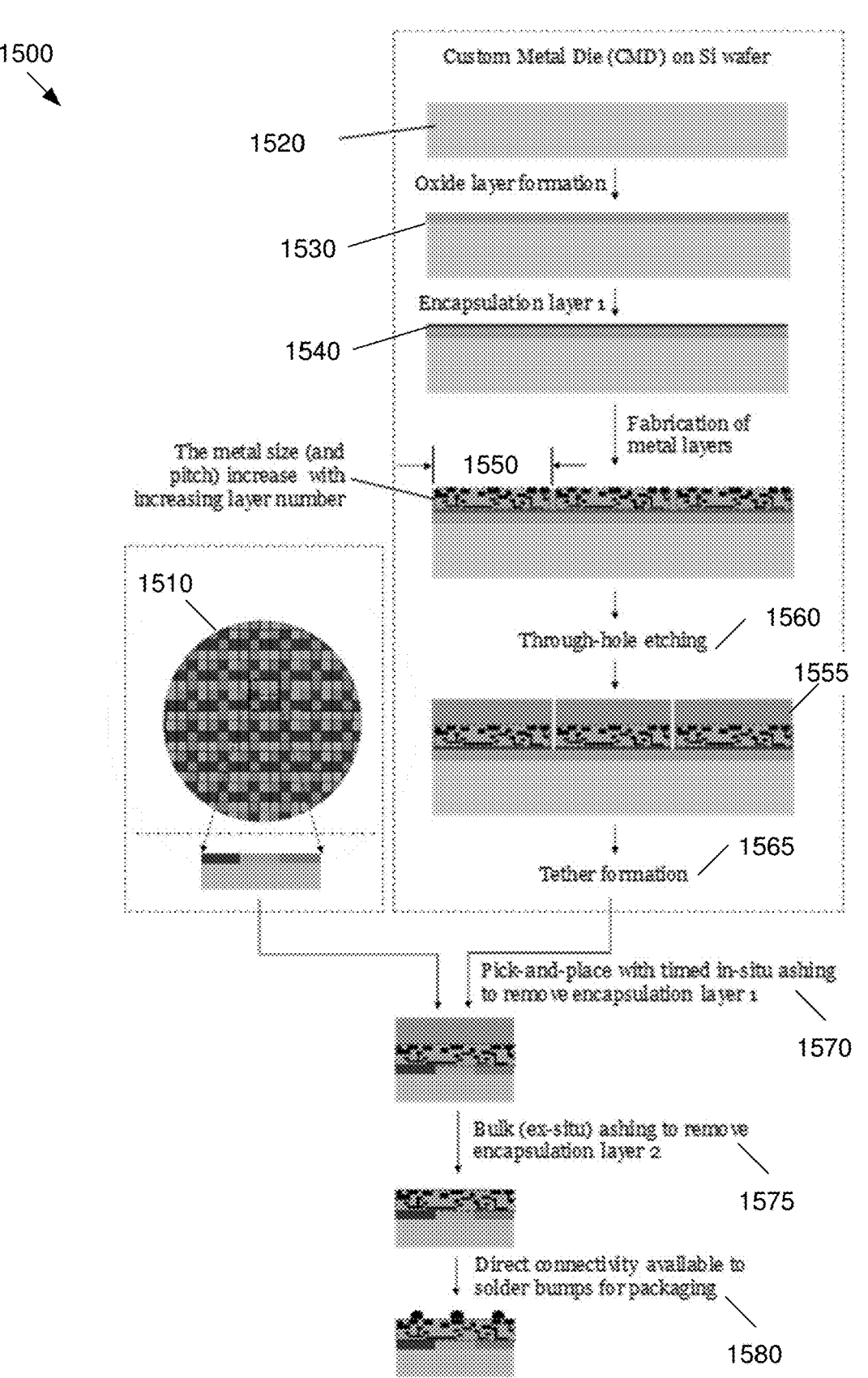
FIG. 15 is an example of a sequence for assembly of CMDs fabricated on Si wafers in accordance with some embodiments of the present technology.

FIG. 15 is an example of a sequence 1500 for assembly of CMDs fabricated on Si wafers in accordance with some embodiments of the present technology. In the embodiments illustrated in FIG. 15, a product wafer 1510 with assembled PFB layer can be provided while the CMD can be created on the Si wafer 1520. First an oxide layer 1430 can be formed on top of the Si wafer 1520 and then encapsulated with an encapsulation layer 1540, before fabrication of the metal layers to create CMD 1550. In Some embodiments a second encapsulation layer 1555 can be created to cover the CMD 1550. Then, through-hole etching 1560, tether formation 1565, and pick-and-place 1570 (with or without flip). In the embodiments illustrated in FIG. 15, oxide layer deposition on Si could be achieved using standard semiconductor process such as chemical vapor deposition (CVD), physical vapor deposition (PVD), etc. In-situ ashing 1575 could be achieved using an in-tool oxygen plasma chamber. The ashing process could be timed so that the ashing stops once encapsulation layer 1, which would generally be thinner than encapsulation layer 2, is etched off.

Note that in the sequence in FIG. 15, the encapsulation layer is quite thick. This is to provide additional mechanical support to the oxide layer during pick-and-place. The encapsulation layer material should be resistant to sacrificial layer etchants, be compatible with standard semiconductor processes, and be easily etchable (preferably with a gaseous etchant) once pick-and-place has been done. This allows direct connectivity 1580 to the solder bumps for packaging Table IV provides a list of potential choices.

TABLE IV

| | ENCAPSULATION LAYER MATERIAL CHOICES | | |
|---|---|---|---|
| | Material | Preferred for encapsulation layer # | Etch rate in vHF (nm/min) | Etchant for post vHF strip |
| 1 | Parylene | 1 | ~0 | O₂ plasma |
| 2 | Polyimide (spin-on) | 1 | ~0 | O₂ plasma |
| 3 | Poly Silicon | 2 | ~0 | XeF2 (timed) |
| 4 | Al | 2 | ~0 | KOH |
| 5 | Al₂O₃ | 2 | ~0 | KOH |

M2A2/3D IC Paradigm: Assembly of Wafer-Thick PFBS/CMDS/2D-Dies

While some embodiments may make use of a sacrificial layer (see, e.g., 1220 in FIG. 12) to facilitate the separation of PFBs/CMDs/2D-dies from the bulk substrate, this configuration might not be preferable in a variety of applications. For example, such configurations may not be preferred where such wafers with buried sacrificial layers are not available and/or are not compatible with standard processes in a fab. As a solution to the above, pick-and-place could be implemented with 2D-dies/PFBs that are wafer thick. The 2D-die/PFB substrate, as before, could be Si, GaN, GaAs, or a variety of other materials.

Figure 16:
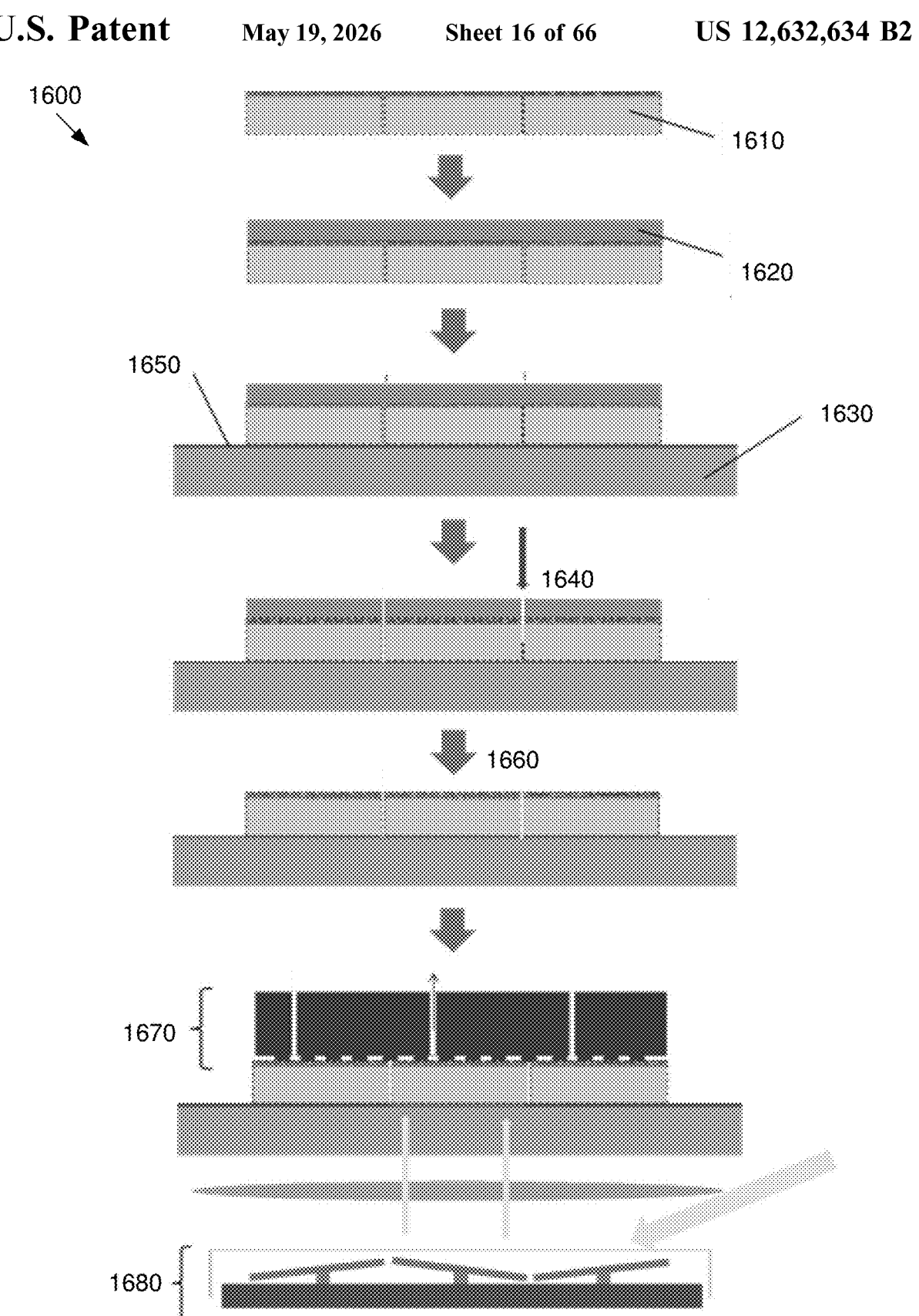
FIG. 16 is an example of a sequence for pick-and-place assembly of PFBs/2D-dies/CMDs on regular Si wafers in accordance with one or more embodiments of the present technology.

FIG. 16 shows a sequence 1600 where a source wafer is first bonded onto a transparent and thermally conductive carrier substrate using a UV-detacking adhesive. The source wafer 1610 (e.g., 2D-dies/PFBs on a regular Si wafer) could be coated with an encapsulation layer 3 1620. In some embodiments, encapsulation can be done prior to the bonding step, to protect it from contaminants from the carrier substrate 1630, and from debris created during the dicing process. The carrier substrate can be a transparent, head-conductive carrier substrate in some embodiments. Encapsulation can be relevant for non-semiconductor grade carrier substrates, the fabrication processes of which are generally not optimized to attain semiconductor-grade particle levels.

This encapsulation layer could, for instance, be made of polyimide. Wafer dicing 1640 is done next to singulate 2D-dies/PFBs. Dicing could be done using ablative processes such as laser cutting, and/or chemical processes such as metal assisted chemical etching (MACE) which has shown the ability to etch deep holes in silicon. Any heat generated during the dicing process would be transported away through the conductive carrier substrate.

In situ ashing 1660 can be performed to remove the encapsulation layer before pickup by pick and place superstrate 1670. The 2D-dies/PFBs could be selectively detacked using selective UV exposure of the UV-detacking adhesive 1650 through a digital micromirror device (DMD) 1680. Sample choices for the carrier substrate could be sapphire, transparent SiC and display grade glass. The display glass could have microscale pin-holes to improve its conductivity.

Figure 17:
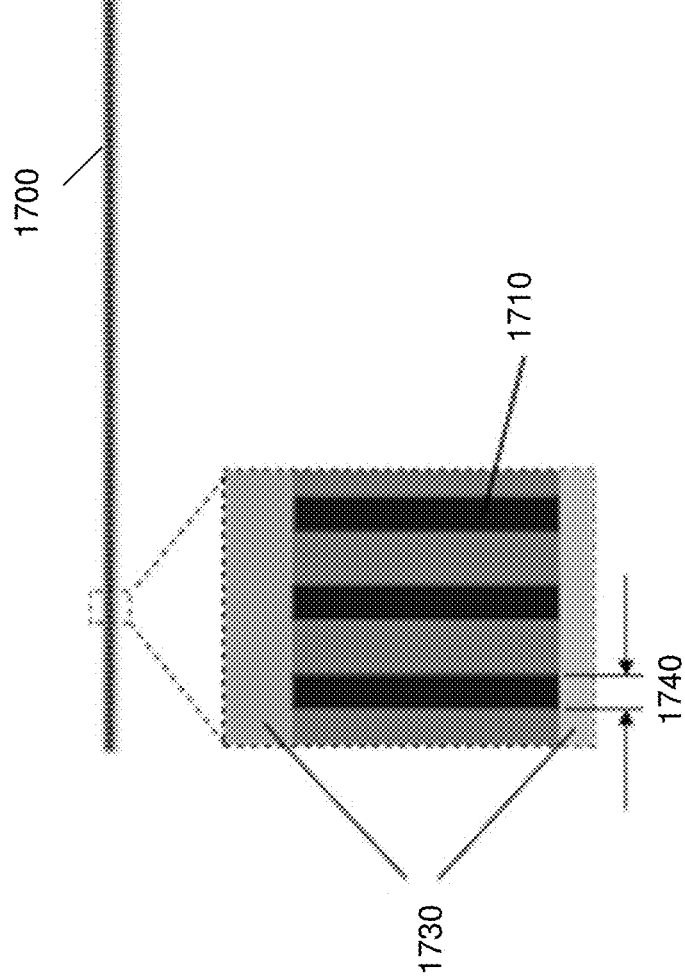
FIG. 17 is an example of a schematic of a carrier substrate with microscale pinholes to improve thermal conductivity that may be used in various embodiments of the present technology.

FIG. 17 is an example of a schematic of a carrier substrate 1700 with microscale pinholes 1710 to improve thermal conductivity that may be used in various embodiments of the present technology. The pinholes 1710 could be filled using thermally conductive materials, which could be transparent as well, such as indium tin oxide (ITO), aluminum-doped zinc oxide (AZO), etc. The glass substrate 1720 could additionally have transparent, conductive films of ITO, AZO, and/or metal meshes of, for instance copper, coating its top and bottom sides. The diameter 1740 of pinholes 1710 could be 10s of microns to 100$s$ of microns in some embodiments.

Alternatively, in FIG. 16, 2D-dies/PFBs could be selectively detacked using infrared (IR) radiation-curable hydrogel-based adhesives. With these, regular silicon wafers could be used as carrier wafers since silicon transmits IR radiation quite well.

Figure 18:
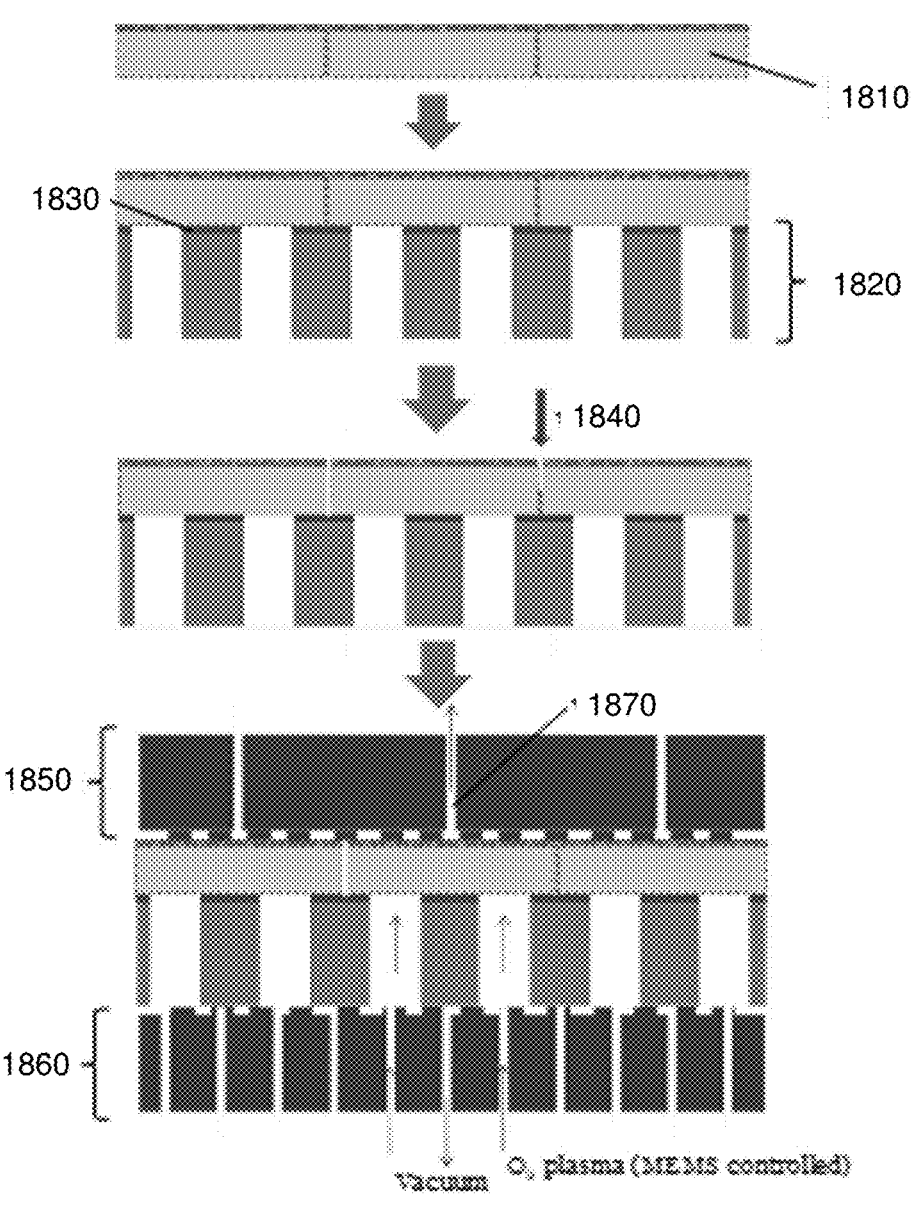
FIG. 18 is an example of a sequence for pick-and-place assembly of PFBs/2D-dies/CMDs on regular Si wafers, on a roll-to-roll carrier substrate in accordance with some embodiments of the present technology.

FIG. 18 shows a sequence 1800 where a source wafer is bonded onto a roll-to-roll metal substrate with micro-perforations. Source wafer 1810 (e.g., with 2D-dies or PFBs on a regular Si wafer) can be provided. The source wafer can be aligned with roll-to-roll carrier substrate 1820 with micro-perforations. In some embodiments, a slot-die coated adhesive 1830 may be used. Wafer dicing 1840 can be done next to singulate 2D-dies/PFBs. Any heat generated during the dicing process could be transported away through the conductive metal substrate. The 2D-dies/PFBs could then be individually detacked using selective $O_2$ plasma ashing of the adhesive between the bonded 2D-dies/PFBs. Superstrate 1850 and chuck 1860 can be used to pick and place the dies. In accordance with some embodiments, superstrate 1850 and chuck 1860 can include vacuum holes 1870 A possible choice of material for the metal roll could be steel. The micro-perforations could be made using anisotropic processes such as reactive ion etching (RIE), laser machining, focused ion beam (FIB) machining, etc. This method has the advantage of being able to perform the pick-and-place assembly on a roll-to-roll system which could improve the throughput of the assembly process.

Fabrication of Super-Sized Dies Using PFB+CMD Assembly

For applications requiring die sizes that are larger than the standard lithographic field of 26 mm×33 mm, CMDs could be tessellated over the PFB layer, possibly in multi-layer stacks, such that they straddle 26 mm×33 mm field regions and ensure die-wide metal connectivity. It should be noted that this does not have to be a high-mix, low-volume application, and therefore the PFBs could be field-scale in dimension and custom-made for each new device.

Design and EDA for Super-Sized FPGAS and Asics Using M2A2 Technology

One of the major benefits of M2A2 technology is that it can enable fabrication of super-sized dies which have dimensions greater than the field size. Due to field size limitations of 26 mm*33 mm in current lithography technology, super-sized dies cannot be manufactured using existing commercial fabrication technologies cannot be fabricated. Furthermore, if the size of the die approaches field size, the yield decreases significantly. However, using M2A2 technology, the ASIC or FPGA die can be segmented into multiple smaller dice/partitions and then assembled/knitted using pick-and-place mechanism. The following sub-sections describe the methodology to segment ASICs, or FPGAs into smaller dice/partitions, and the EDA methodology required to design and knit each of the smaller die/partition.

Various embodiments of the present technology include techniques to segment ASIC or FPGA into smaller partitions and designing these partitions. FPGA or ASIC SoC can be designed using existing commercial/conventional or using any other EDA flows. Then, FPGA or ASIC large die can be divided into multiple smaller dice/partitions using any of the following ways: (1) random segmentation into partitions of desired small size, (2) uniformly segmenting based on physical coordinates to achieve smaller sized partitions, (3) partitioning based on optimization of some objective function using any of the optimization techniques, some of which are min-cut, min-flow, linear/non-linear discrete optimization, annealing, ML driven learning techniques, etc. using in-house, $3^{rd}$ party or newly developed software/hardware tools.

Once the partitions are designed, inter-partition connections are wired with higher metal layers using custom metal die (CMD). Each partition consists of base layer and front-end interconnects, and CMD comprises of higher metal layer(s) to route connections between different partitions. These higher metal layer connections can be routed using existing commercial EDA tools or any in-house/$3^{rd}$ party or newly developed software tools. There may or may not exist any routing constrains such as higher pitch, higher width, extra routing blockages in comparison to ASIC flow.

Figure 19:
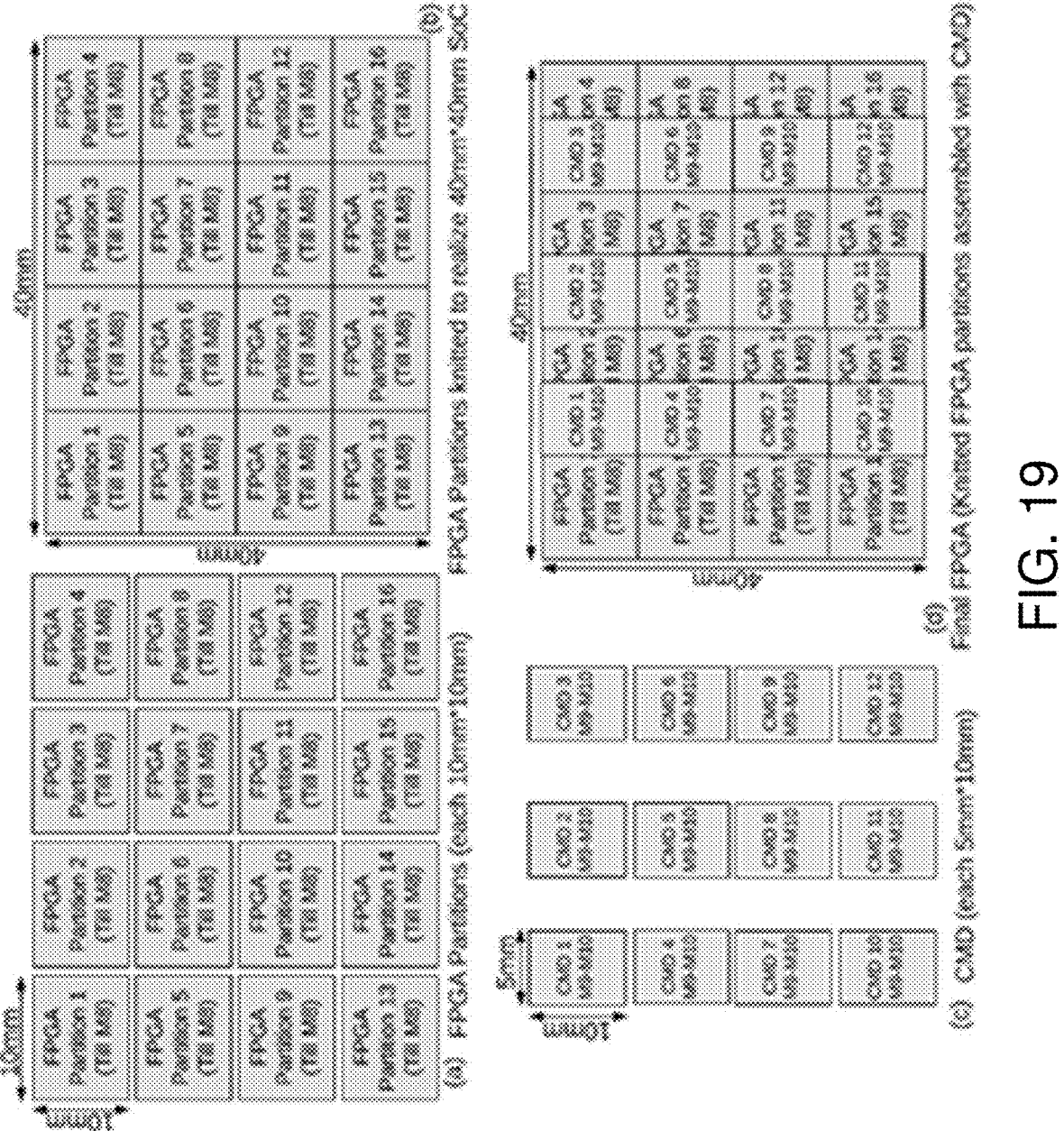
FIG. 19 is an example of a sequence for manufacturing (designing and knitting) super-sized FPGAs in accordance with one or more embodiments of the present technology.
Figure 20:
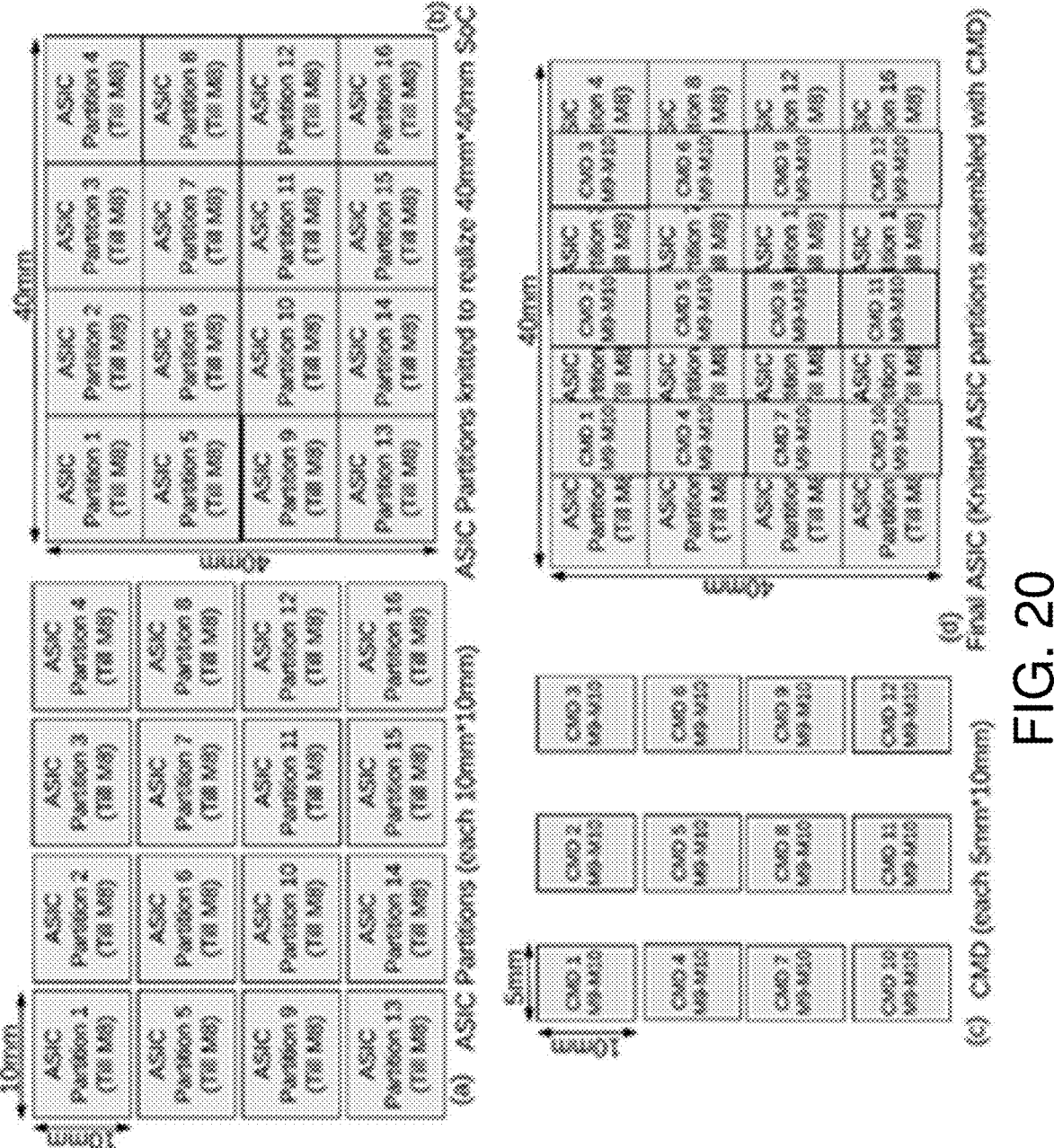
FIG. 20 is an example of a sequence for manufacturing (designing and knitting) super-sized ASICs in accordance with various embodiments of the present technology.

FIGS. 19-20 illustrate the concept of designing a super-sized FPGA and ASIC SoC using M2A2 technology. However, these embodiments are included just for the illustration purpose, and the possible designing and partitioning approaches are not limited to the ones shown in embodiments.

Design and EDA for PFB Based Domain Specific SOCS

Various embodiments of the present technology can use circuit design and EDA methodology to implement and design PFB based configurable, and/or high performance and/or low power domain specific SoC. A specific SoC generally means an SoC (system on chip) which implements functionality for a given domain. For example, SoC implementing an image classifier belongs to a one domain, whereas SoC performing communication operations belong to another domain. Circuit design and EDA techniques have been implemented for PFB configurable hardware accelerators domain SoCs. However, the idea of designing PFB configurable domain specific SoCs is not limited to only hardware accelerators, but can be extended to other domains such as communication, processors, controllers, high performance computing (HPCs) for servers, etc.

In recent years, there has been exponential increase in the use of sensors for smart applications. This has led to explosion in the data collected by sensors. Machine learning plays a pivotal role in extracting meaningful information from sensors data. Machine learning typically makes use of neural network techniques to extract meaningful information. In this analysis, a significant amount of computation is required since data is collected in high volume at high rate. This necessitates the need for specialized hardware which can perform highly energy efficient operations (termed as hardware accelerators). The computation can be performed either at cloud or at an edge level. The computation at cloud can result in bandwidth issues. Furthermore, high energy cost of communication is associated with cloud computing. Thus, there is an increasing need to perform the analysis locally at the sensor (edge) rather than doing it in the cloud. Edge computing also addresses important concerns related to privacy, latency and security. However, edge computing devices have stringent constraints on energy consumption and requires prolonged battery life. Thus, there is a need to come up with accurate and energy efficient circuits for edge computing.

The machine learning algorithms are rapidly evolving to achieve better performance/accuracy. Further, different tasks such as image classification, video classification, speech recognition, etc. in hardware accelerators requires different types of neural network architectures (different types of CNNs (convolution neural networks) and RNNs (recurrent neural networks) architectures). Thus, number of devices/SoCs required to implement a specific application in this domain are low yet requires high performance energy efficiency. With CMOS process technology scaling, the mask cost for fabricating nano-scale structures has become prohibitively expensive for these low-volume ASIC applications, thereby forcing towards highly sub-optimal FPGAs.

Using M2A2 technology, various embodiments of the present technology offer the following benefits for these types of SoCs: (1) configurability to designers to implement newly evolved neural network architectures using existing circuits (designed for existing neural networks). (2) using same PFBs across CNN, or RNN architectures. For example: same PFB can be used to implement convolution layer in LeNet-5 and AlexNet architectures. (3) using same PFBs across multiple neural network types, i.e. using same PFB to design CNNs, or RNNs, etc. In this way, mask cost can be shared across multiple variants and types of neural networks implementing variety of applications in domain of hardware accelerators. Thus, configurable and energy efficient circuits for applications in this domain can be designed using M2A2 technology.

A typical neural network-based ML hardware accelerator comprises of different types of neuron layers such as convolution layers, activation layers, pooling layers, fully connected layers, etc. These layers are implemented in hardware using different signal processing and design domains such as digital logic, analog domain processing, time-domain processing, compute in or compute near memory, mixed-signal design, etc.

Various embodiments of the present technology provide a novel architecture, design and EDA of highly-configurable energy efficient circuits which implement variety of neural network-based machine learning applications. It is worth mentioning that this concept of achieving configurability and energy efficiency by using PFBs is not limited to ML specific domain. The novel architecture and design of energy efficient circuits are described with one or more of the following features—

1. Convolution layers, and/or activation layers, and/or pooling layers and/or fully connected layers and other functionality blocks are implemented by "micro-scale circuits" which we call as PFBs based on one or more of the signal processing techniques: time-domain, and/or analog-domain, and/or mixed-signal domain, compute-in-memory, and/or compute near memory, and/or digital domain processing techniques.

2. There can be multiple type of PFBs, each with different design configurations, which may include one or more of the following circuits:
   a. Static Random Access Memory (SRAM)
   b. Dynamic Random Access Memory (DRAM)
   c. Non-Volatile Memory (NVM)
   d. Digitally synthesized blocks comprising of standard cells/logic gates implementing any functionality
   e. Analog and mixed-signal components like Analog to Digital converter (ADC), and/or Digital to Analog converter (DAC), and/or voltage-controlled oscillators (VCO), and/or time to digital converter (TDC), etc.

3. Each type of PFB comprises of finite number of layers, n, where n>=1. All the components may not be connected and kept open/floating to enable configurability.

4. A typical domain specific SoC comprises of multiple instances of one or more types of PFBs discussed above (#2).

5. A typical domain specific SoC may comprise of custom ASIC blocks, FPGAs, memory blocks, other $3^{rd}$ party IP (intellectual property) blocks, etc.

6. In this type of SoC, the components (PFBs, custom and other blocks) are wired to implement a given functionality.

As mentioned above, PFBs are micro-scale circuits (typically sized from 50 μm*50 μm to 5000 μm*5000 μm) used to realize specific layers of neural network. Each type of PFB can be designed either randomly or keeping in mind any of the objectives/considerations such as power, area, performance, PPA, energy efficiency, data movement reduction, neural network requirements, etc. It should be worth mentioning that design of PFBs is not limited to only these objectives.

Figure 21:
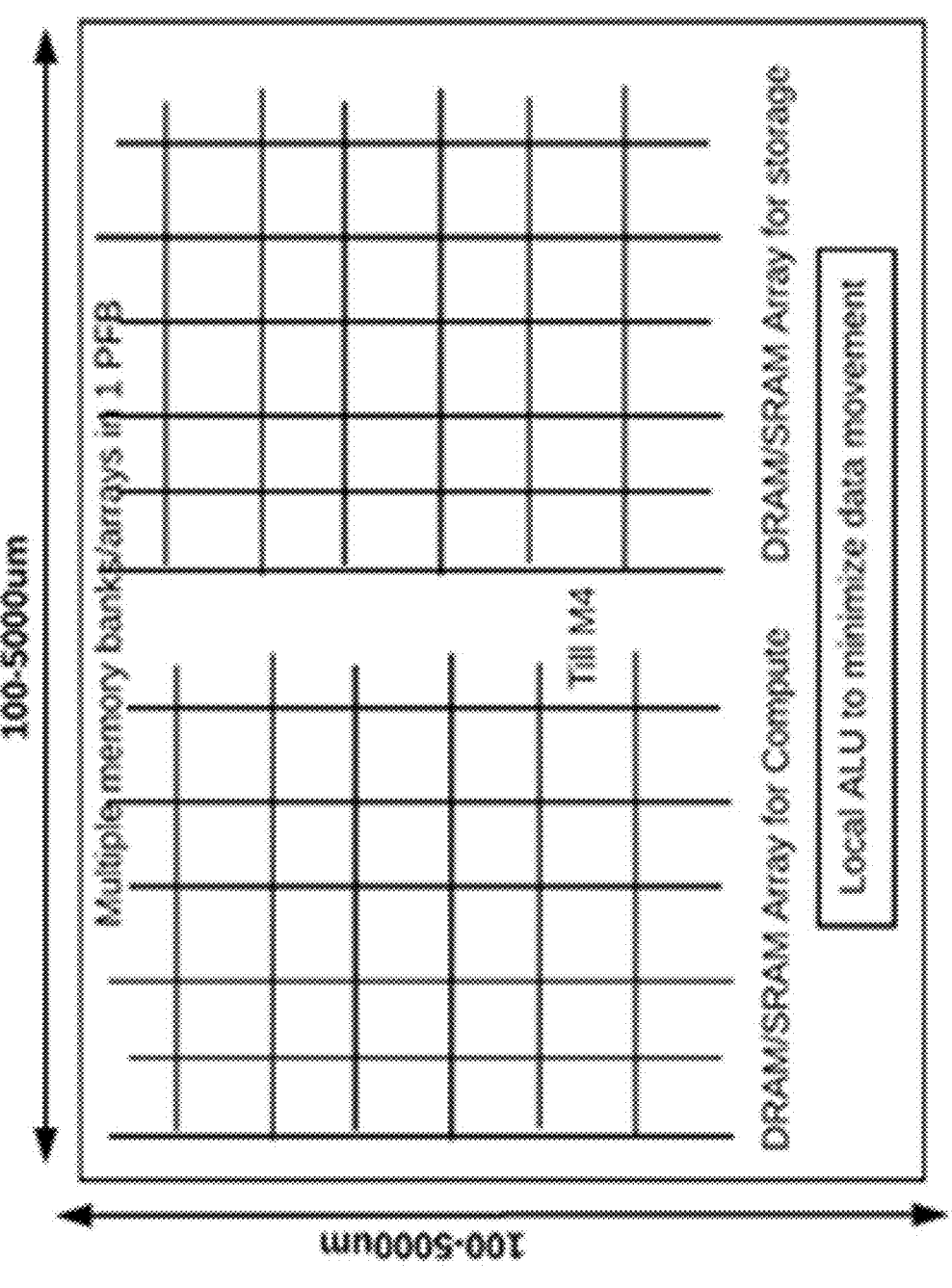
FIG. 21 is an example of a Memory PFB for domain specific SoC that may be used in some embodiments of the present technology.

FIG. 21 is an example of a Memory PFB for domain specific SoC that may be used in some embodiments of the present technology. Memory PFBs can be used for storage and/or compute purposes. The array dimensions can be chosen randomly or based on specifications (storage and compute requirements to optimize PPA, energy efficiency, data movement or any other metric). In case of determining size based on specifications, various techniques can be used, such as graph techniques, optimization techniques (discrete, linear, non-linear, etc.), machine learning based supervised/unsupervised or any other learning techniques, circuit-based design techniques etc. using existing in-house or existing $3^{rd}$ party or newly developed in-house/$3^{rd}$ party software and/or hardware tools.

The memory cells in these types of PFBs may or may not be connected with each other and determined either randomly or based on configurability vs. performance tradeoff using any of the optimization algorithms (few of them mentioned above). This type of PFB comprises of base layer and n metal layers, where n>=1. These PFBs may comprise of any memory technology and technology node, i.e. can be made using SRAM, DRAM, eDRAM, NVM, etc. using any technology node such as 14 nm, 20 nm, 28 nm, 45 nm, etc. FIG. 21 illustrates an example of memory PFBs for domain specific SoCs. However, this embodiment is included just for the illustration purpose, and the possible design configurations of memory PFBs are not limited to the one shown in embodiment.

Figure 22:
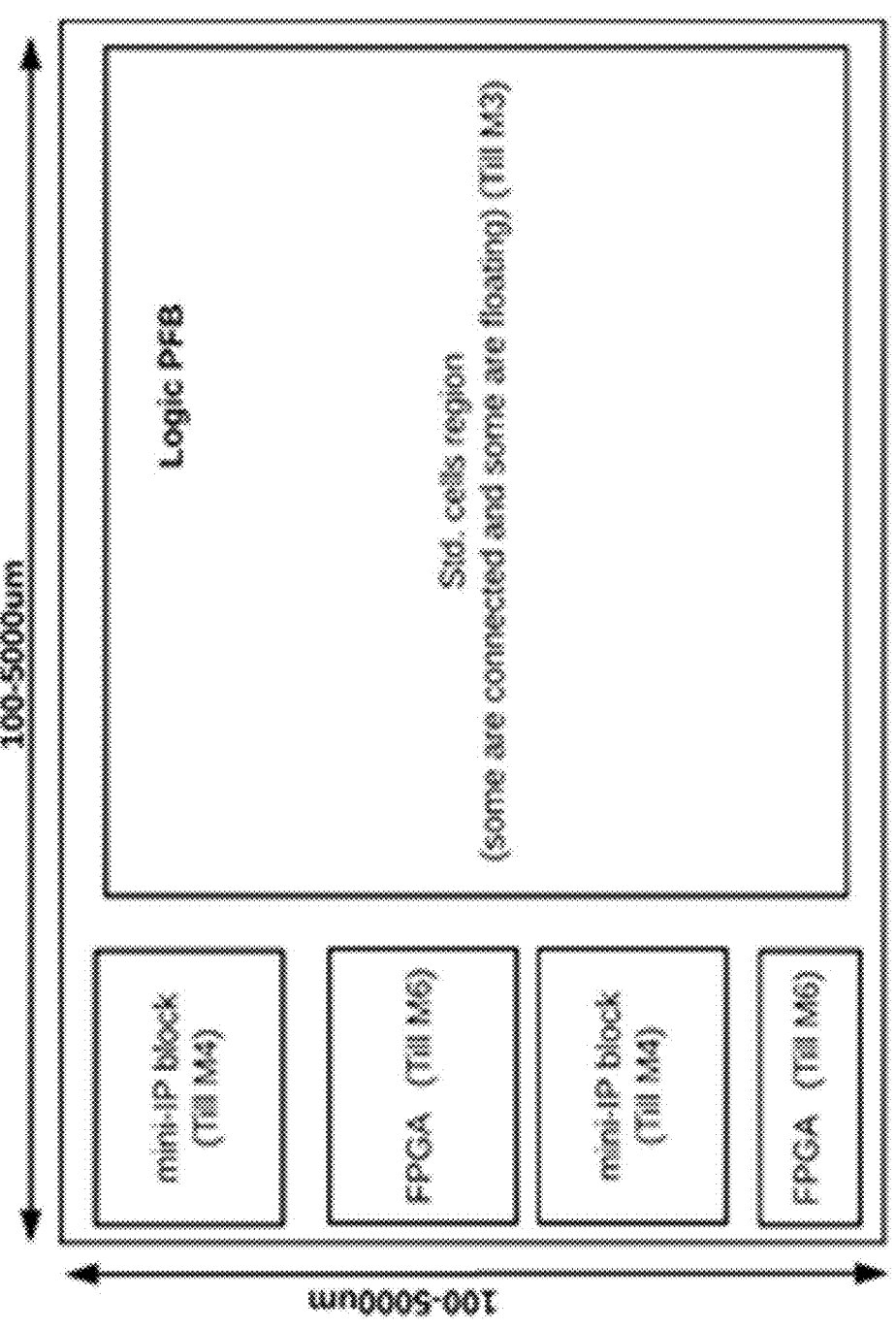
FIG. 22 is an example of a Digital Logic PFB for domain specific SoC that may be used in one or more embodiments of the present technology.

FIG. 22 is an example of a Digital Logic PFB for domain specific SoC that may be used in one or more embodiments of the present technology. Digital Logic PFBs can be used to implement digitally synthesized macro blocks used for computation and other purposes. The standard cells and other components in these PFBs are placed and connected among themselves using n metal layers (n>=1), either randomly or using any of the optimization techniques (graph techniques, optimization techniques (discrete, linear, non-linear, etc.), machine learning based optimizations, circuit based design techniques etc. using existing in-house or existing $3^{rd}$ party or newly developed in-house/$3^{rd}$ party software and/or hardware tools) to optimize for one or more of the following: PPA, power, performance, area, energy efficiency or any other metric.

These PFBs can also comprise of standard mini-IP macro blocks such as comparators, shifters, pulse generators, etc. These IP macro blocks can be designed either in-house or can be provided by $3^{rd}$ party vendors. Further, these PFBs may comprise of FPGAs to implement any specific function. FIG. 22 illustrates an example of an embodiment presenting the concept of digital logic PFBs for domain specific SoCs. However, this embodiment is included just for the illustration purpose, and the possible design configurations of digital logic PFBs are not limited to the one shown in embodiment.

Figure 23:
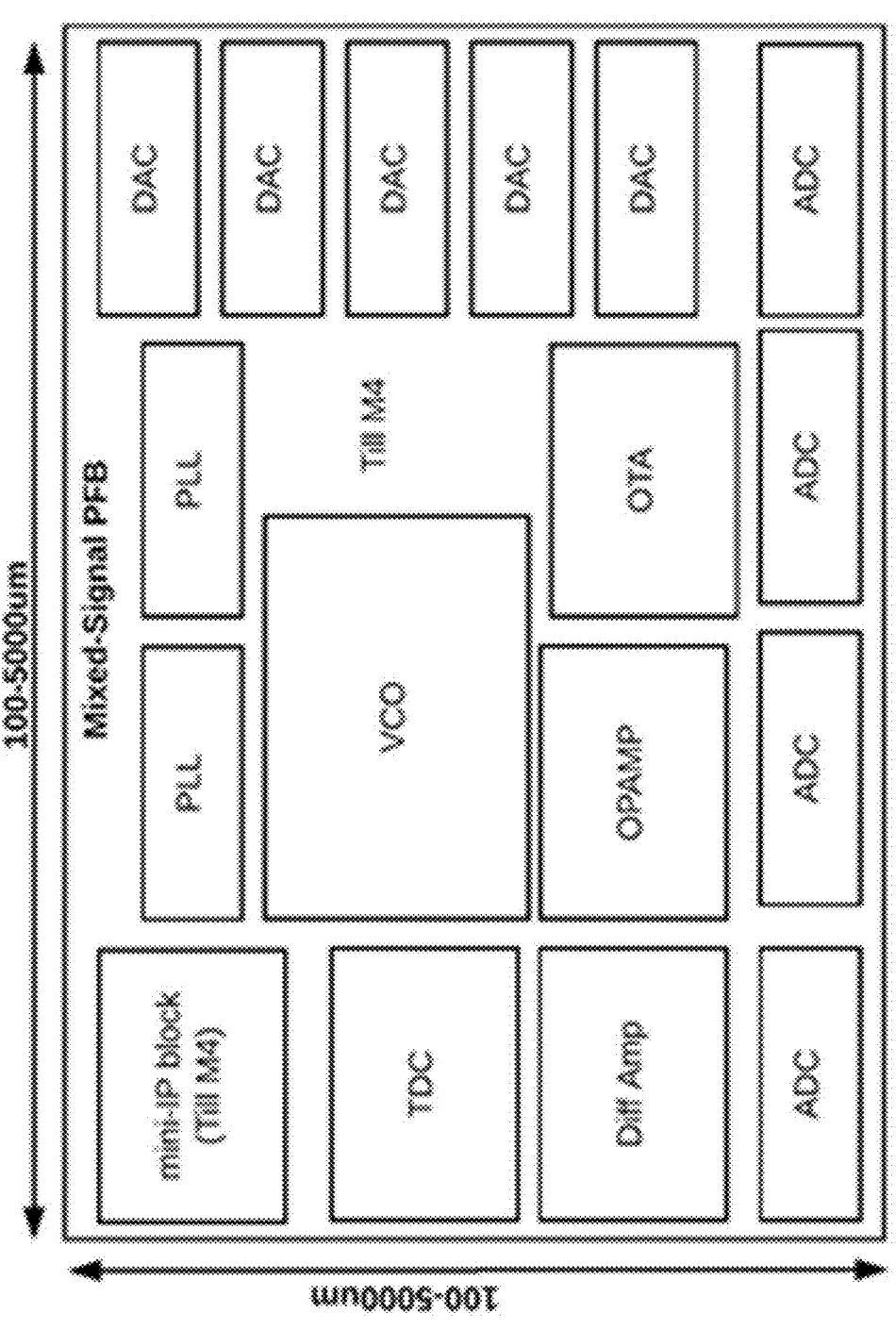
FIG. 23 is an example of a Mixed Signal PFB for domain specific SoC that may be used in various embodiments of the present technology.

FIG. 23 is an example of a Mixed Signal PFB for domain specific SoC that may be used in various embodiments of the present technology. Mixed-Signal and Analog Domain PFBs can be used to implement analog domain signal processing elements such as amplifiers (OPAMP, OTA, differential amplifier, PLL, etc.), VCOs, filters, etc. to generate analog domain signals required in domain specific SoCs. These type of PFBs may or may not comprise of mixed-signal domain elements such as ADCs, DACs, TDCs, DTCs, etc. to implement mixed signal functionality required for analog or mixed signal domain computation (e.g. MAC operation implemented in analog time or voltage domain).

The components in this type of PFBs may or may not be connected with each other using n metal layers, where n>=1. These PFBs can be designed either fully in-house or, some or all components in these types of PFBs can be provided by 3rd party vendors. The placement and selection of which components to place in these types of PFBs are determined either randomly or based on circuit requirements using any of the circuit based or other optimization techniques (few of them mentioned in #1 and #2). FIG. 23 is an example of an embodiment presenting the concept of mixed-signal analog domain PFBs for domain specific SoCs. However, this embodiment is included just for the illustration purpose, and the possible design configurations of mixed-signal/analog-domain PFBs are not limited to the one shown in embodiment.

Some embodiments provide for circuit design and EDA methodology of knitting PFBs, and other IP blocks (FPGAs, custom ASICs, macro-blocks, etc.) to realize domain specific SoCs (example: hardware accelerators) is discussed. The different types of PFBs and other IP blocks can be knitted either randomly or keeping in mind any of the objectives/considerations such as power, area, performance, PPA, energy efficiency, data movement reduction, neural network requirements, etc.

Figure 24:
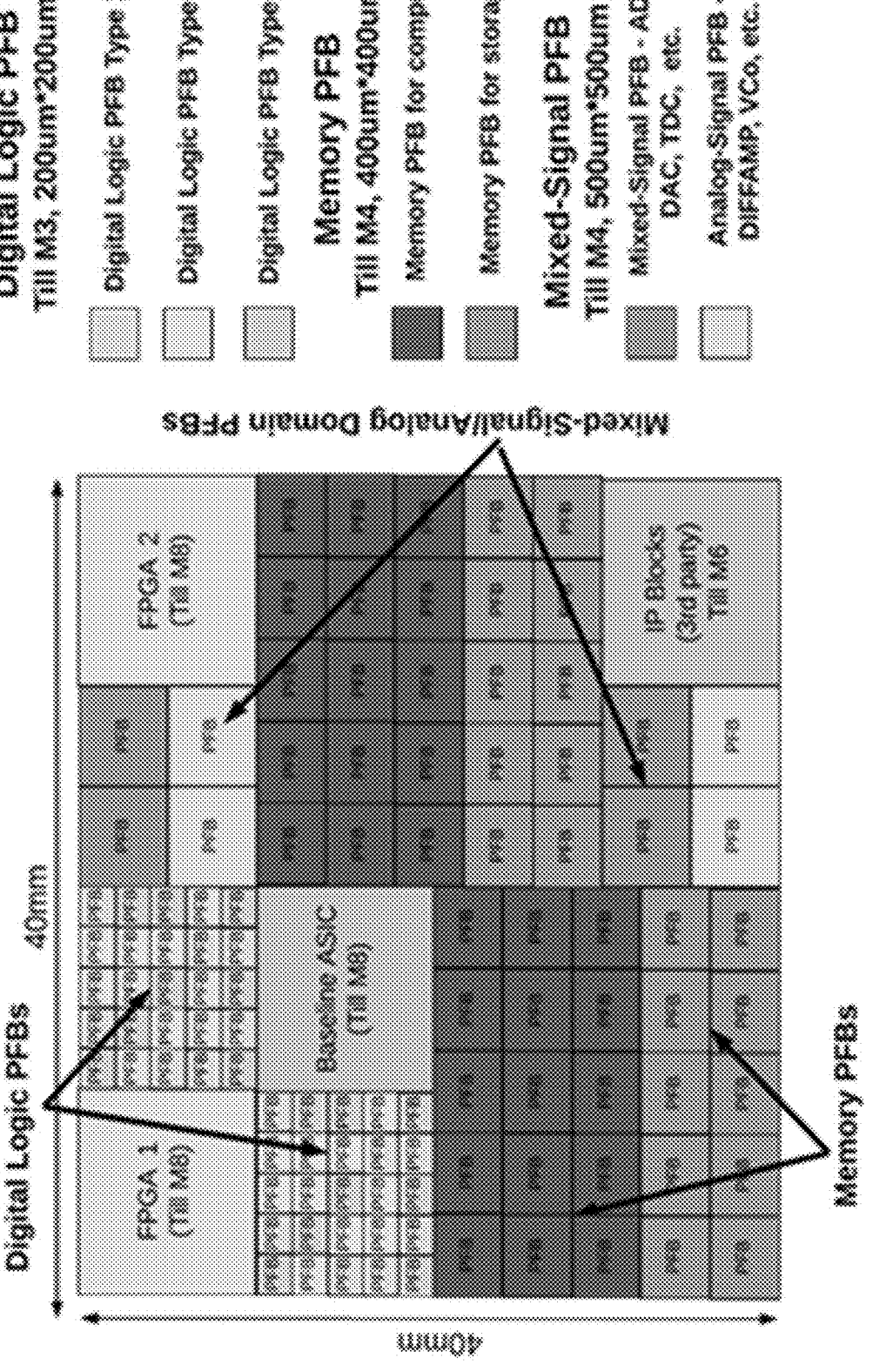
FIG. 24 is an example of a sequence for knitting PFBs, FPGAs, ASICs and other blocks to realize domain specific SoC in accordance with some embodiments of the present technology.

It should be worth mentioning that knitting of PFBs is not limited to only these objectives. In case of knitting PFBs based on optimization of some specific metrics/objectives, various techniques can be used, such as graph techniques, optimization techniques (discrete, linear, non-linear, etc.), machine learning based supervised/unsupervised or any other learning techniques, circuit based design techniques etc. using existing in-house or existing $3^{rd}$ party or newly developed in-house/$3^{rd}$ party software and/or hardware tools. FIG. 24 is an example of a sequence for knitting PFBs, FPGAs, ASICs and other blocks to realize domain specific SoC in accordance with some embodiments of the present technology. However, this embodiment is included just for the illustration purpose, and the possible design configurations of PFB based domain specific SoCs are not limited to the one shown in embodiment.

PFBs knitted SoC comprises of base-layer of transistors and front-end interconnects. The connections between components of same or different PFBs are made using higher metal layers. The PFBs knitted SoC is assembled with custom metal die (CMD). These higher metal layers in CMD can be designed/routed using either existing commercial EDA tools or any in-house/$3^{rd}$ party or newly developed software tools. There may or may not exist any routing constrains such as higher pitch, higher width, extra routing blockages in comparison to ASIC flow.

Figure 25:
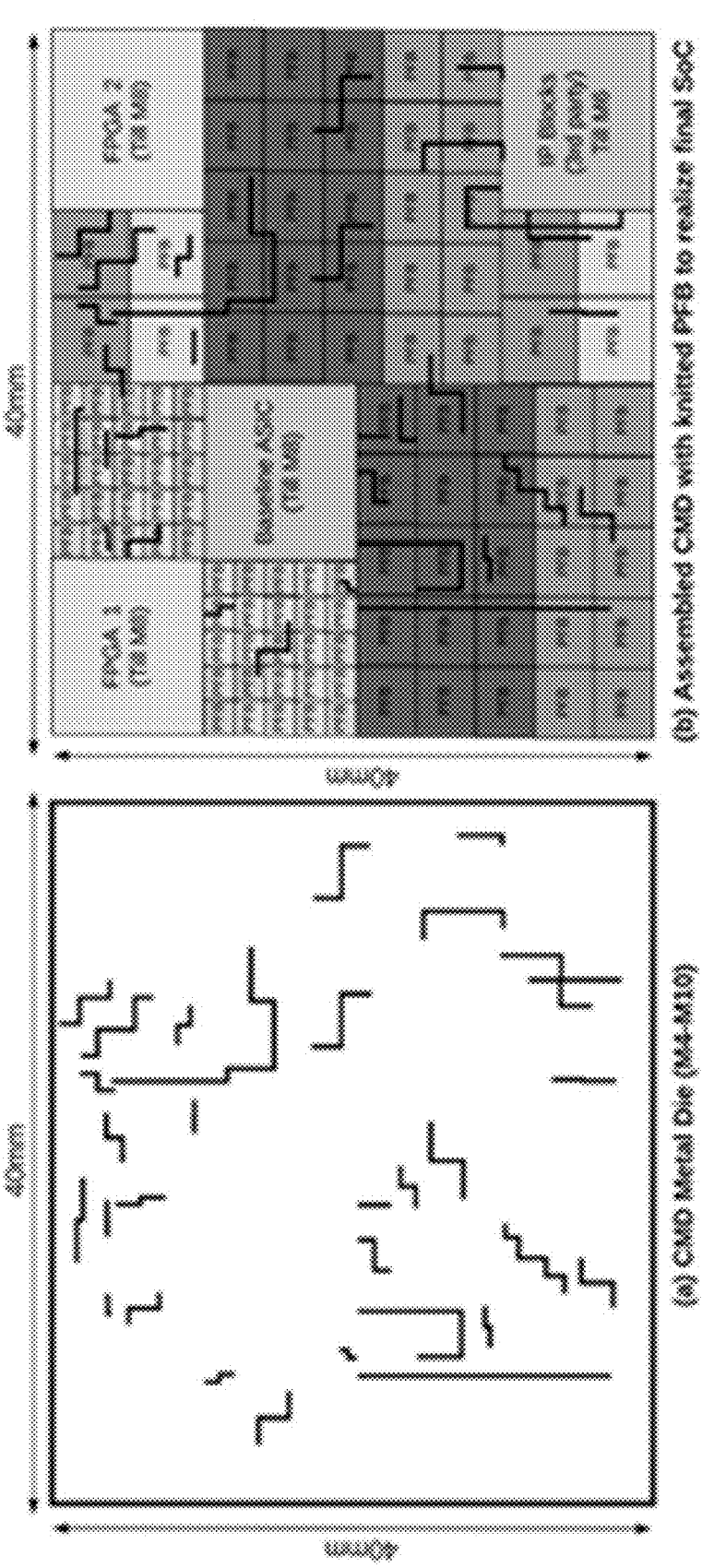
FIG. 25 is an example of a sequence for assembling CMD on knitted PFB/other components SoC to realize domain specific SoC in accordance with one or more embodiments of the present technology.

FIG. 25 is an example of a sequence for assembling CMD on knitted PFB/other components SoC to realize domain specific SoC in accordance with one or more embodiments of the present technology. However, this embodiment is included just for the illustration purpose, and the possible approaches to design/assemble CMD with knitted PFBs are not limited to the one shown in embodiment.

EDA Methodology for Logic PFBS Based SOC

Figure 26:
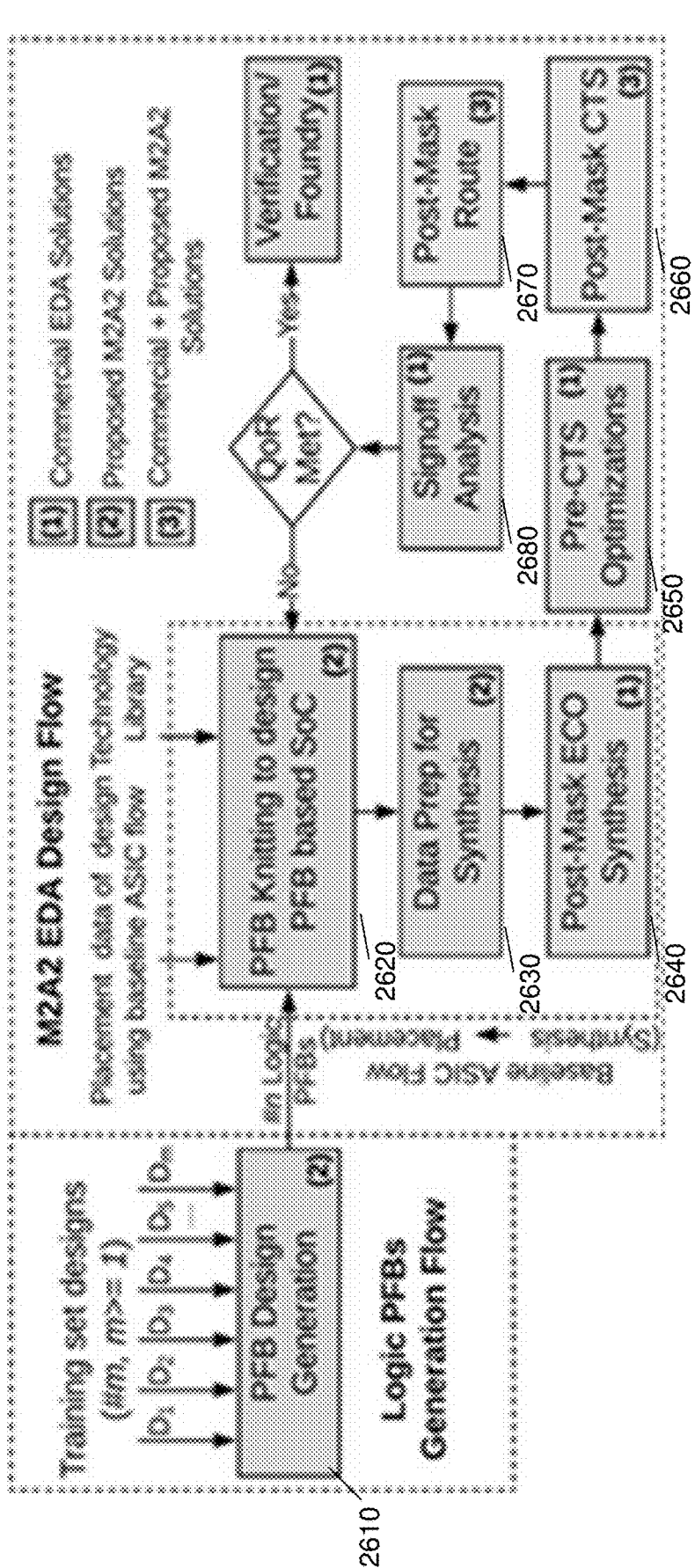
FIG. 26 is an example of a M2A2 EDA flow for logic PFB based SoC in accordance with various embodiments of the present technology.

FIG. 26 is an example of a M2A2 EDA flow for logic PFB based SoC in accordance with various embodiments of the present technology. As illustrated in FIG. 26 training set designs can be fed into PFB design generation module 2610. Placement data of design using baseline ASIC flow, number of Logic PFBs, and a technology library can be fed into a PFB knitting module 2620 that can design PFB based SoC. This design can be fed into prep module 2630 for synthesis and masking module 2640 can prepare post mask ECO for synthesis. The optimization module 2650 can perform one or more pre-CTS optimizations to create post mask CTS 2660. The routing engine 2670 can create post-mask route which can be analyzed by signoff analysis module 2680. Decision block can determine whether QoR has been met and an updated design requested or verification 2690 of the design can be submitted to the foundry.

Figure 27:
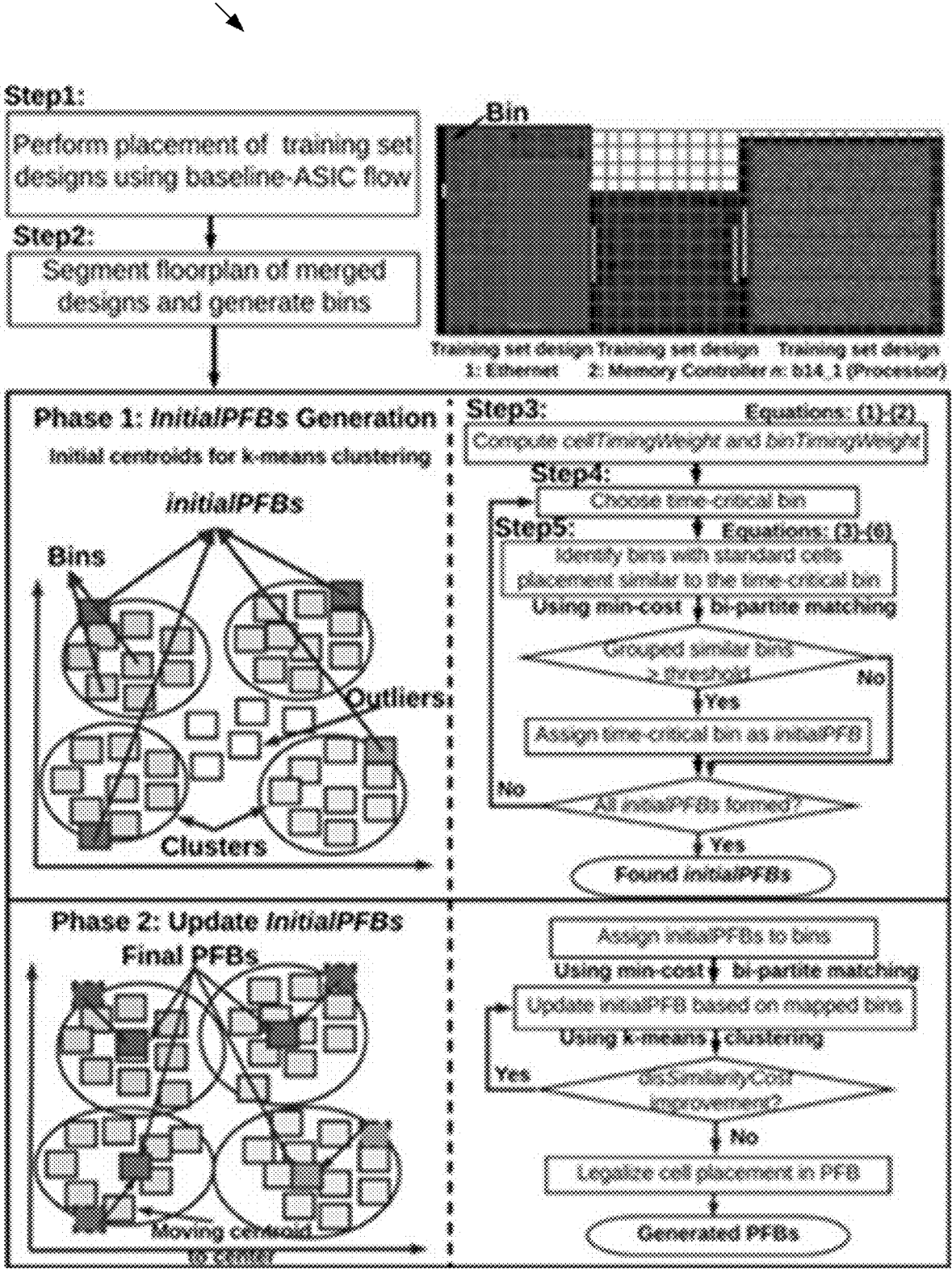
FIG. 27 is an example of an overview of PFB design algorithm in accordance with some embodiments of the present technology.

FIG. 27 is an example of an overview of PFB design algorithm 2700 in accordance with some embodiments of the present technology. FIG. 28 describes the EDA methodology for design implementation of a logic PFBs based SoC. In the PFB design generation, a limited number of PFBs are generated based on timing and placement data from multiple baseline ASICs. Once the PFBs are generated, it serves as the design library. In M2A2 design implementation phase, PFBs are knitted together to meet the functional requirements of a given design. We call this design as pre-placed PFB SoC (pSoC). Next, PFB and pSoC design placement data are processed to generate the netlist, and design exchange format (DEF) files. Then, the industry standard ECO tool (Cadence Conformal) is used to perform post-Mask ECO synthesis. This allows synthesizing of the design using spare cells pre-placed in pSoC. These form front-end design phase.

In the back-end design phase, pre-clock tree synthesis (pre-CTS) optimizations are first performed using a commercial EDA tool (Cadence Innovus). In order to implement post-Mask CTS, first a commercial EDA tool (Cadence Innovus) is used to build the clock tree by inserting cells in the desired regions in SoC. The desired regions are those where spare clock buffers, inverters and clock gating cells are placed. Then, the newly added clock tree cells are mapped to the existing spare cells using min-cost bipartite matching algorithm. Once the clock tree is built optimally using the spare cells, routing and signoff analysis is performed using commercial EDA tools.

Design of Logic PFBS for Generic or Domain Specific SOCS

The PFB design problem can be formulated as designing limited number of generic PFBs which can be used to implement multiple ASICs. The random selection and placement of standard cells in PFBs may cause congestion, high interconnect delay, and timing closure issues. Further, design may end up using high number of PFBs, thus degrading PPA of M2A2 designs. On the other hand, the greedy mapping based clustering, and iterative mapping-based clustering techniques can be used for PFB design. However, these methods do not guarantee global optimal solution since decisions are made iteratively based on the information available in each iteration, rather than optimizing the overall objective function.

In order to design optimal PFBs, various embodiments use a PFB design algorithm (FIG. 27) based on graph matching and unsupervised learning techniques. The idea is to design PFBs by learning from standard cells placement information of multiple baseline ASICs (training set designs). Some embodiments can first identify regions in the training set designs which have similarity in the placement of standard cells. Then, the regions with similar standard cell placement are grouped together to generate PFBs. The similarity analysis is performed using graph matching technique, whereas grouping of similar regions is performed using k-means algorithm. The random initialization of centroids in k-means usually results in a sub-optimal solution. In order to address this issue, we have determined initial centroid positions such that each centroid lies within the unique cluster.

The PFB design algorithm can be divided into 2 phases, (1) Generating initialPFBs which serve as initial centroids for k-means algorithm and (2) Improving initialPFBs by performing k-means clustering and generating final set of PFBs. The details of the first phase are as follows. The training set designs are synthesized and placed using baseline ASIC flow.

In step 1, the placement distribution and timing path attributes such as clock period, number of timing path stages for all the cells are obtained. All the training set designs are placed next to each other, and cells placement information of these merged designs is processed. It should be worth mentioning that connectivity of cells in the training set designs is not considered, since PFBs comprise of spare gates (standard cells with floating input and output pins). In step 2, the floorplan of merged designs is segmented into multiple small regions, named as bins. The dimensions of bins are kept same as that of a PFB (user input).

Steps 3-5 determine the similarity in the placement of standard cells across different bins. The relative location of cell instances for each bin are evaluated. The relative location of each cell in a bin is calculated by assuming lower left corner of the bin as the origin (FIG. 28B). In step 3, cellTimingWeight for each cell instance is evaluated, as given by (1). It is defined as the maximum value of the product of clock frequency and number of stages for each timing path passing through a given cell. Typically, higher number of stages, and/or faster clock speed leads to lower timing slack margin in each stage of a timing path. Thus, $$cellTimingWeight = \max_{\forall path_i \in allPaths} \left( \#stages_{path_i} * freq_{path_i} \right) \qquad (1)$$

$$binTimingWeight = \sum_{l=1}^{m} cellTimingWeight_i \qquad (2)$$

cellTimingWeight signifies the timing critical factor for a given cell. Then, binTimingWeight metric for each bin is calculated by accumulating the cellTimingWeight values for all the cells placed in a given bin (FIG. 28A). The bins where critical timing path cells are placed, and/or bins with higher number of cells have higher value of binTimingWeight metric.

where m is the total number of cells present in bin. In step 4, the most timing critical bin (bin with the highest bin Timing Weight) is assigned as the time-critical bin. All the other bins are compared with the time-critical bin. The similarity analysis is performed using a bi-partite graph. A bipartite graph is a set of graph vertices decomposed into two disjoint sets, say A and B such that every edge connects vertex in A to one in B. The cells of a given bin (set A) are matched to the cells of the time-critical bin (set B). The edge cost in a bi-partite graph for each pair of cells is then evaluated which represents the timing weighted manhattan distance between cell in a given bin and time-critical bin. The manhattan distance between the relative locations of the cells in a given and time-critical bin is calculated (FIG. 28B). The edgeCost metric is then calculated by the product of cellTimingWeight and its distance with the mapped cell in time-critical bin, as given by (3).

$$edgeCost_{xy} = cellTimingWeight_x * relative\_distance(x,y) \qquad (3)$$

where x is the cell in bin, y is the cell in time-critical bin. ⧄ In step 5, matchingCost for all the cells in a given bin is evaluated, as given by (4). The cells in a given bin are mapped to logically equivalent cells in the time-critical bin such that the total cost of matching (edgeCost) in a bi-partite graph is minimized (FIG. 28D).

In order to optimize for the run time, min-cost bi-partite graph matching algorithm is implemented in O(n log n) time complexity, where n is the number of vertices to be matched. For the cells which are not matched to the cells in time-critical bin, penaltyCost is determined, as given by (5). For each unmatched cell, the manhattan distance between a given cell and the farthest bin edge is multiplied by its cellTimingWeight to calculate its edgeCost. Then, penalty-Cost is calculated by adding the edgeCost for all unmatched cells, and multiplying it with penalty factor (p, set by user based on #PFB types). The disSimilarityCost of each bin, given by (6), is then calculated by adding the matchingCost and penaltyCost for all logical types of cells placed in the bin. It qualitatively represents the dis-similarity in the standard cell placement between the given bin and the time-critical bin (FIG. 28).

$$matchingCost = \min\left(\sum_{j=1}^{m} edgeCost_j\right) \quad (4)$$

$$penaltyCost = p * \left(\sum_{k=1}^{q} cellTimingWeight_k * edgeCost_k\right) \quad (5)$$

$$disSimilarityCost = \sum_{i=1}^{n} (matchingCost_i + penaltyCost_i) \quad (6)$$

where m=#cells of a given logic type, q=#unmatched cells, n=total logic types of cells placed in bin, and p=penalty factor.

The bins with disSimilarityCost less than disSimilarityThreshold value are grouped together. The value of disSimilarityThreshold signifies the maximum variation allowed in the relative locations of a cells placed in a given bin to the time-critical bin. Next, bin Timing Weight metric is evaluated which qualitatively represents the relative size of cluster being formed by the grouped bins. This metric is compared with groupingThreshold which is determined based on the number of PFB types (user input). If groupedBinsWeight exceeds groupingThreshold value, time-critical bin is assigned as an initialPFB. All the grouped bins are assigned as the matched bins. Else, initialPFB is not formed. This process of generating initialPFBs is repeated till we get the required number of initialPFBs. It should be noted that in the subsequent iterations, only the unmatched bins are considered. Finally, the remaining unmatched bins are matched to one of the initialPFBs which has the lowest disSimilarityCost.

Figure 29:
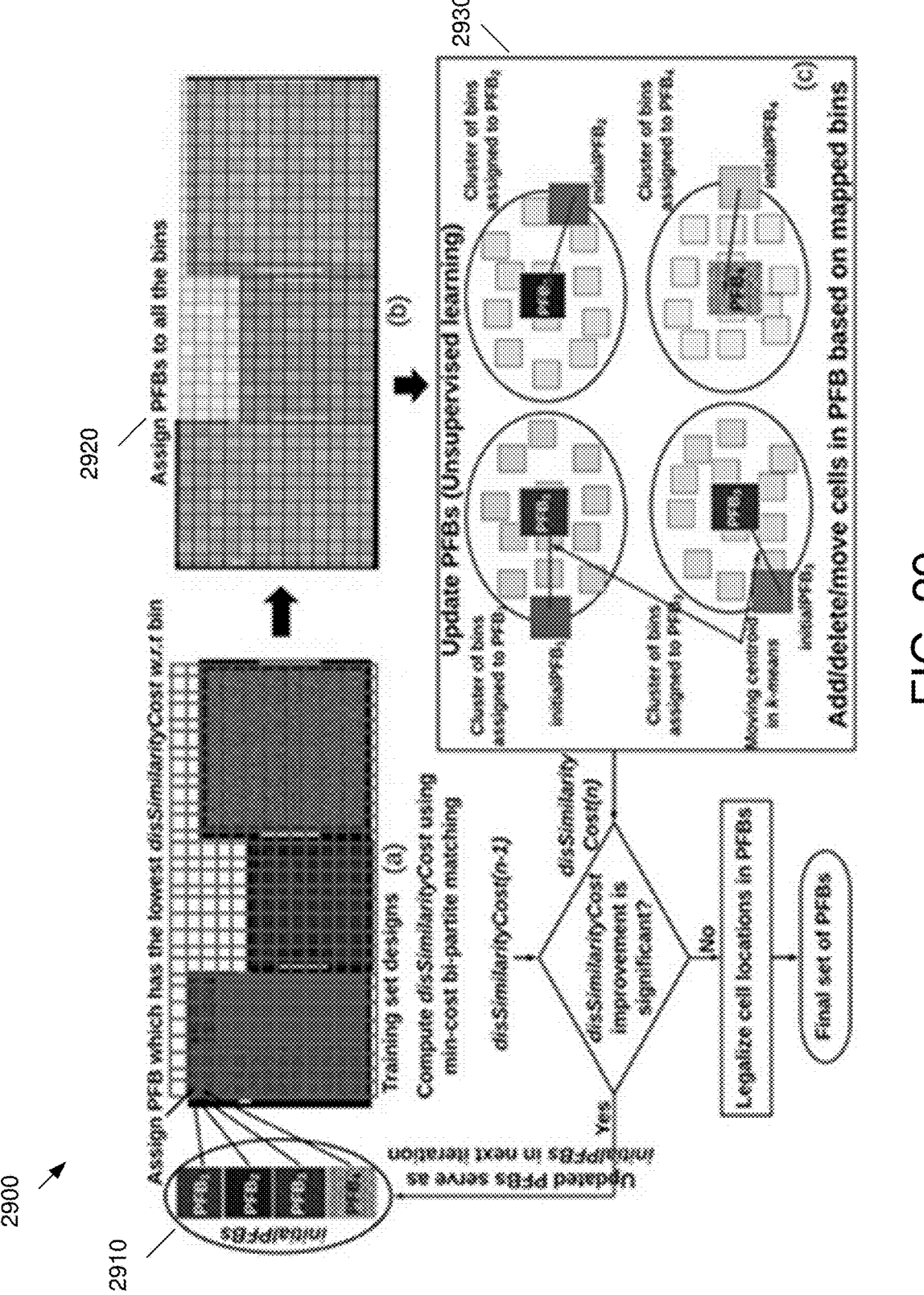
FIG. 29 is an example of a K-means clustering to generate final PFBs in PFB Design Algorithm. that may be used in various embodiments of the present technology.

The k-means clustering algorithm is performed now to improve the initialPFB design. FIG. 29 is an example of a K-means clustering to generate final PFBs in PFB Design Algorithm that may be used in various embodiments of the present technology. Each bin is matched to one of the initialPFBs which has the lowest disSimilarityCost (2910 and 2920). Once all the bins are assigned to one of the initialPFBs, initialPFB design is updated based on the matched bins (2930). The standard cells are added/deleted/moved in initialPFB to reduce its disSimilarityCost with respect to matched bins. This can be viewed as moving each centroid to center of its cluster. The k-means algorithm is run iteratively until no or minimal improvement in disSimilarityCost is observed. Finally, standard cell placement legalization is performed in each PFB such that total cell displacement is minimized.

Knitting of Logic PFBS for Generic or Domain Specific SOCS

Figure 30:
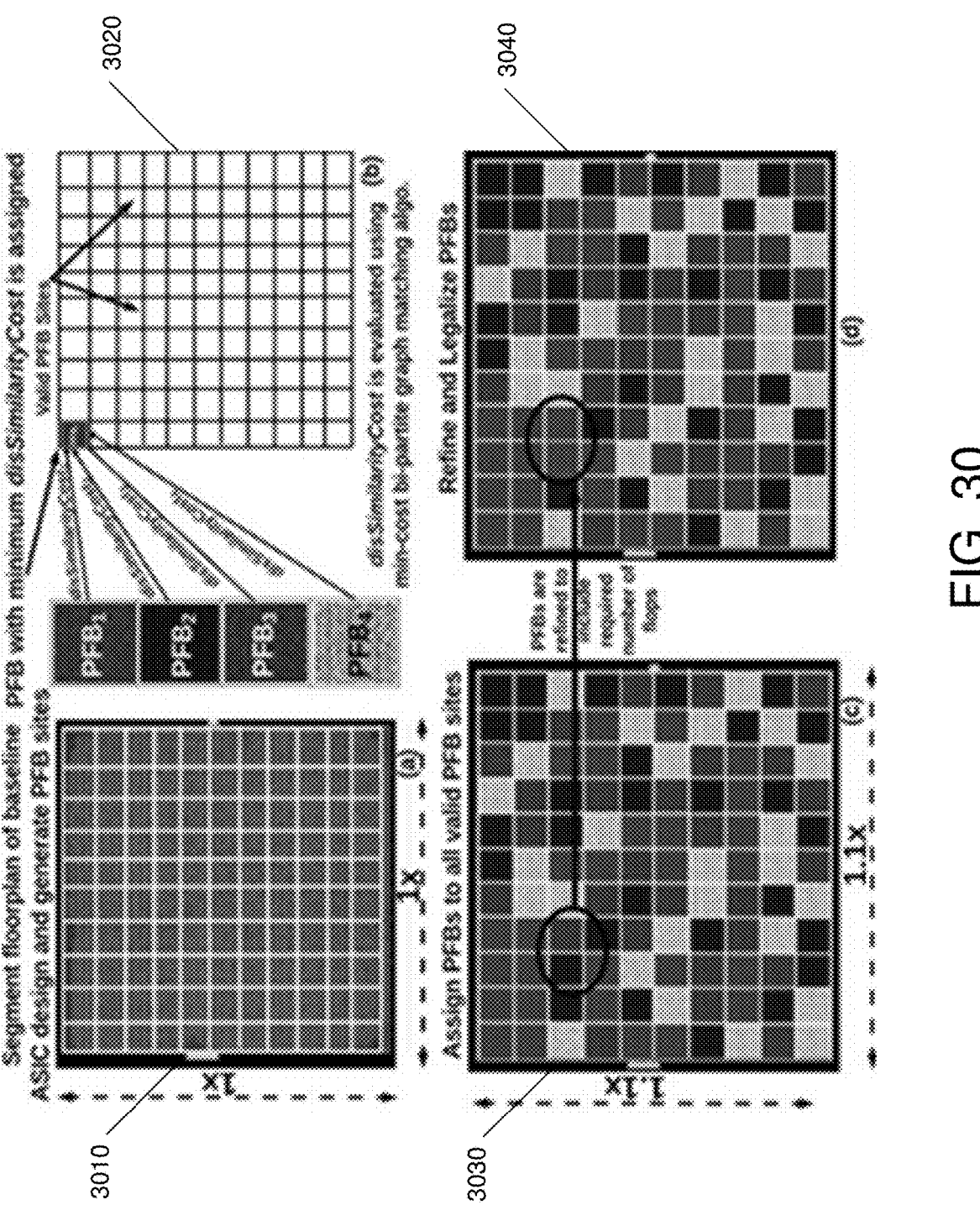
FIG. 30 is an example of an overview of PFB Knitting Algorithm that may be used in some embodiments of the present technology.

FIG. 30 is an example of an overview of PFB Knitting Algorithm that may be used in some embodiments of the present technology. The goal of a PFB knitting algorithm illustrated in FIG. 30 is to choose and place PFBs on a substrate such that the PFBs knitted SoC can realize functionality of a given design at optimal PPA. In order to achieve this, synthesis and placement of a given design is first performed using baseline ASIC flow to get the placement distribution of the standard cells. Then, PFBs are knitted onto SoC such that it resembles the standard cell placement of ASIC design. The details of algorithm are as follows. Next, the placement and timing information of cells in ASIC design is processed. In the next step, the entire ASIC design floorplan is segmented into multiple small regions, named as bins (3010). The dimensions of bins are kept same as that of PFB. Next, cellTimingWeight and binTimingWeight for all the cells and bins are determined using (1) and (2). In the next step, valid PFB sites are defined which have standard cell utilization greater than the threshold value (depends on area constraints).

Next, all the bins with valid PFB sites are matched to PFBs using min-cost bipartite graph matching technique. A given bin is compared with each PFB and is mapped to the one which has the lowest disSimilarityCost (computed using (4)-(6), 3020). Thus, a PFB whose standard cell placement is most similar to the standard cell placement of a PFB site is assigned to it. This step is repeated until one of the PFBs is assigned to each valid PFB site (3030). Once all the PFBs are assigned, it is ensured that count of sequential elements (flip flops, latches, etc.) in pre-placed PFBs design is not less than the required count (used in baseline ASIC).

This can be achieved by: (1) setting higher cellTimingWeight for the sequential elements. Thus, disSimilarityCost of sequential elements will be higher and PFBs dominated with sequential elements will be assigned to the PFB sites with higher sequential elements. (2) adding extra PFBs in the design such that required number of sequential elements are placed in PFBs knitted SoC. Once PFBs selection is refined, placement legalization of PFBs in design is performed. In this step, the PFBs are aligned to standard cell rows in such a way that total PFB displacement is minimized (3040). In this step, it is also ensured that spaces between PFBs is an integral multiple of filler PFB dimensions, so that filler cells PFB can be inserted at empty places to meet the density requirements. Finally, the PFB placement data is fed to the ECO tool (Cadence Conformal) to perform post-Mask ECO synthesis using spare cells pre-placed in PFBs knitted SoC.

Figure 31:
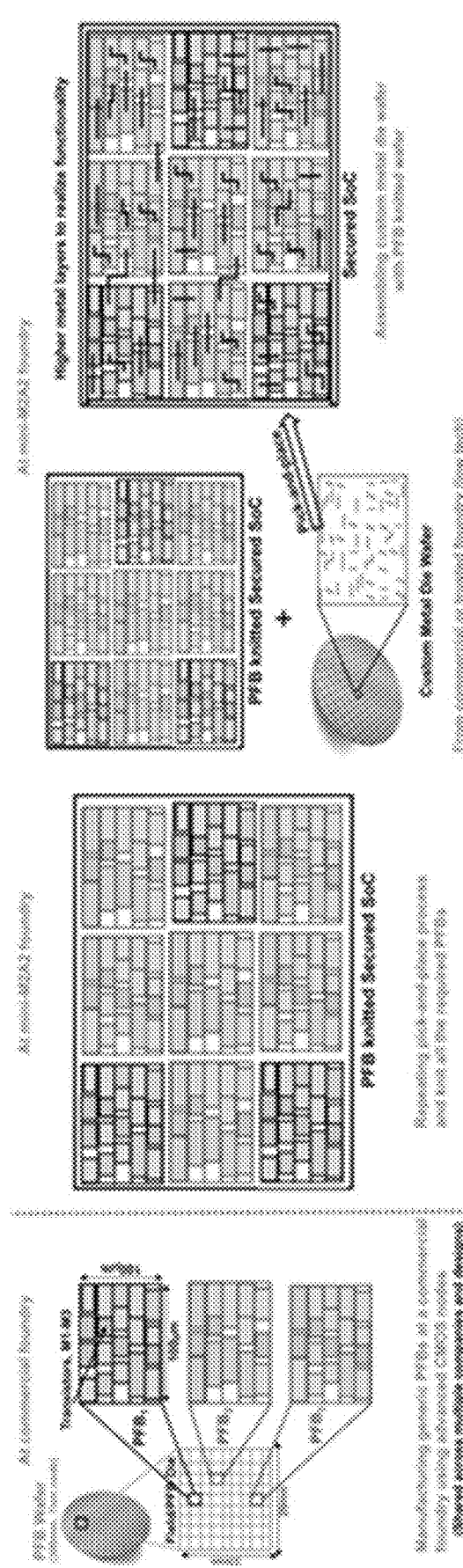
FIG. 31 is an example of assembling CMD with knitted PFBs SoC to realize final SoC in accordance with one or more embodiments of the present technology.
Figure 32:
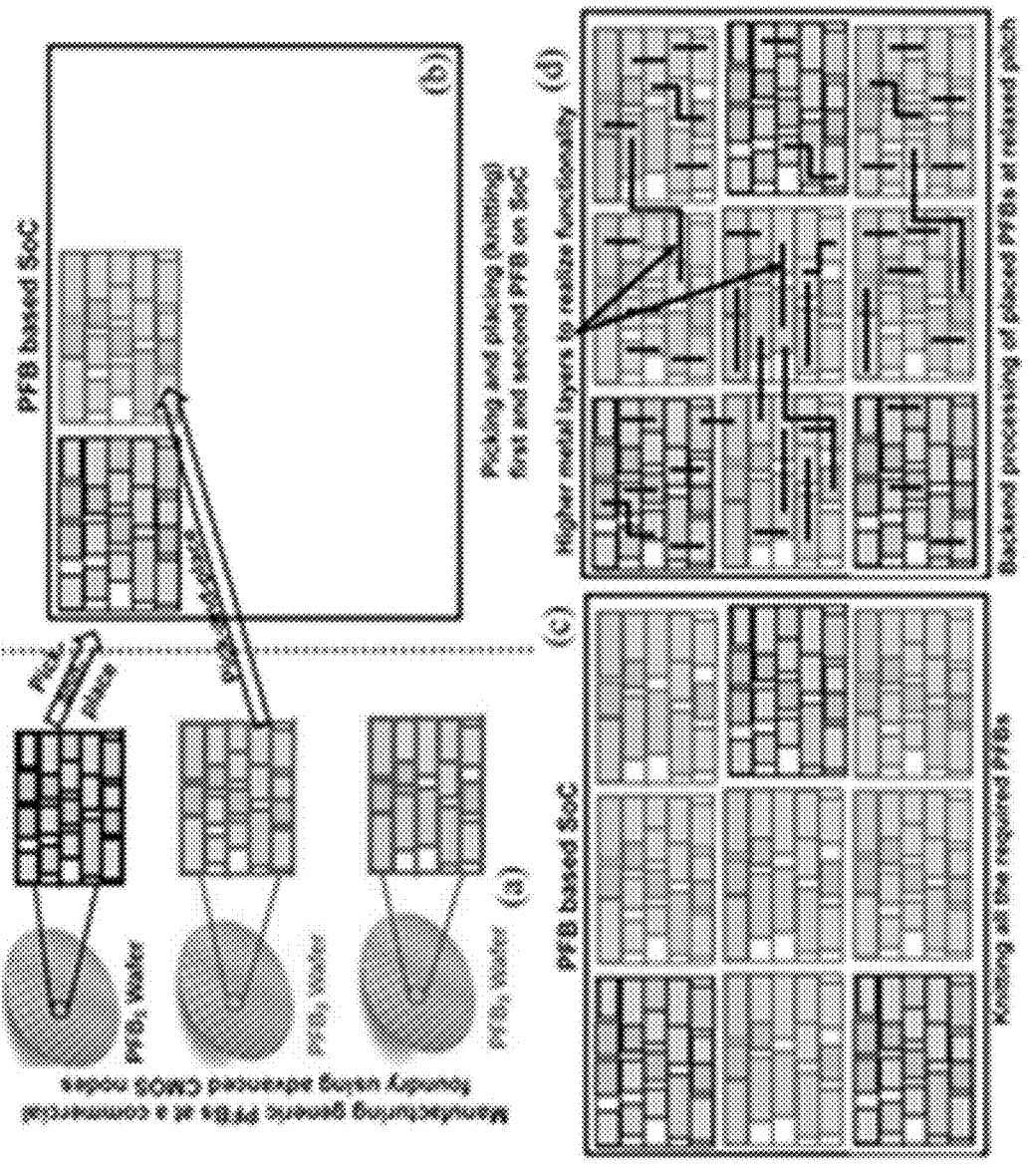
FIG. 32 is an example of a nackend processing of PFB knitted SoC to realize final SoC in accordance with various embodiments of the present technology.
Figure 33:
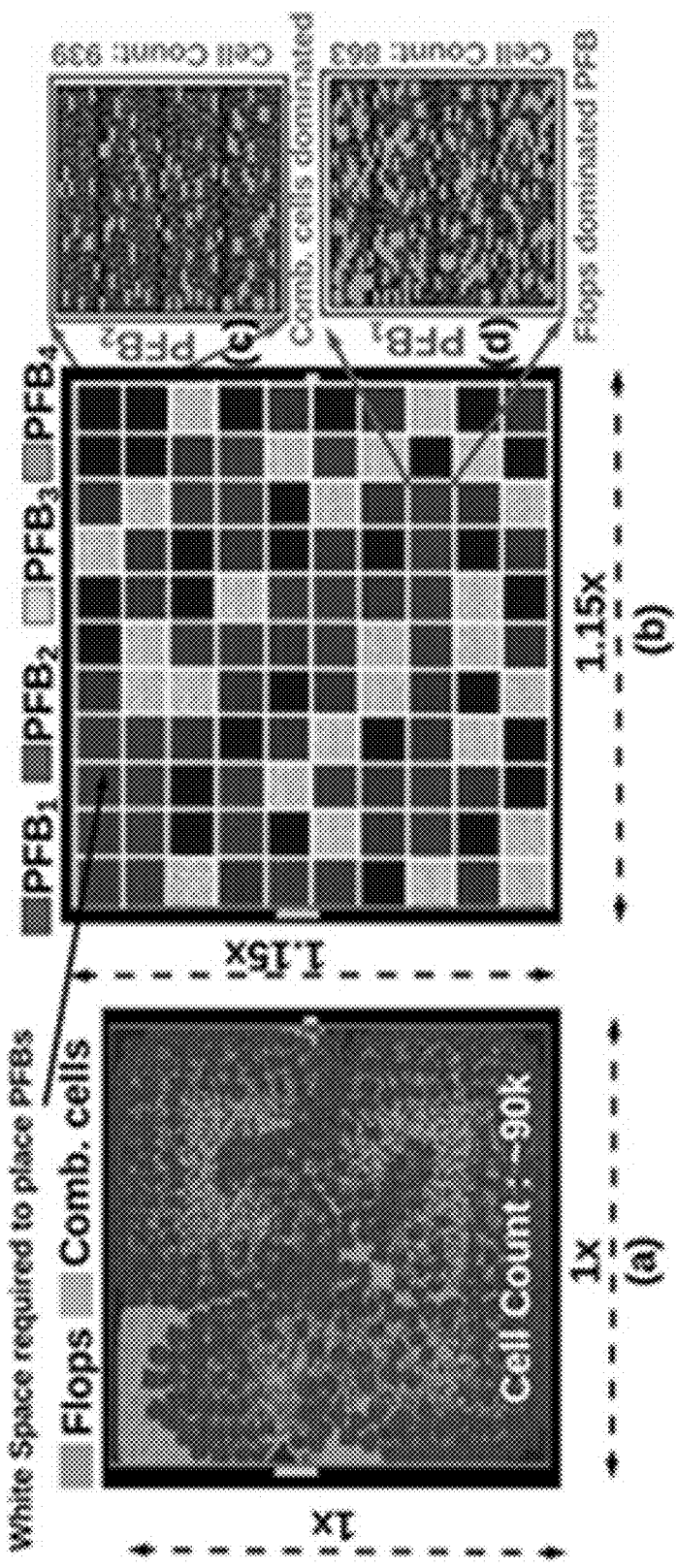
FIG. 33 is an example of an ASIC and M2A2 based exemplar floorplan according to various embodiments of the present technology.
Figure 34:
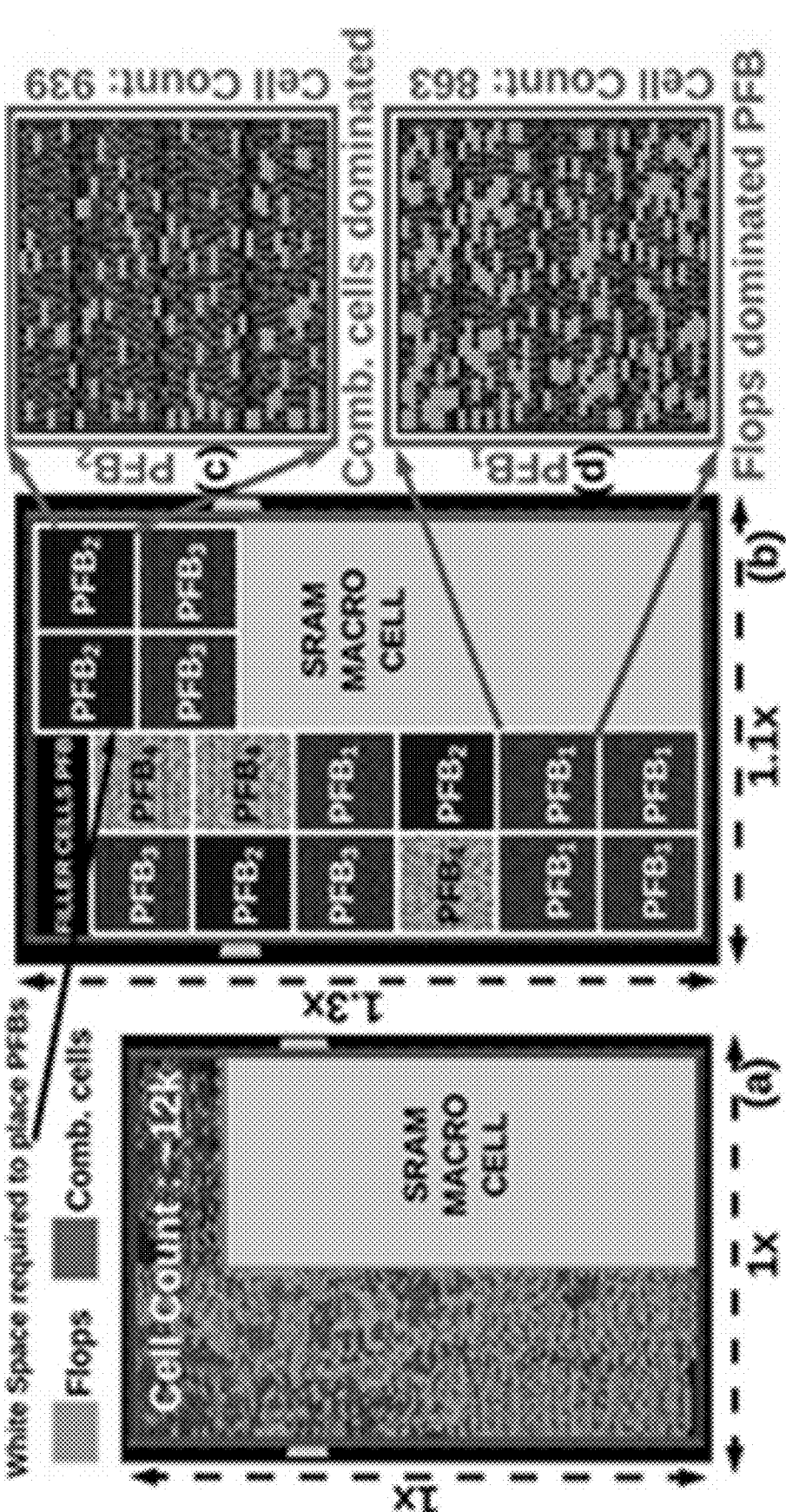
FIG. 34 is an example of an ASIC and M2A2 based exemplar floorplan according to some embodiments of the present technology.

FIG. 31 is an example of assembling CMD with knitted PFBs SoC to realize final SoC in accordance with one or more embodiments of the present technology. FIG. 32 is an example of a nackend processing of PFB knitted SoC to realize final SoC in accordance with various embodiments of the present technology. FIG. 33 is an example of an ASIC and M2A2 based exemplar floorplan according to various embodiments of the present technology. FIG. 34 is an example of an ASIC and M2A2 based exemplar floorplan according to some embodiments of the present technology. These embodiments are included just for the illustration purpose, and the possible approaches to design/assemble knitted PFBs are not limited to the ones shown in embodiments.

Logic PFBS Design and Knitting Considerations for Generic or Domain Specific SOCS The sizing of a PFB is an engineering optimization problem which depends on various design and cost trade-offs. The smaller PFB size makes it less generic, thereby increasing the required number of PFB types leading to increased NRE cost. On the other hand, smaller sized PFB leads to lesser area overhead of M2A2 designs when compared to ASICs, thus improving PPA. Therefore, PFB dimensions need to be carefully chosen by comprehending the trade-offs between the NRE cost and the PPA impact on M2A2 designs.

In order to determine optimal number of PFB types, PFB design algorithm (k-means) is executed for different values of k. The minimum value of k for which disSimilarityCost is not reduced further by increasing k is chosen as the limited (optimal) number of PFB types. This ensures that the least number of PFBs are designed which achieve reasonably good similarity in standard cells placement across regions/ bins of the training set designs.

For successful synthesis of a given design, it is essential to have required number of standard cells in a PFB knitted SoC. If insufficient number of sequential cells are present, compared to the required sequential cells for a given design, the design may not be synthesized. The proposed PFB knitting algorithm ensures that sufficient number of sequential cells are placed in the PFB knitted SoC. For insufficient combinational standard cells, post-mask ECO synthesis (using existing EDA tool) is performed to realize necessary logic functionality using spare combinational logic gates. If the synthesis still fails even after applying logic restructuring techniques, additional PFBs are knitted ensuring rectilinear floorplan is maintained. In the worst-case scenario, addition of a single PFB to the floorplan may result in increasing floorplan area by an entire row/column of the PFB. This overhead is comprehended in M2A2 area calculations. In our analysis, we noticed that single iteration of PFB inclusion followed by post-mask ECO synthesis enabled successful synthesis of a design.

In order to mitigate routing congestion during synthesis, maximum placement utilization can be set and/or some of the spare cell instances can be assigned as 'don't-use' in highly utilized PFBs. If the synthesis fails due to missing spare gates, duplicate PFB is placed adjacent to the original PFB and synthesis is performed again.

PFBs are generated by applying learning technique k-means algo.) on a training set of designs belonging to certain set of functional categories. Hence, given design having similar 'functional composition' can be realized using the proposed PFB based M2A2. It is well suited for low-volume ASICs requiring multiple variants of similar functionality designs. It should be noted that, limited PFBs may not realize 'any arbitrary' design having very different functional composition than the training set designs. The given arbitrary design may not synthesize correctly as the PFBs are not trained for such set of designs. This limitation is generic to training on labeled dataset in machine learning and not specific to the proposed M2A2 methodology. This limitation can be mitigated by expanding the existing PFB library to comprehend functional composition of new designs at the expense of increased NRE cost due to additional PFBs.

In advanced CMOS nodes, not just the lower metal layers (M0 and M1) but also the intermediate metal layers (M2-M5) require critical mask-set incurring high NRE costs. In such a scenario, the PFBs may need to include intermediate metal layers and can no longer contain only spare standard cells. This can limit the PFB design flexibility and may result in either significant increase in the #PFB types and/or high PFB instances required to knit a design. Thus, trade-off analysis among #PFB types, # metal layers in PFB and PPA of M2A2 design is necessary.

Testing of PFBS Based SOC (Generic or Domain Specific)

Various embodiments of the present technology provide for systems and techniques for testing aspects of PFB based SoCs. These SoCs can be either for generic ASIC applications like processors, controllers, communications, etc. or for domain specific applications like hardware accelerators. One of the major benefits of M2A2 technology is that it can improve the yield for mid to large sized dies. This is due to the fact that M2A2 technology knit the PFBs to realize the final SoC.

Irrespective of the size of PFB based SoC, PFB size remains the same (much smaller). For example: Assuming PFBs are sized 500 μm*500 μm, and dimensions of final SoC are 40 mm*40 mm. Due to field size limitations of 26 mm*33 mm in current lithography technology, this SoC using existing commercial fabrication technologies cannot be fabricated. Furthermore, if the size of the die approaches field size, the yield decreases. However, in M2A2 technology, PFBs are manufactured at 500 μm*500 μm scale at high yield using existing commercial fabrication, and then 6400 ((40 mm*40 mm)/(500 μm*500 μm)) such PFBs are knitted/ assembled to realize final SoC. Moreover, even if there is some bad PFB die, it won't be assembled to realize the final SoC. In this way, yield of M2A2 enabled designs is significantly better than existing ASICs, FPGAs etc. especially for super-sized designs.

In order to achieve high yield designs using M2A2 technology, various embodiments can perform one or more of the following: 1) find a good known PFB die which can be assembled to realize front-end layers of PFB based SoC. 2) find a good known custom metal die (CMD) die which can be assembled with PFBs knitted design; and 3) find if final SoC (assembled with PFBs and CMD) is a good known die.

The testing approach/methodology to address the above-mentioned requirements is discussed below. In order to determine a good known PFB die, functionality and connectivity checks are performed using any of the standard testing techniques such as built-in self-test (BIST), scan-chain-based testing (boundary, partial, etc.), stuck-at fault techniques, and other standard commercial testing techniques for functional, structural, physical and connectivity. This testing logic can be either present inside the PFB area or outside the PFB area (space used for knitting of PFBs).

One of the other possible techniques can be to place logic/memory cells/etc. which has critical/complex/challenging requirements for fabrication/lithography (difficult to yield) outside PFB (this space is used for knitting PFBs). This test logic similar to critical functional logic of PFB is tested. Based on statistics and yield analysis using existing or newly developed in-house/$3^{rd}$ party tools, PFB can be determined if it is good known PFB or not. The custom metal die (CMD) is tested for connectivity checks. The commercial 3rd party or in-house or newly developed testing software can be used for connectivity testing. Some of the additional metal layers, pins and ports may be routed/ added/placed in CMD just for the testing purpose to determine if the CMD is a good known die or not. Once the good known PFBs are knitted and good known CMD is assembled, final complete SoC level testing is performed. At this level, both functional level testing and connectivity level testing is performed using any of the standard testing techniques such as built-in self-test (BIST), scan-chain-based testing (boundary, partial, etc.), stuck-at fault techniques, and other standard commercial testing techniques for functional, structural, physical and connectivity.

Figure 35:
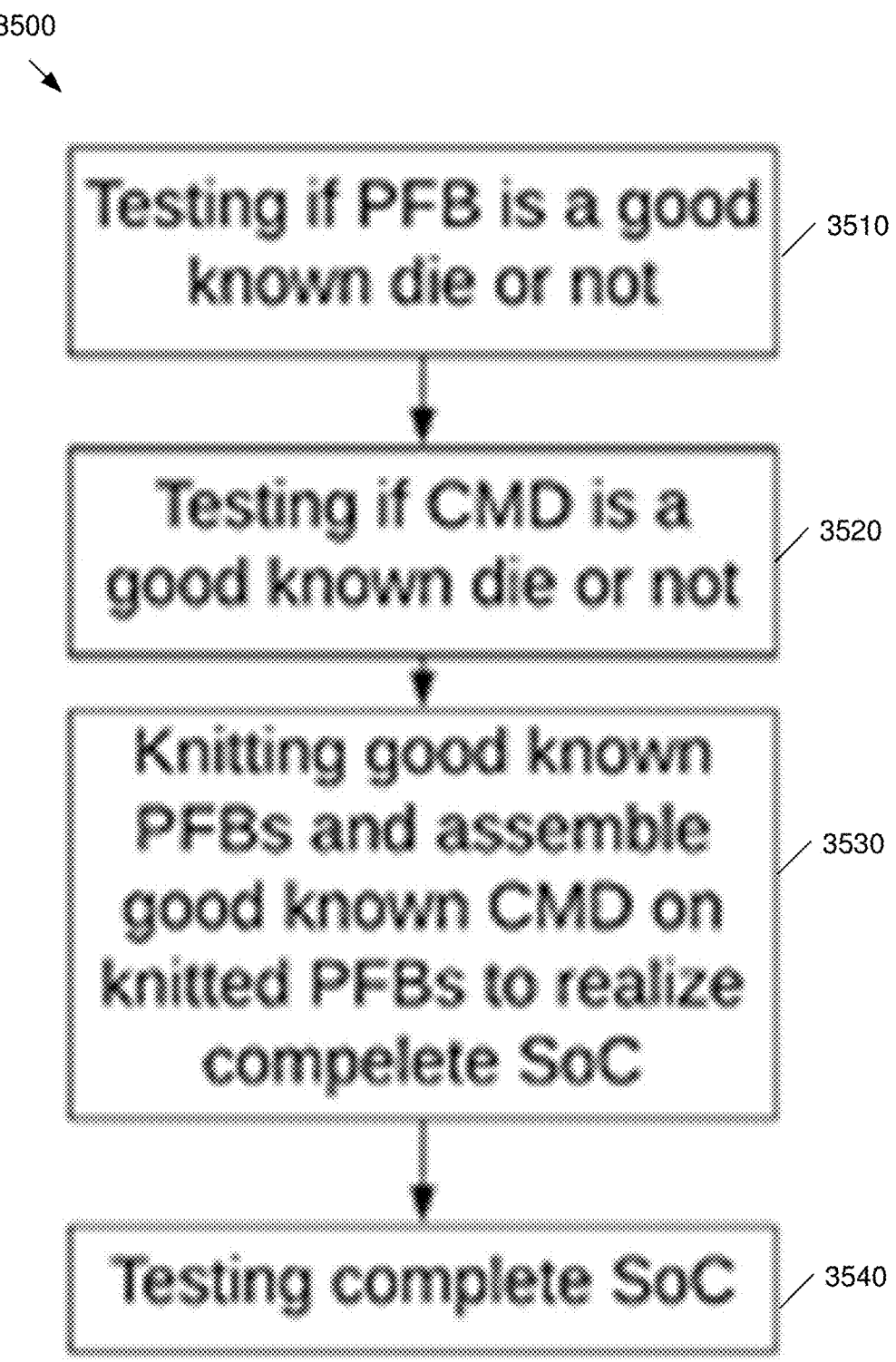
FIG. 35 is an example of a testing methodology of M2A2 based SoCs that may be used in one or more embodiments of the present technology.

FIG. 35 is an example of a testing methodology 3500 of M2A2 based SoCs that may be used in one or more embodiments of the present technology. In the embodiments illustrated in FIG. 35, PFB testing operation 3510 test the PFB to determine whether the dies a good known die or not. CMD testing operation 3520 test the CMD to determine wither the CMD is a good know die or not. If PFB testing operation 3510 or CMD testing operation 3520 identify a bad PFB or CMD, then the location of the bad element can be added to a do not use list in some embodiments. Knitting operation 3530 knits good known PFBs and assembles good known CMD on knitted PFBs to realize complete SoC. This can be done, for example based on the do not use or black list created from the testing operations 3510 and/or 3520. Then SoC testing operation 3540 tests the completed SoC.

Figures 36A, 36B, 36C, 36D, 36E:
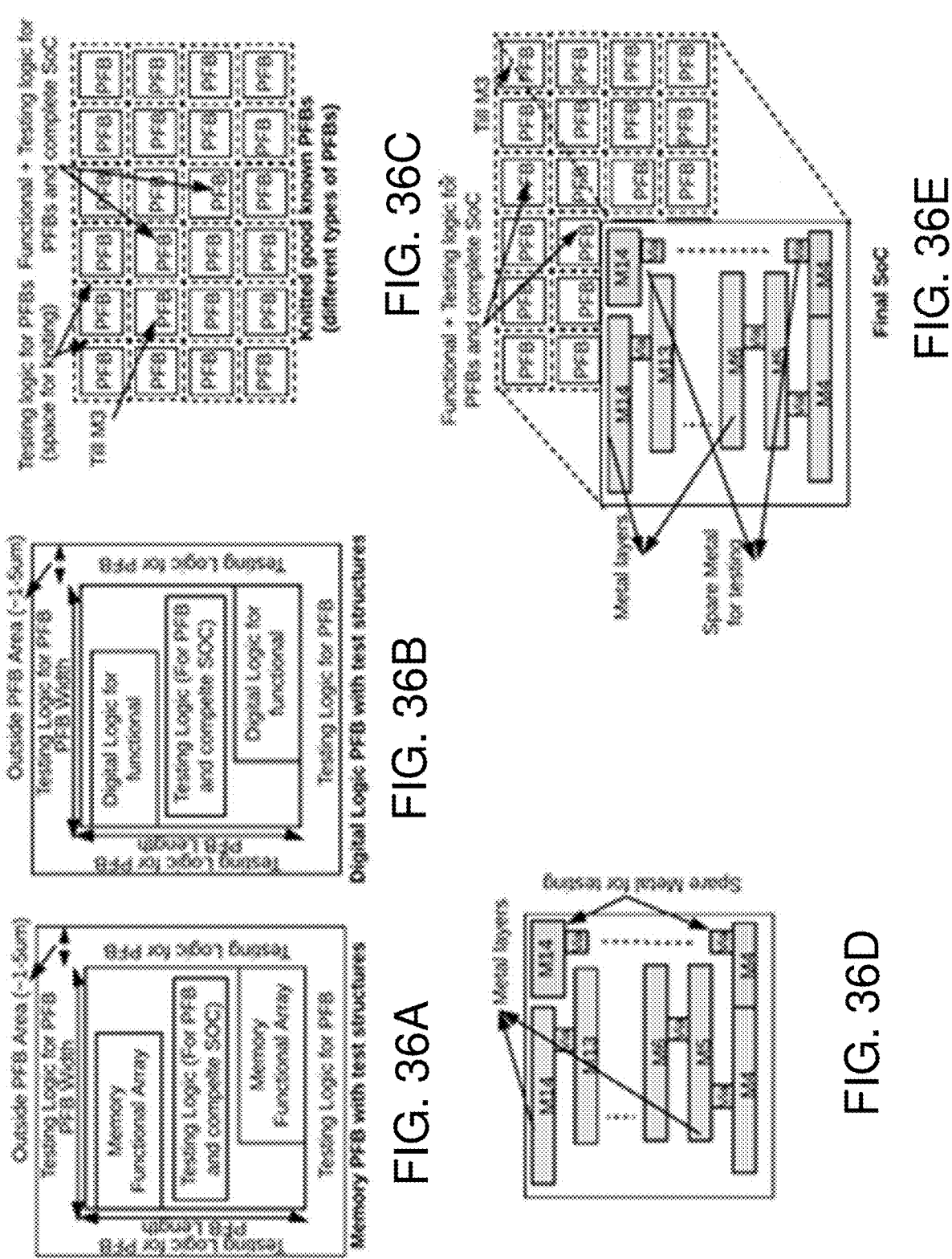
FIGS. 36A-36E illustrate an example of a testing logic for PFBs, CMD and final level SoC in M2A2 based design that may be used in various embodiments of the present technology.

FIGS. 36A-36E illustrate an example of a testing logic for PFBs, CMD and final level SoC in M2A2 based design that may be used in various embodiments of the present technology. These embodiments are included just for the illustration purpose, and the possible approaches to test PFBs, CMD and assembled SoC with PFBs and CMD are not limited to the ones shown in embodiments. FIGS. 36A and 36B show individual PFBs. In many cases, the entire PFB cannot be tested. As such, some embodiments allow for the integration of testing logic on the periphery of the PFBs while inside are the functional parts (e.g., memory array, etc.) In FIG. 36C, the known good PFBs can be knitted together. FIGS. 36D and 36E show different cross section of the metal layers.

EDA Methodology for Logic Partitioning in 3D SOCS

In recent years, Moore's Law based 2D scaling of transistors is approaching fundamental physical limits requiring paradigm shifts to sustain advances in integrated circuits. Simultaneously, the demand for energy efficient advanced computing and memory is reaching unprecedented levels driven by consumer mobile devices, IoTs, and by high-end cloud computing applications such as machine learning and big data analytics. In the domain of high-performance and abundant-data computing, 3D integrated circuits (3D-IC) technologies are being explored to create compact heterogeneously integrated logic-logic or logic-memory 3D ICs. The conventional 2D ASIC design can be stacked in multiple tiers/layers on top of each other, forming a 3D system on chip (SoC). This results in better power and performance metrics at lower footprint. A typical 2D ASIC SoC comprises of millions of standard cells. The 3D design partitioning problem deals with optimal assignment of cells to each layer/tier in a 3D stack. By optimal, we mean the cells are placed in such a way that we achieve the lowest Power-Performance-Area (PPA).

3D ASIC Design Partitioning Problem

In the cutting-edge design nodes (20 nm and below), the delay is dominated by wire delay and power is dominated by leakage power. The wire delay is proportional to wirelength of the nets. Reducing wirelength results in smaller delay (means higher performance) and low power (requires less number of buffers, higher VT cells to meet the frequency targets). In order to reduce wirelength, the cells can be placed in 3D instead of 2D space. The cells can be placed in multiple tiers, i.e. multiple 2D planes can be stacked on top of each other. 3D design partitioning problem deals with the optimal assignment of cells in different tiers such that PPA is minimized.

This problem can be solved using various approaches such as iterative greedy approach, simulated annealing, graph-based techniques, objective function-based optimization techniques, etc. Various embodiments of the present technology can use optimization technique to solve this problem. This problem is an optimization problem, where various embodiments are minimizing the objective function under set of given constraints. This optimization problem belongs to the class of NP hard problems, which can be solved efficiently and optimally using one or more of the following methods: linear programming (LP), and/or integer linear programming, and/or mixed integer programming (MIP) models.

The details of the proposed methodology are discussed as follows. It should be worth mentioning that the analysis shown below are for 2 tiers (Tier 0 and Tier 1). However, this analysis (same methodology) can be scaled/generalized for any (more) number of tiers.

Problem Formulation—Objective Function and Constraints

Consider an ASIC design with n cells (nodes), and k nets (edges). The objective is to minimize the overall edge cost in a design partitioned in 2 tiers (Layer 0 and Layer 1) in order to get the best PPA. The objective function can be given by (7).

$$\text{minimize} \sum_{k=1}^{k=\gamma} edgeCost_k \tag{7}$$

where, $\gamma$ is the total number of nets (edges) in design (graph).

The edge cost signifies the 2D timing and physical awareness in design, and 3D via and routing blockages. It is a given by (8).

$$edgeCost_{i,j} = \alpha_{i,j}(|x_i - x_j| + |y_i - y_j|) + \beta_{i,j}(|z_i + z_j|) \tag{8}$$

where, $\alpha_{i,j}$ represents the timing coefficient, $\beta_{i,j}$ represents the 3D via and routing blockage penalty factor (self-routing blockage and routing blockage to neighboring cells) for cells i and j. $x_i$, $y_i$, $z_i$) are the X, Y and Z coordinates of cell i. Here, $|x_i - x_j| + |y_i - y_j|$ represents the 2D manhattan distance between cells i and j. Here, $$z_i = \begin{cases} 0, & \text{if cell } i \text{ is placed on tier 0} \\ 1, & \text{if cell } i \text{ is placed on tier 1} \end{cases}$$

Combining (7) and (8), the objective function is given by (9).

$$\text{minimize} \sum_{i=1}^{i=n} \sum_{j=1}^{j=m_i} (\alpha_{i,j}(|x_i - x_j| + |y_i - y_j|) + \beta_{i,j}(z_i - z_j|)) \tag{9}$$

where, n is the total number of cells, $m_i$ is the total number of cells connected to cell i.

In the design, cells can be placed only in standard cell rows, i.e. the y coordinate value of cells is multiple of standard cell height. Considering this, the objective function can be given by (10).

$$\text{minimize} \sum_{i=1}^{i=n} \sum_{j=1}^{j=m_i} (\alpha_{i,j}(|x_i - x_j| + h|r_i - r_j|) + \beta_{i,j}(z_i - z_j|)) \tag{10}$$

where, h is the standard cell height, $r_i$ is the row number of cell i and $r_j$ is the row number of cell j. Here, row number r belongs to $Z^+$, where $Z^+$ represents the set of positive integers. $\alpha_{i,j}$, $\beta_{i,j}$ and h are the design coefficients/constants.

The constraints of the above problem are as follows, given by (11)-(15).

Upper and Lower Bound of Decision Variables ($x_i$, $r_i$):

$$0 \leq \min(x_{2D}) \leq x_i \leq \max(x_{2D}), x_i \in \mathbb{R}^+ \tag{11}$$

$$0 \leq \min(r_{2D}) \leq r_i \leq \max(r_{2D}), r_i \in \mathbb{Z}^+ \tag{12}$$

$$0 \leq z_i \leq 1, z_i \in \mathbb{Z}^+ \tag{13}$$

Here, $\mathbb{R}^+$ represents the set of positive real numbers, $\mathbb{Z}^+$ represents the set of positive integers, $x_{2D}$ and $r_{2D}$ are the x coordinate (center of cell in horizontal direction) and row number of any cell in a 2D design (plane). ($x_i$, $r_i$, $z_i$) are the X coordinate, row number and Z coordinate of cell i respectively.

Non-Overlapping of Cells in Design (Same Tier/Plane):

$$|x_i - x_j| \geq \left(\frac{w_i + w_j}{2}\right), \text{ if } (r_i = r_j \wedge z_i = z_j) \tag{14}$$

Here, $x_i$ and $x_j$ are the center horizontal coordinates, $r_i$ and $r_j$ are the row numbers, $z_i$ and $z_j$ are the Z coordinates, $w_i$ and $w_j$ are the width of cells i and j respectively.

Area Balancing Constraints of Each Tier/Layer:

$$\left(\frac{1-\epsilon}{2}\right)\sum_{i=1}^{i=n} w_i h \leq \sum_{i=1}^{i=n} w_i h p_{i,k} \leq \left(\frac{1-\epsilon}{2}\right)\sum_{i=1}^{i=u} w_i h \tag{15}$$

Here, $\Sigma_{i=1}^{i=n} w_i h$ represents the total standard cell area. h is the standard cell height, $w_i$ is the width of standard cell i. $p_{i,k}$ is 1 if cell i is assigned to layer k. The valid values of k are 0 and 1. E is the area relaxation factor which can be determined heuristically.

The pre-placed MIVs for power-delivery network should be considered. These MIV sites are reserved and should not be used for signal MIVs. This can be either added as an upfront constraint or can be taken care in the MIV legalization phase (no need of upfront constraints).

In case of F2F or F2B 3D techniques, the placement of IO ports or pads may be taken into consideration to limit the search space of finding optimal solution. Thus, problem is to solve (10) under constraints (11)-(15).

Various embodiments can evaluate the coefficients ($\alpha_{i,j}$, $\beta_{i,j}$) of the objective function (10) as discussed above. The parameter $\alpha$ represents the timing profile weight of a net, which has cell i as the driver cell and cell j as the receiver cell. It is determined based on the following factors:

Clock Frequency: For the given net passing through cells i and j, obtain the list of timing path passing through these cells. The valid timing path with fastest clock frequency (lowest clock period) is considered in determining $\alpha$.

Stages in timing path and slack profile: The timing path will be more constrained if there are more number of stages in it. Higher the number of stages, lower the timing budget per each stage/net. Thus, the slack associated with each net can be evaluated. If the slack/stage value is small, $\alpha$ will be small.

Fanout of source cell: For a given net, if the source cell has high fanout, then the slew rate of source cell is low which restrains the timing budget for net passing through this source cell.

Delay per micron: For a given technology, delay per micron is evaluated. This is used in determination of $\alpha$.

The parameter $\beta$ represents the 3D via and routing blockage penalty factor for cells i and j. It is determined based on the following factors:

Parasitics ($R_{MIV}$, $C_{MIV}$) and Dimensions of MIV: MIV size (diameter and depth), and parasitics ($R_{MIV}$, $C_{MIV}$) determine the coupling capacitance between two dies. The MIV parasitics will be more if size of monolithic inter-tier via (MIV) is big.

Fanout (Routing blockage impact on neighboring cells): If the fanout of source cell or receiver cell is high, the routing resources required are more. If MIV is inserted, it will create blockage in more paths. Hence, higher the fanout, higher is the impact of routing blockage due to MIV insertion on neighboring cells.

Self-Routing blockage impact: Due to MIV insertion, routing blockage is created, which adds some detour in 2D routing of the same net. This factor should be considered in determination of $\beta$.

Distance between tiers: The inter-die coupling capacitance depends on MIV size and distance between tiers, and starts dominating once inter-tier distance is less than 1 micron.

Hardware Security

While scaling is a central issue for the semiconductor industry, and the primary target of this thesis, there are other problems which can also be addressed using the methods explored here. Hardware security is one such problem. The following is a brief description.

For a device to go from initial design to large-scale fabrication and deployment, it is necessary to share sensitive intellectual property across many organizational and state borders. With the relevant pieces of information, an untrusted member in the supply chain can potentially counterfeit the original designs, and/or insert malicious components into the device. It is estimated that the semiconductor industry loses up to $4 billion annually because of the IP right violations, and an estimated $169 billion annually due to counterfeit ICs (which includes recycled, remarked, tampered, and overproduced ICs). The split-fabrication approach has been proposed as a solution to the hardware security problem. This involves fabricating the high-resolution front-end part of the circuit at an advanced and possibly untrusted foundry, with the lower-resolution circuit fabrication happening at a trusted (possibly local or in-house), but less advanced foundry (see FIG. 37).

Figure 37:
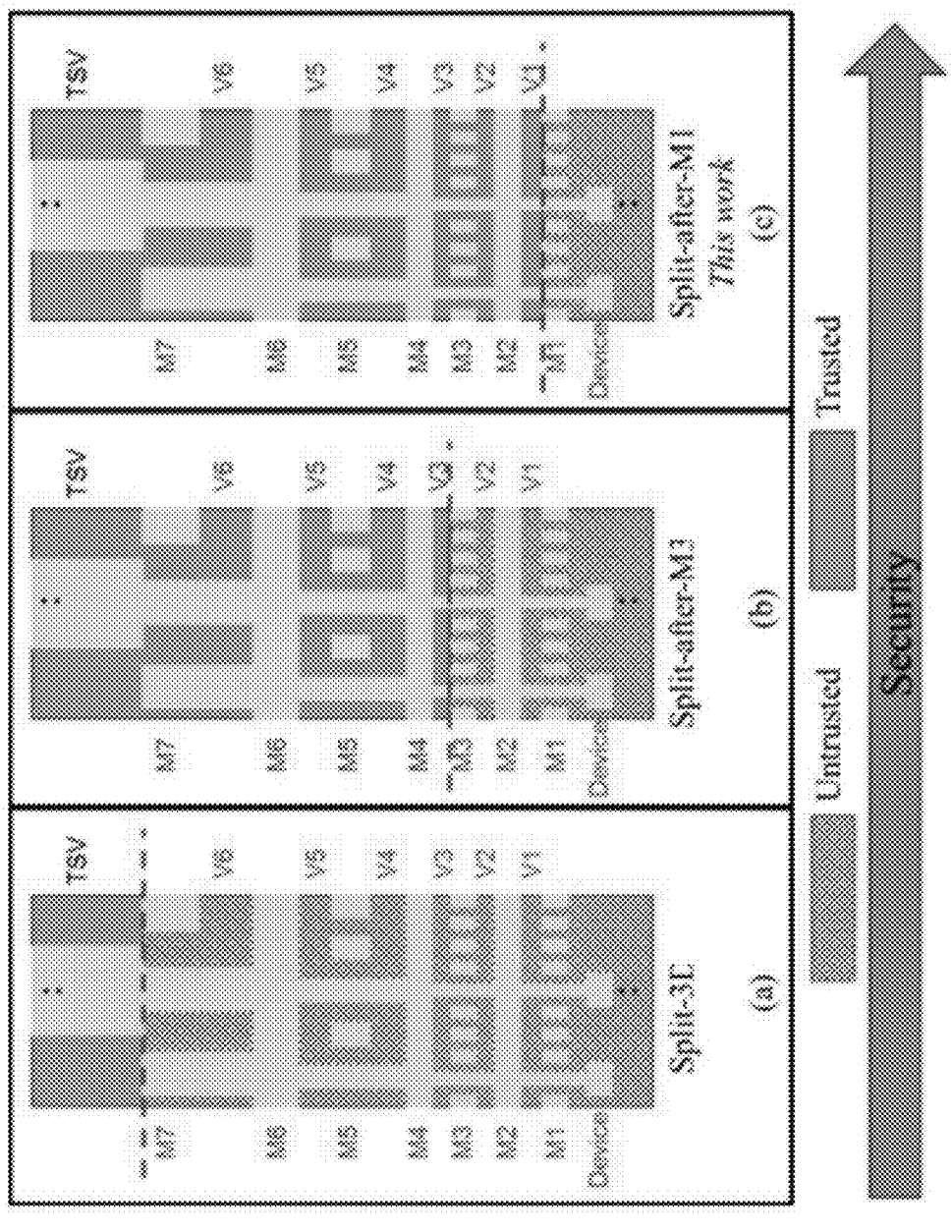
FIG. 37 is a diagram illustrating split-fabrication approach that may be used in some embodiments of the present technology.

FIG. 37 is a diagram 3700 illustrating split-fabrication approach that may be used in some embodiments of the present technology. However, split manufacturing does not guarantee security. For example, if fabrication up till metal-layer n happens at an advanced but untrusted foundry, where n>=2, then there is potential for trojan insertion, or for reverse engineering the chip connectivity (if n>3). On the other hand, if fabrication happens up till metal layer 1 at the untrusted foundry, then backend layers cannot be manufactured using existing trusted foundry infrastructure for advanced CMOS nodes.

Split-Design/Fab Approach for Hardware Security Using N-Map

Various embodiments can assemble a limited number of carefully designed front-end PFBs, and connect them using back-end metal layers, thereby allowing ASIC-like power, performance and area specs to be achieved. Some embodiments of the EDA methodology can be adapted, along with N-MAP, to enable a robust hardware security solution. By fabricating front-end circuit elements as part of PFBs at a potentially untrusted fab, and linking them together using PFBs that contain only metal layers (referred to as custom metal dies, or CMDs, from here on), various embodiments can essentially split the design of ICs in such a way that the untrusted fab has no way of knowing the eventual configuration and functionality of the completed device. If the front-end PFBs are assumed to contain circuit elements up to or below metal layer 2, assembly would require an overlay precision of ~17 nm ($\mu+3\sigma$) at the 14 nm node.

Figure 38:
FIG. 38 is a diagram illustrating split-fab (SDSF) using N-MAP in accordance with one or more embodiments of the present technology.

FIG. 38 is a diagram 3800 illustrating split-fab (SDSF) using N-MAP in accordance with one or more embodiments of the present technology. As illustrated in FIG. 38, untrusted facilities 3810 (e.g., P1, P2, and P3) can be used to PFBs (e.g., PFBs 1, 2, and 3). The PFBs may be the same or different. Similarly, additional potentially untrusted facilities (e.g., C1 and C2) can be used to make CMDs (e.g., CMD 1 and CMD 2). The CMDs may or may not be the same. In some embodiments, the PFB facilities may or may not be the same as the CMD facilities. The PFBs and CMD can be transferred to trusted facilities 3820. Using a pick-and-place assembly, trusted facilities 3820 can create the completed SoC.

Source wafers should ideally be fab agnostic. Since, bulk silicon is the most commonly used substrate in semiconductor fabrication, ideally, the source wafers should use bulk silicon as well. Some embodiments can use various methods for creating buried sacrificial layers after PFB fabrication (and prior to pick-and-place) in bulk silicon. As such, PFB wafers can be created at one foundry while the CMD wafers can be created at a second foundry. Then, in trusted facility 3820, the pick-and-place techniques described herein can be used to create the front-end of the SoC 3830 from the multiple PFB wafers (or single wafer with multiple PFBs). Then the pick-and-place assembly can place the CMD on top of the front-end of SoC 3830 to create the completed SoC 3840.

Figure 39:
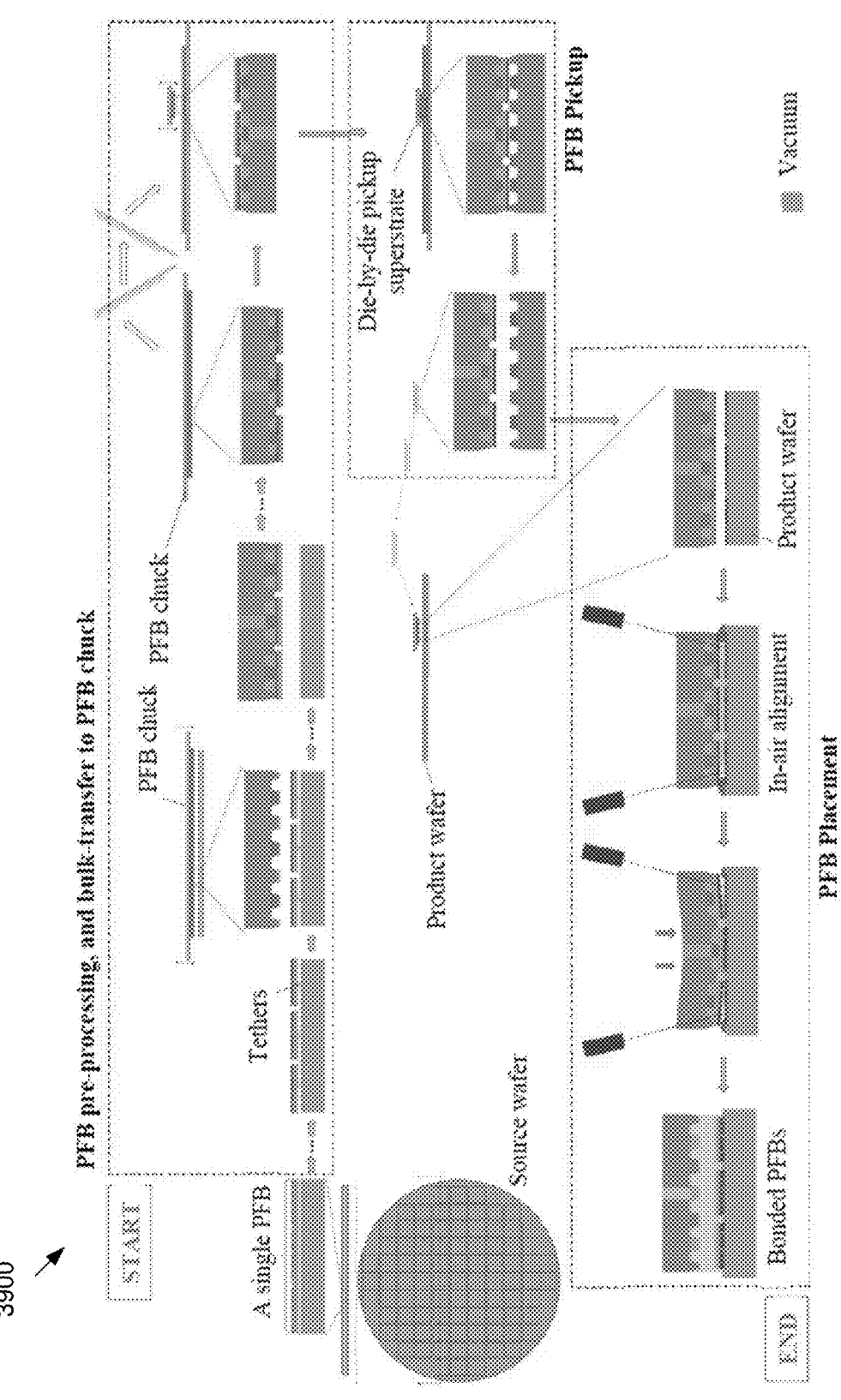
FIG. 39 is a block diagram illustrating an example of a vacuum-based pick-and-place assembly processed modelled along the lines of J-FIL that may be used in various embodiments of the present technology.
Figure 40:
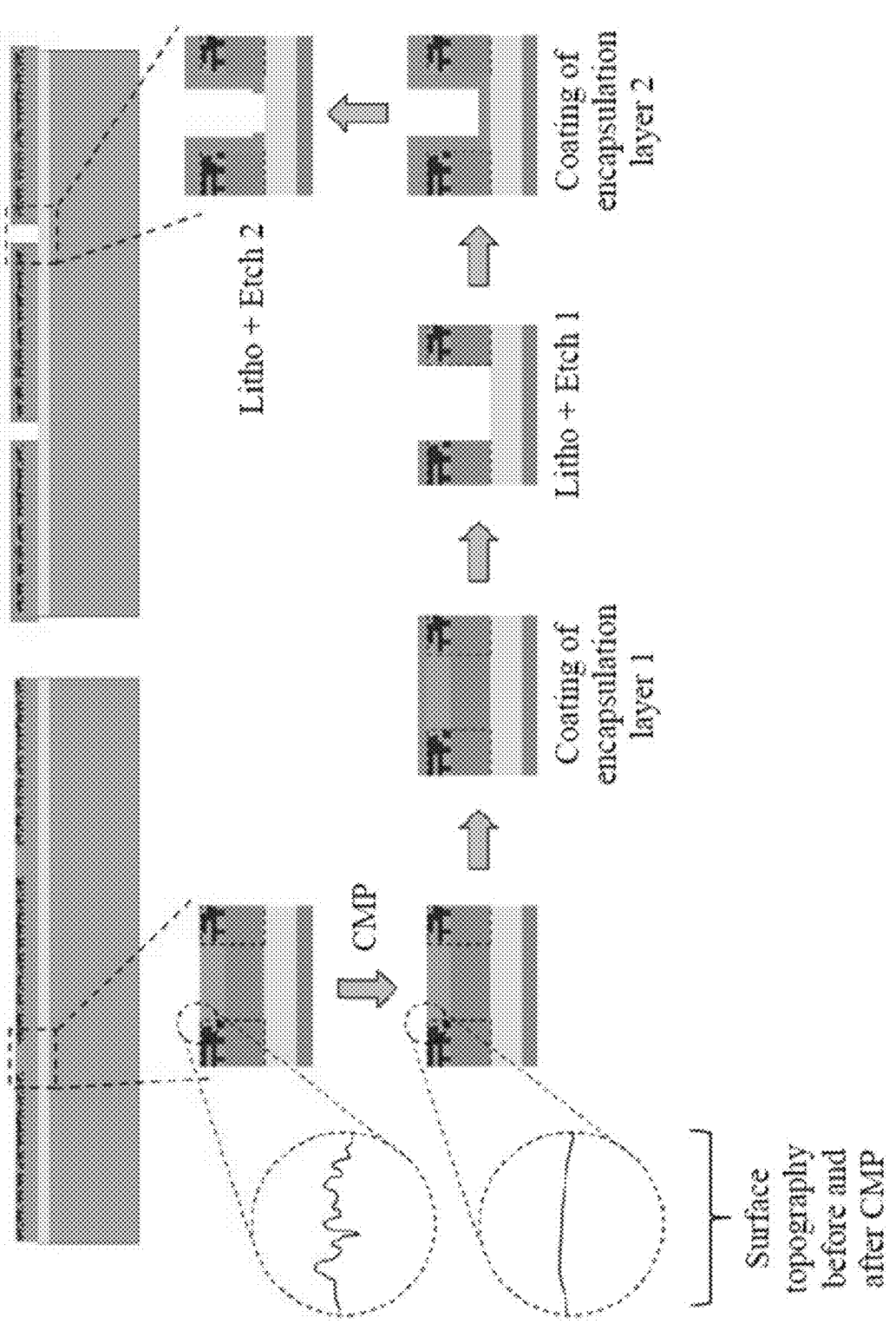
FIG. 40 is a diagram illustrating an access hole formation and encapsulation layer coating in accordance with some embodiments of the present technology.
Figure 41:
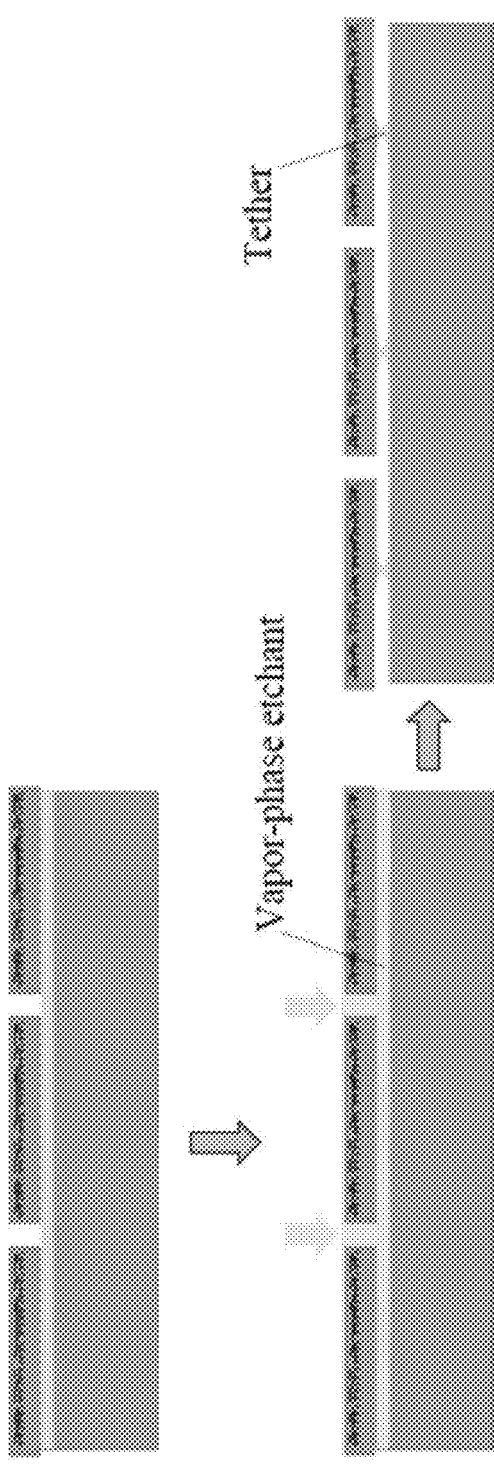
FIG. 41 is a diagram illustrating an example of a timed etch of sacrificial layer leaving behind ethers in accordance with one or more embodiments of the present technology.

FIG. 39 is a block diagram 3900 illustrating an example of a vacuum-based pick-and-place assembly process modelled along the lines of J-FIL that may be used in various embodiments of the present technology. Source wafers go through the following pre-processing steps before pick-and-place assembly (see, e.g., FIGS. 40 and 41). Chemical Mechanical Polishing (CMP) may be necessary for PFB bonding later in the process sequence, which requires mirror polished bonding surfaces. Encapsulation layer coating can be used to protect the polished surfaces against contamination, as well as to protect circuit elements in the PFB from chemical attack during tether formation. Access hole etch can be used to create access holes that are etched down to the buried sacrificial layer. A second encapsulation layer coating can be used in some embodiments to protect the sides of the PFBs. A tether etch can then be applied. This may involve partially etching off the buried sacrificial layer so that tether structures are left behind. The etch can be performed using vapor-phase etchants, to prevent PFB collapse due to stiction.

Figure 42:
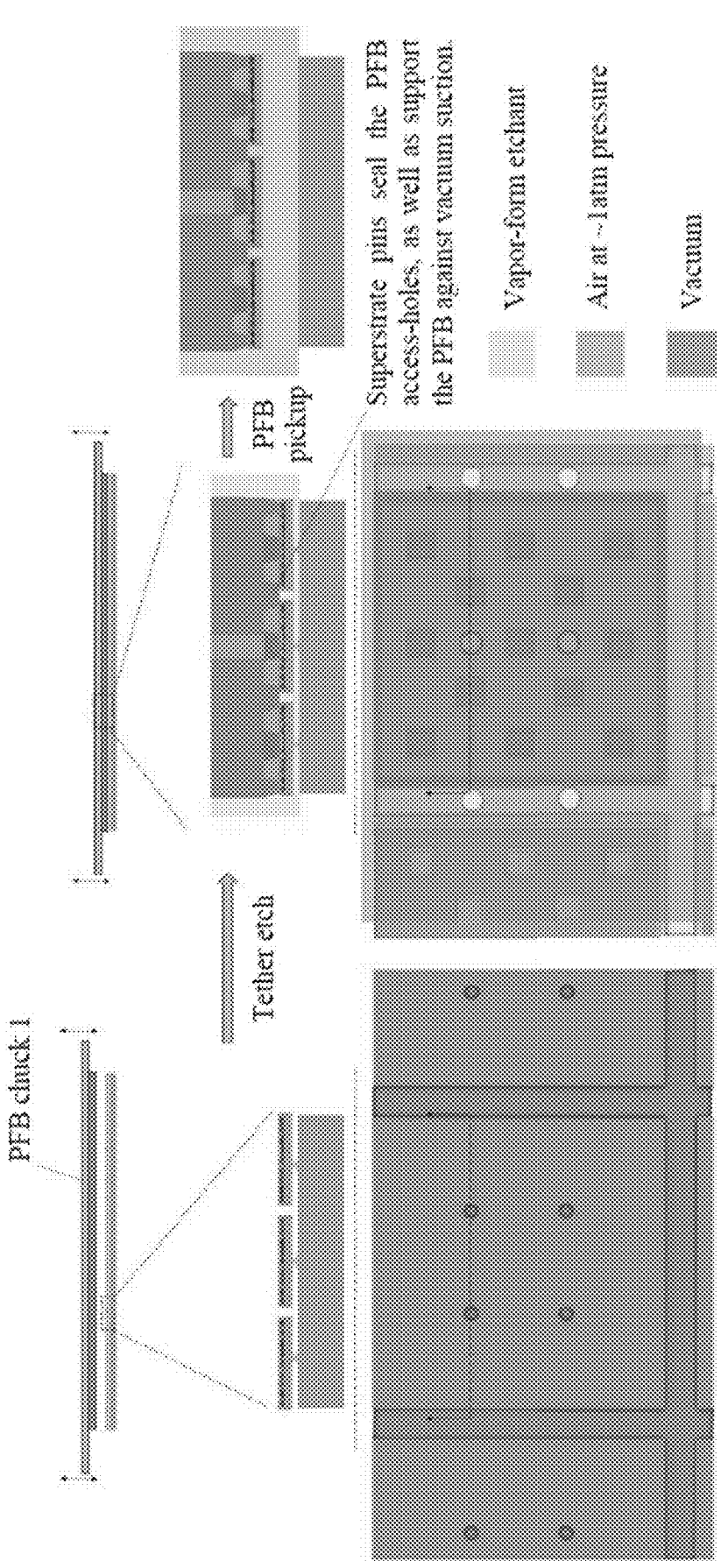
FIG. 42 is a diagram illustrating an example of PFB's being picked-up from the source wafer in accordance with various embodiments of the present technology.

In the default assembly configuration, PFB metal contacts are oriented towards the product wafer. Pick-and-place assembly, for this configuration, can be done in three stages. In the first stage, a PFB chuck attaches itself to all the PFBs (on a single source wafer) using vacuum suction (see, e.g., FIG. 42). A vapor-form etchant is dispensed through intermittent holes on the PFB chuck to etch off the tethers, followed by the PFBs being lifted away from the source wafer. The PFB chuck acts as temporary storage for the PFBs—as long as the vacuum-suction is maintained, and temperature conditions remain stable, PFBs will stay attached to the chuck with lithographic precision. It should be noted that suction regions on the PFB chuck are individually addressable to enable subsequent die-by-die pickup.

Figure 43:
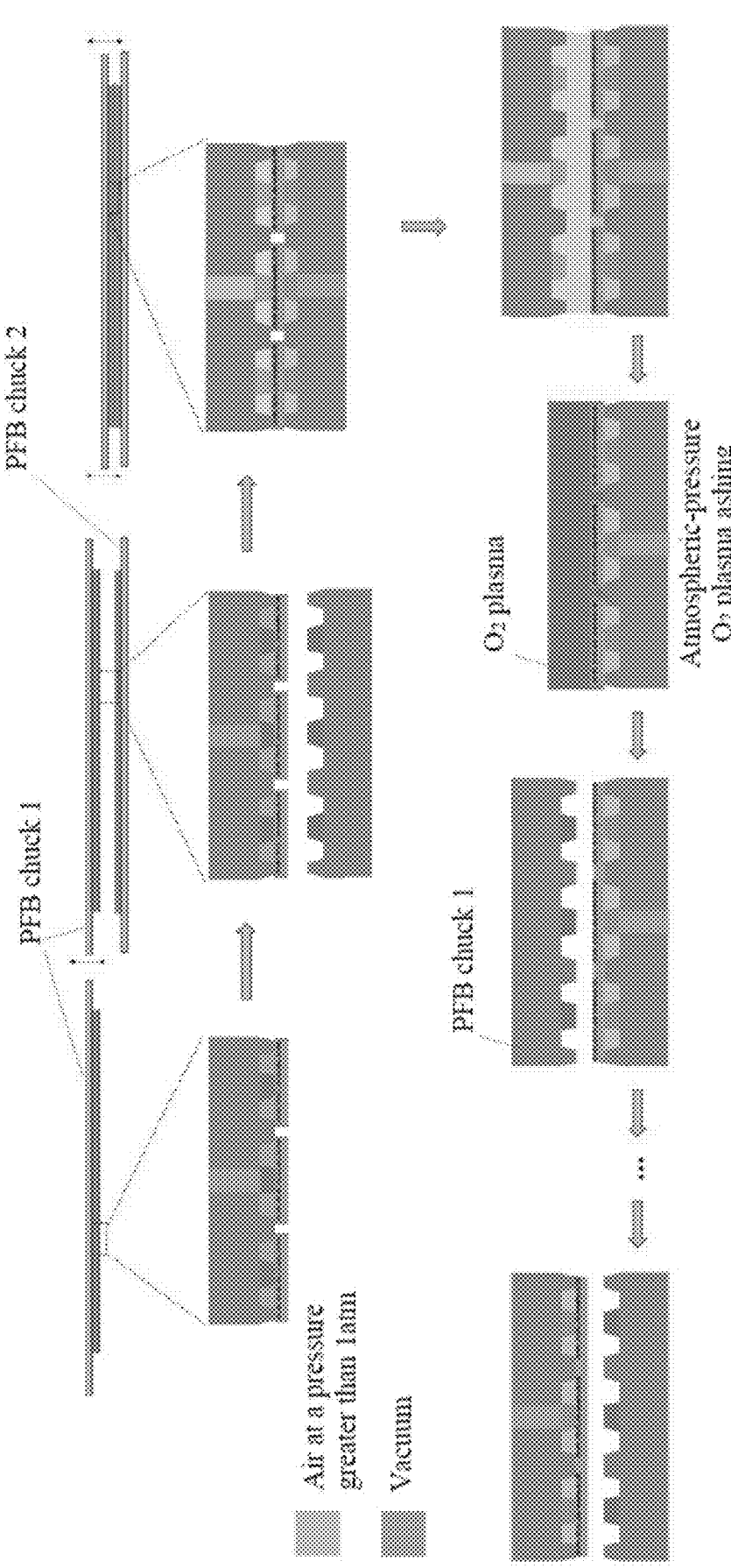
FIG. 43 is an example of a process sequence for encapsulation layer removal in the default assembly configuration in accordance with some embodiments of the present technology.

Before pick-and-place onto the product wafer, the encapsulation layer on PFBs needs to be removed. At this stage of processing, PFBs are oriented towards the PFB chuck, with the encapsulation layer sandwiched between the PFBs and the chuck. To flip the orientation, PFBs are transferred to a second PFB chuck (see, e.g., FIG. 43), which is then transferred to an atmospheric-pressure $O_2$ plasma asher. The asher removes the encapsulation layer, along with any organic contaminants on the PFBs. The PFBs are subsequently transferred back to the first PFB chuck.

Figure 44:
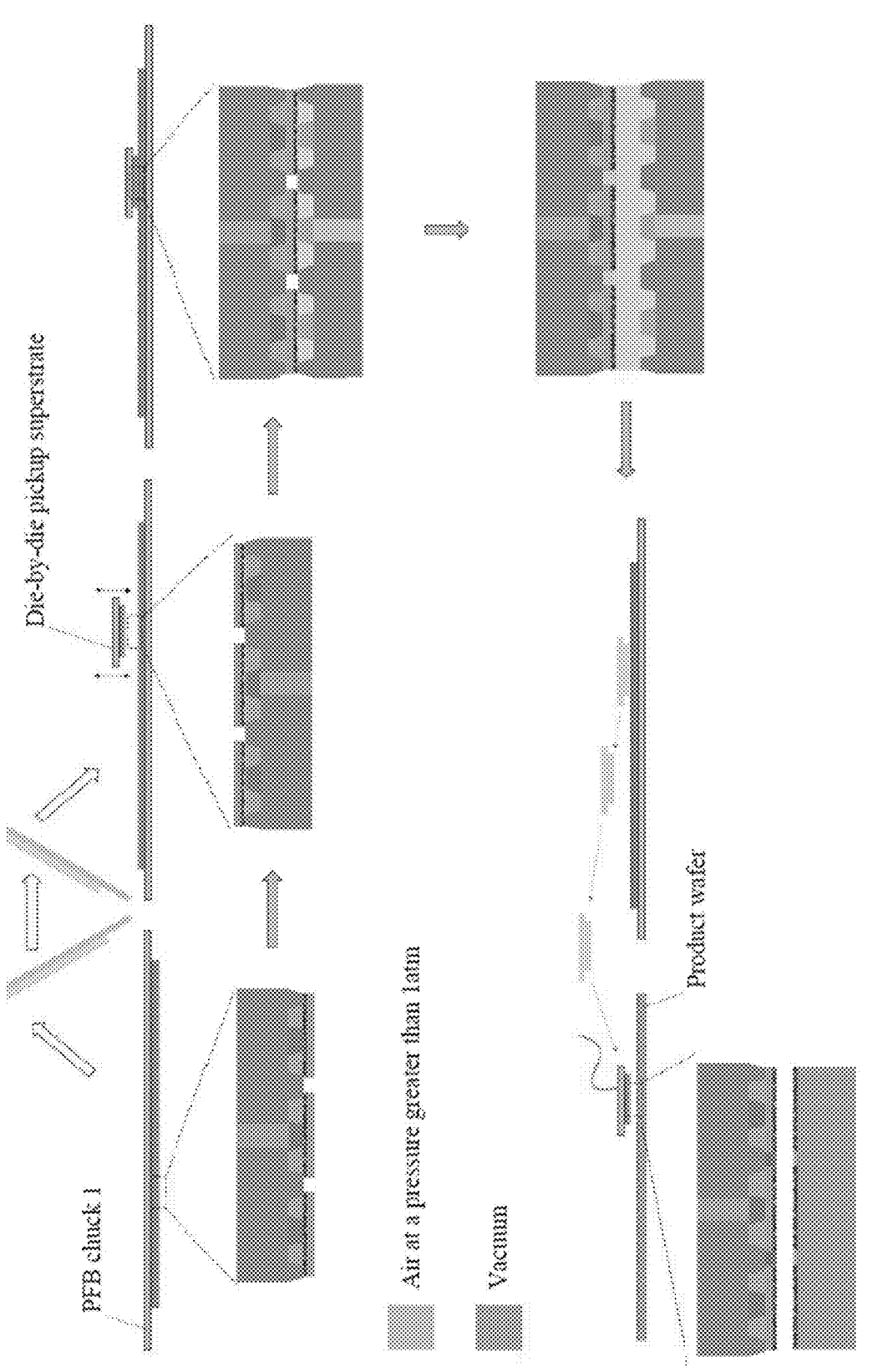
FIG. 44 is an example of a pick-and-place on to the producer wafer using the die-by-die pickup superstrate in accordance with one or more embodiments of the present technology.

In the third and last stage, a die-by-die pickup superstrate is used, which picks up individual PFBs from the PFB chuck, and places (and bonds) them onto the product wafer (see, e.g., FIG. 44). The die-by-die-pickup superstrate ensures that only known-good PFBs are picked up, thus enabling the high-yield requirement of N-MAP.

Figure 45:
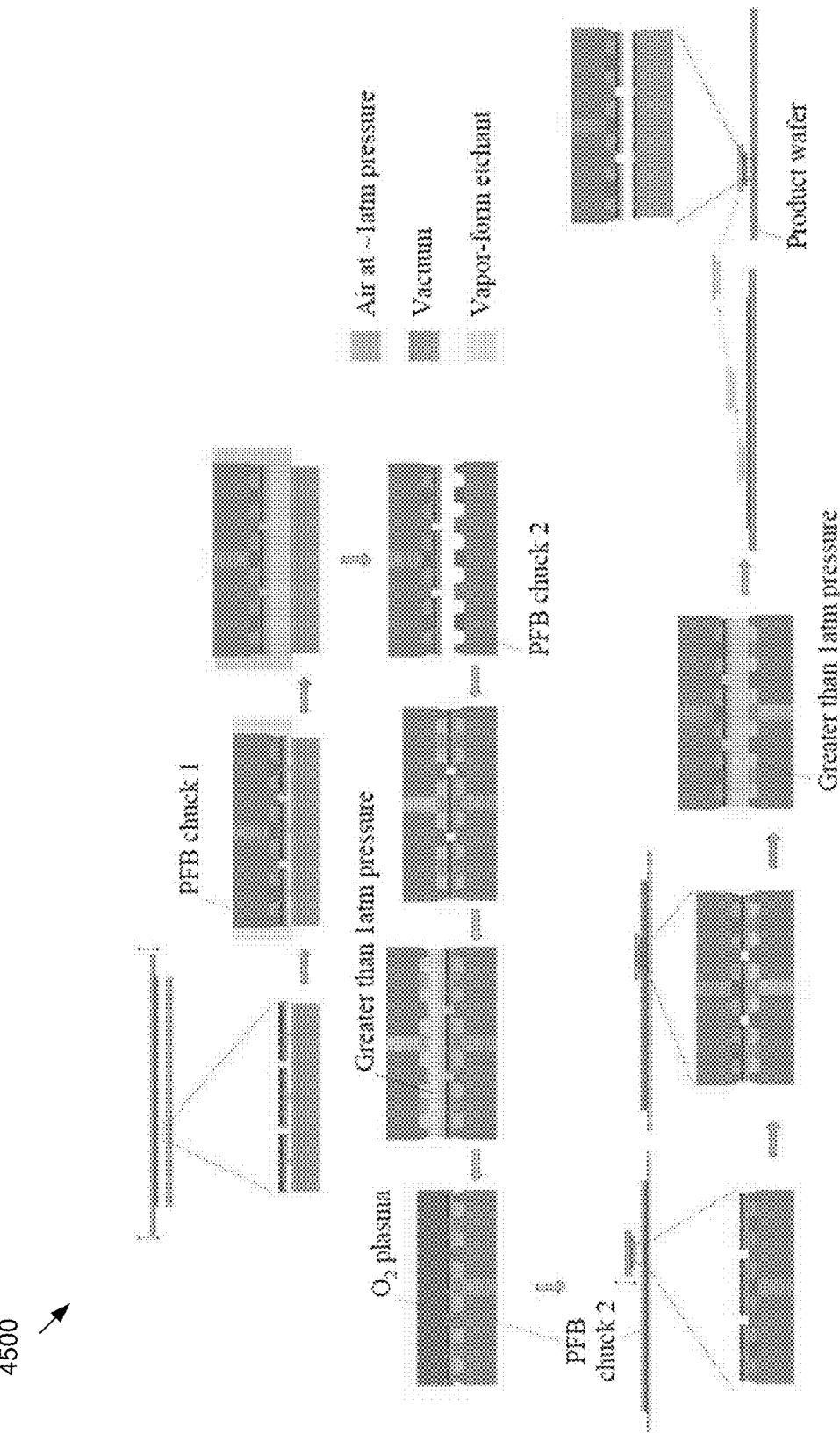
FIG. 45 is an example of a process sequence for assembly configuration 2, in which PFB metal contacts face array from the producer wafer in accordance with various embodiments of the present technology.

FIG. 45 shows the process sequence 4500 for the second assembly configuration, in which PFB metal contacts face away from the product wafer. The PFB chuck (which can be considered a bulk-pickup superstrate) and the die-by-die pickup superstrate are a vital part of the assembly process. They ensure that lithographic precision is maintained as PFBs are transferred from the source to the product wafer. During pickup from the source wafer, it is important that the pressure differential, between the top and bottom of the PFBs, is sufficient to keep them attached to the PFB chuck. This is primarily a concern during pickup from the source wafer. Once the PFBs have been picked up from the source wafer and are being transferred, for instance, from the PFB chuck to the die-by-die-pickup superstrate, the chuck can aid in the pickup by pressurizing one side of the PFBs. However, during pickup from the source wafer, pressurizing one side of the PFBs creates serious engineering challenges.

Figure 46:
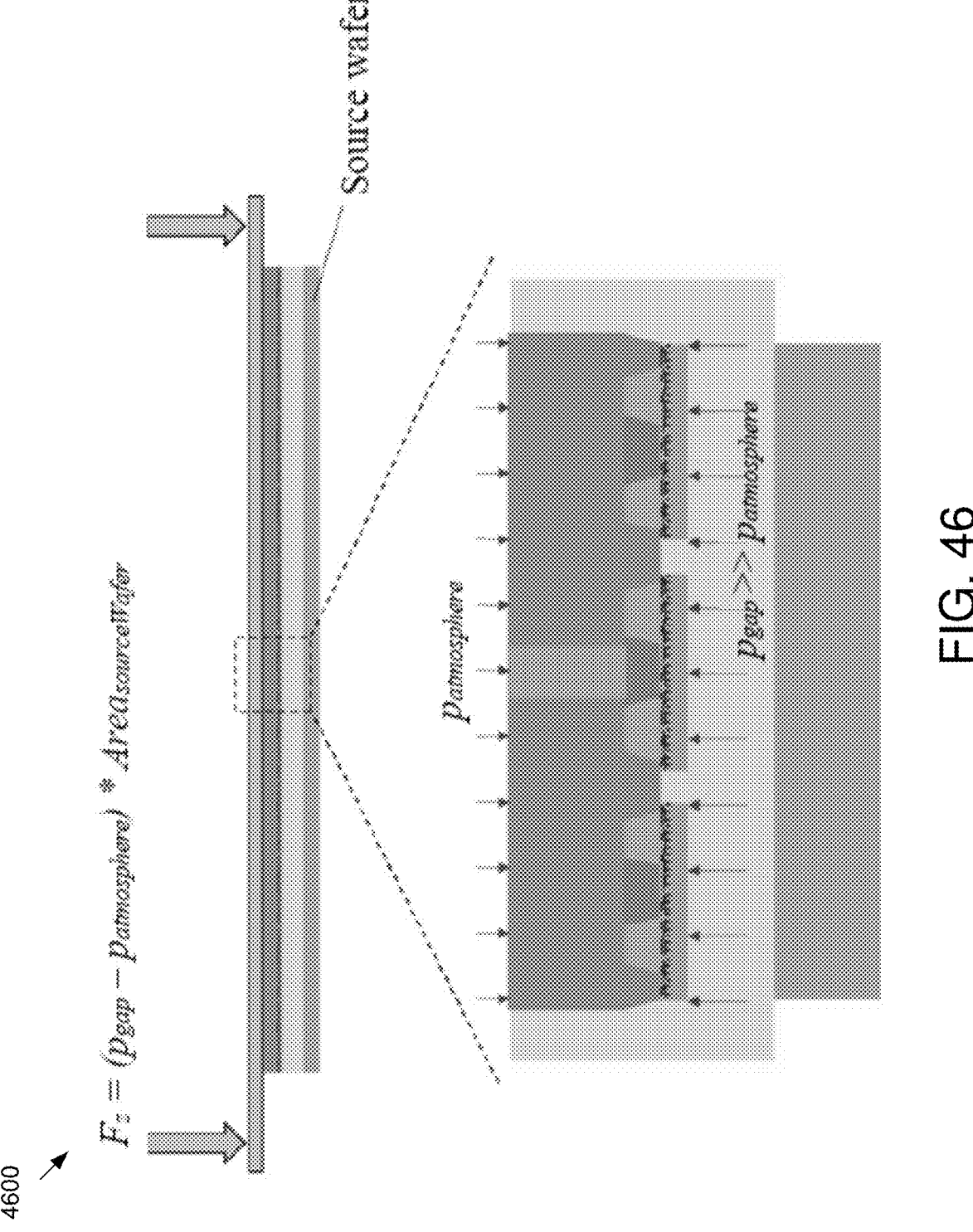
FIG. 46 illustrates an example of a scenario in which the gap pressure is considerably larger than the atmospheric pressure, during pickup from the source wafer.

FIG. 46 illustrates an example of a scenario 4600 in which the gap pressure is considerably larger than the atmospheric pressure, during pickup from the source wafer. Since all PFBs must be picked up during bulk-pickup, maintaining, for instance, 2 atm on one side of the PFBs\, over the area of a 300 mm wafer, requires the motion stage and the z-actuators to support an extra load of ~7 kN. The higher pressure also creates sealing problems at the edge of the source wafer and the superstrate. While, these are not fundamental challenges, it is preferable from an engineering standpoint to keep the pressure close to 1 atm.

Thus, without the ability to pressurize one side of the PFBs, and with limited air transport in the millimeter-scale-long micron-to-sub-micron-thin gap (between the PFBs and the source wafer), ensuring suction at all times requires careful analysis of the airflow during pickup. Superstrate pins can serve a variety of functions. For example, the superstrate pins can seal the access holes, and thus help in maintaining vacuum suction. In addition, superstrate pins can support the PFB against the force of vacuum-suction, while ensuring that no scratching or damage occurs to the PFB. The pin geometry (size, pitch, distribution) can be chosen in various embodiments such that the above two conditions are satisfied, while keeping the PFB-pin contact area as low as possible. Additionally, in some embodiments these scan be coated with a conductive layer, and have patterned roughness on their PFB-facing surface, to reduce adhesion effects. Note that by suitably modifying the pin pitch, arbitrarily thin PFBs can be held against the force of vacuum. This feature of the superstrate, along sacrificial layer enabled pick-and-place assembly, provide a significant advantage over grinding based methods for thin PFB fabrication and handling. Ground wafers are inherently limited to micron-scale (~10 um or larger) thicknesses due to limits on the degree of parallelism of the top and bottom surfaces of a source wafer.

Adhesive forces between the superstrates and the PFBs can lead to undesirable stiction issues. Adhesion is a complex phenomenon which arises mainly due to the interplay of the following three forces: 1) surface tension, 2) Van der Waals forces; and 3) electrostatic forces. Surface tension arises due to the interaction of adsorbed moisture on the contacting surfaces. To minimize surface tension, dry conditions should be actively maintained in the pick-and-place tool. Van der Waals forces arise due to instantaneous polarization of atoms and molecules (due to quantum mechanical effects) and are relevant only at sub-100 nm gap-scales. To reduce these, the surface of the superstrate pins should have patterned roughness of ~100 nm (Ra) or larger. Electrostatic forces arise due to charge generation and charge transfer during contact and are generally the hardest to eliminate. Some embodiments of the present technology can reduce electrostatic interactions minimizing contact electrification by using materials with small contact potential between the contacting surfaces. In addition, conductive materials which do not easily form highly insulating native oxides can be used in some embodiments. Contacting surfaces can be rough to minimize the contact area. Also, local deformations at the contact site (which can increase the net adhesive force) can be reduced using hard materials.

The superstrate material that is resistant to sacrificial layer etchants (for instance vapor HF) can be used in some embodiments. The superstrate material can be semiconductor grade, available in large form-factors, and be micromachine-able. In addition, in some embodiments the superstrate material can have a high hardness, to survive wear over multiple pick-and-place cycles, as well as to reduce stiction issues. The superstrate material used in some embodiments can have thermal properties which are close to the source and product wafers. The superstrate material should, ideally, be transparent to light in the visible or IR spectrum (to facilitate overlay metrology). Given these constraints, the choice of materials for the superstrate is fairly limited. Silicon, sapphire, fused silica, and silicon carbide (SiC) are likely the only common materials which satisfy all or most of the above. Of these, only silicon has a wide variety of micromachining techniques available to it and is likely the best option for the superstrate material.

Airflow Mechanics of Vacuum-Based Pick-and-Place Assembly

Figure 47:
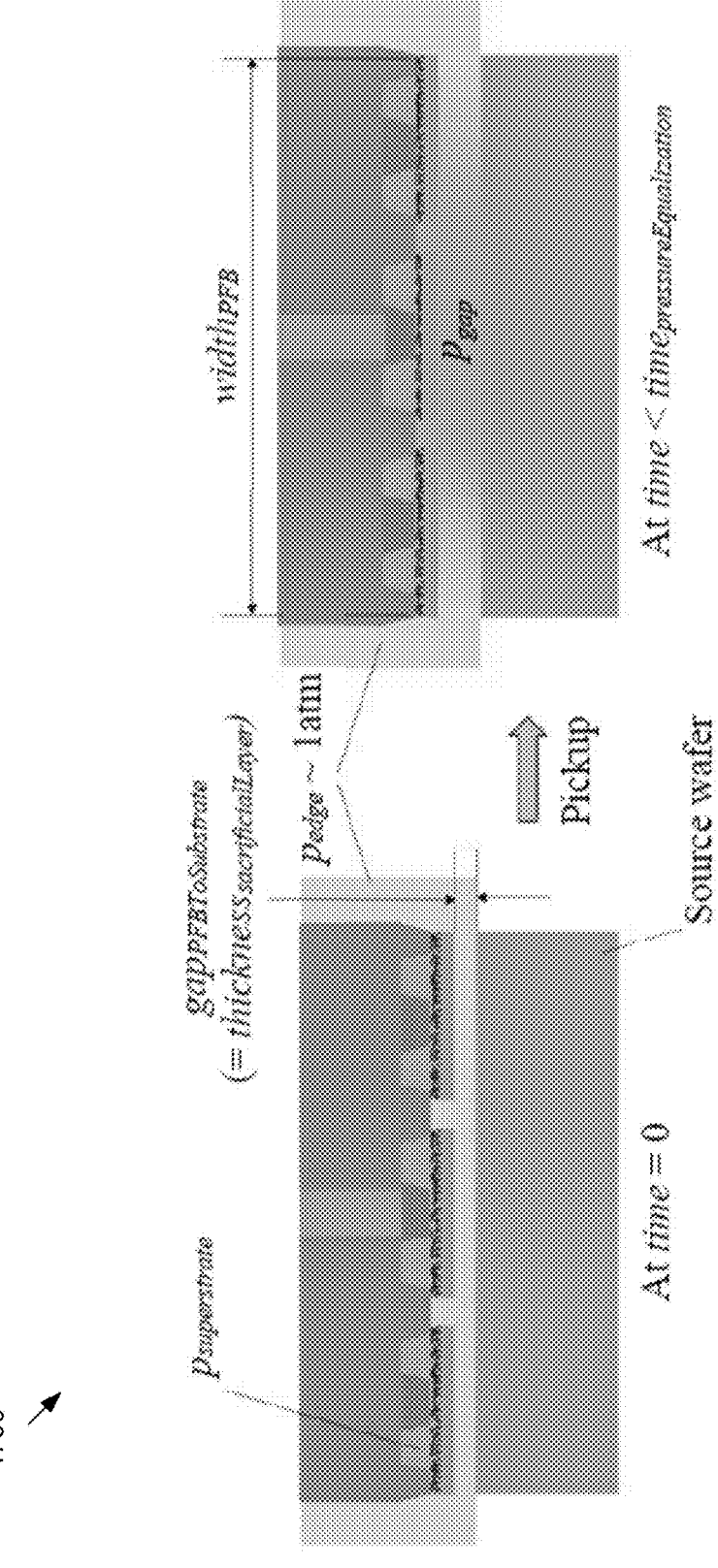
FIG. 47 is a diagram illustrating snapshots of the PFB during pickup from the source wafer in accordance with one or more embodiments of the present technology.

FIG. 47 is a diagram 4700 illustrating snapshots of the PFB during pickup from the source wafer in accordance with one or more embodiments of the present technology. As illustrated in FIG. 47, PFBs are lifted away from the source wafer and the following two competing effects take place: 1) Air rarefaction, as the gap expands between the PFBs and the source wafer; and 2) Pressure equalization, as air rushes in from the edges of the PFB, where large holes in the superstrate (10s of microns in width) maintain the pressure at ~1 atm.

These have significantly different timescales—

$$time_{rarefaction} \propto \frac{gap_{PFBToSubstrate}(\text{at time} = 0)}{v_{verticalPressureFront}}$$

$$time_{pressureEqualization} \propto \frac{0.5 * width_{PFB}}{v_{lateralPressureFront}}$$

Assuming $V_{verticalPressureFront} \sim V_{lateralPressureFront} \sim V_{soundAtRTP}$, $gap_{PFBToSubstrate} \sim 1$ um, and $width_{PFB} \sim 5$ mm, then $time_{pressureEqualization}$ is about three orders of magnitude larger than $time_{rarefaction}$. Thus, if a PFB is picked up faster than pressure equalizes in the gap, it risks losing suction. In fact, a local $p_{gap}$ which is slightly lower than $p_{superstrate}$, over millimeter-scale areas, would lead to significant distortion of the PFBs, potentially leading to loss of overlay, as well as damage to the PFB circuit elements. For instance, with $p_{superstrate} \sim 0.1$ atm, average $p_{gap} \sim 5\%$ lower than $p_{superstrate}$ over a 1 mm-wide local region, and $thickness_{PFB}$ 1 um, a deflection of ~30 um occurs at the center of the local region. If $gap_{PFBToSubstrate}$ at this point were smaller than 30 μm, the PFB would likely have crashed into the source wafer. Thus, a good rule-of-thumb during pickup is to maintain a minimum pressure, $p_{gap}^{min} = k_{pressureMargin} * p_{superstrate}$, in the gap at all times. In subsequent analysis, we assume $k_{pressureMargin} = 5$, $p_{superstrate} = 0.1$ atm and $p_{gap}^{min} = 0.5$ atm. Various embodiments may use more precise estimates of $time_{pressureEqualization}$, and use that to derive a suction-ensuring superstrate motion plan.

As PFBs are urged towards the product wafer for placement and bonding, the following two competing effects take place (roughly time-reversed versions of corresponding effects during pickup): 1) Air compression, as the gap contracts between the PFB and the product wafer; and 2) Pressure equalization, as air rushes out towards the edges of the PFB, where large holes in the superstrate maintain the pressure at ~1 atm.

Air compression increases the stiffness of air between the PFB and the product wafer, providing a potential mechanism for in-air overlay correction during PFB placement. The compressed air eventually dissipates as the air rushes out towards the edges. Some embodiments may use estimates for this dissipation time, which could later inform a tool designer on the timescales available for in-air overlay correction.

Figure 48:
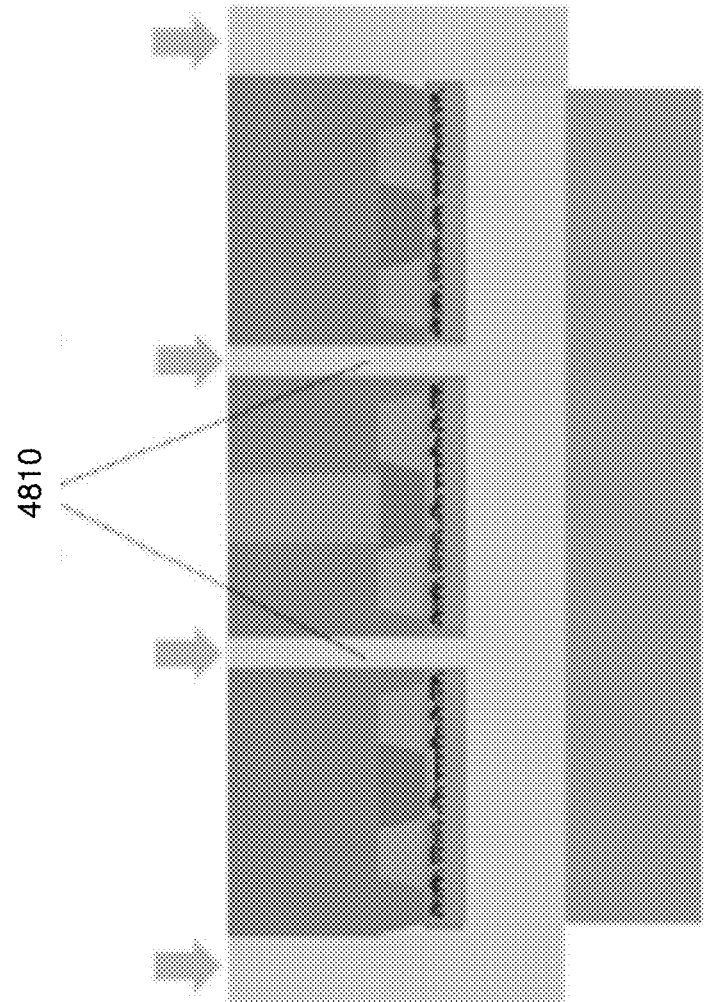
FIG. 48 illustrates holes in the superstrate pins that may be used in some embodiments of the present technology.
Figure 49:
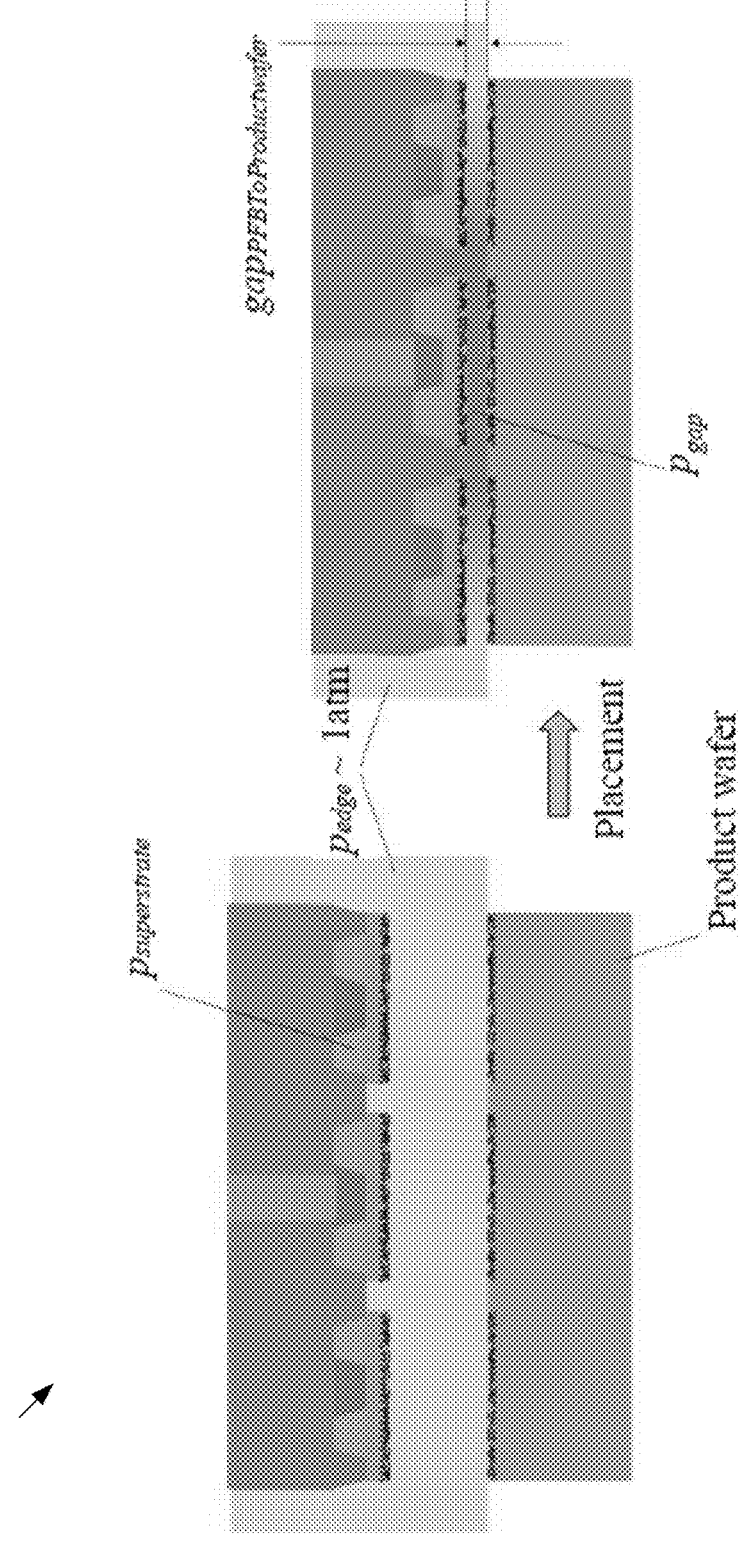
FIG. 49 illustrates a snapshot of the PFB before placement on to the production wafer in various embodiments of the present technology.

FIG. 48 illustrates holes in the superstrate pins 4810 that may be used in some embodiments of the present technology. The PFB is attached to the superstrate. As you pull the PFB out a suction can be created damaging the PFB. Some embodiments can use holes in the superstrate to prevent the suction. FIG. 49 illustrates a snapshot 4900 of the PFB before placement on to the production wafer in various embodiments of the present technology. Various embodiments can use the results of PFB pickup simulations, at various values of $width_{PFB}$ and $thickness_{sacrificialLayer}$, and to derive a suction-ensuring motion plan for the PFB chuck.

Figure 50:
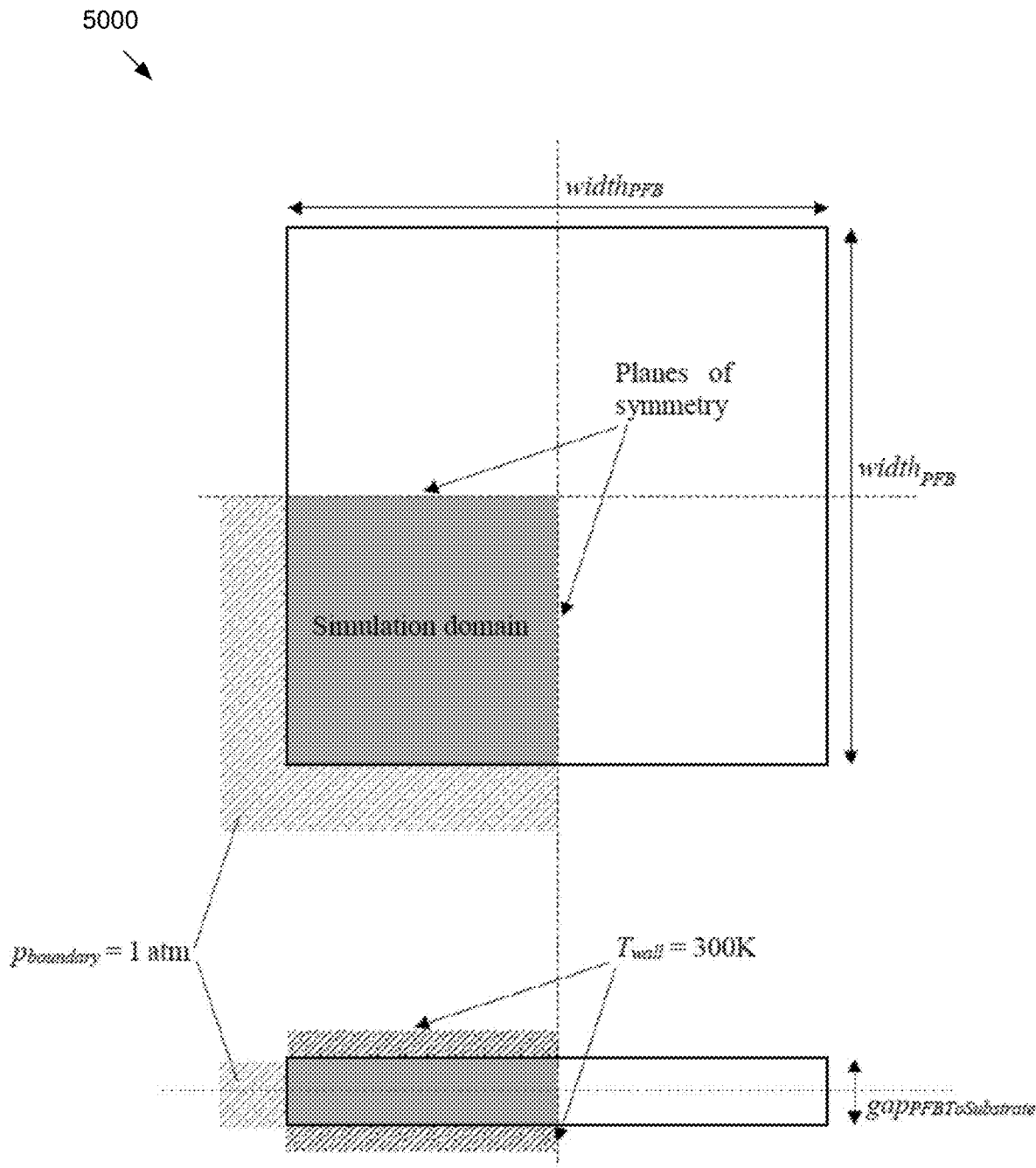
FIG. 50 illustrates a domain for DSMC simulation of PFB pickup in various embodiments of the present technology.

FIG. 50 illustrates a domain for DSMC simulation 5000 of PFB pickup in various embodiments of the present technology. The following preliminary assumptions are made to reduce the simulation complexity. First, the gap between the PFBs and the source wafer is assumed to be a cuboid. The access holes, which constitute a small fraction of the gap volume, are not modelled. Second, given the two-fold symmetry of the cuboidal geometry with regards to air flow, only a quarter of the volume is modelled. Finally, the edges of the PFB are assumed to be at 1 atm pressure.

This is ensured by large holes in the streets of the PFB chuck, which maintain the pressure ~1 atm.

The intrinsic state of air, outside the simulation domain, is prescribed as follows: 1) The air is assumed to be constituted of two molecular species—N2 and $O_2$, present in number densities of $1.901 \times 10^{25}$ m$^{-3}$ and $0.546 \times 10^{25}$ m$^{-3}$ respectively, which corresponds to the number densities of these species in air at 1 atm pressure. 2) The air is assumed to be quiescent (zero net velocity). The simulation volume can be discretized using hexahedral mesh elements, with size$_{mesh}$=33 nm for all edges of all mesh elements.

The following boundary conditions can be used in some embodiments. The silicon surfaces at the top and bottom of the simulation domain are modeled as walls, with the wall-air collisions being modeled using a mixed (diffuse and specular) wall interaction model. The temperature at the walls is set to 300K. Of the four vertical faces of the simulation domain, two are set to inflow boundaries, through which air at 1 atm can flow in or out, and the other two are symmetry boundaries as illustrated in FIG. 50.

The extrinsic parameters for the simulation are thickness$_{sacrificialLayer}$ and width$_{PFB}$. Due to computational constraints, the simulation is run with only small values of width$_{PFB}$ and thickness$_{sacrificialLayer}$. In the current set of simulations, width$_{PFB}$ is kept below 60 μm, and thickness$_{sacrificialLayer}$ is kept below 2.5 μm. Later the data can be extrapolated to millimeter-wide volumes. For a given set of values of thickness$_{sacrificialLayer}$ and width$_{PFB}$, a suction-ensuring pickup plan can be developed.

Figure 52:
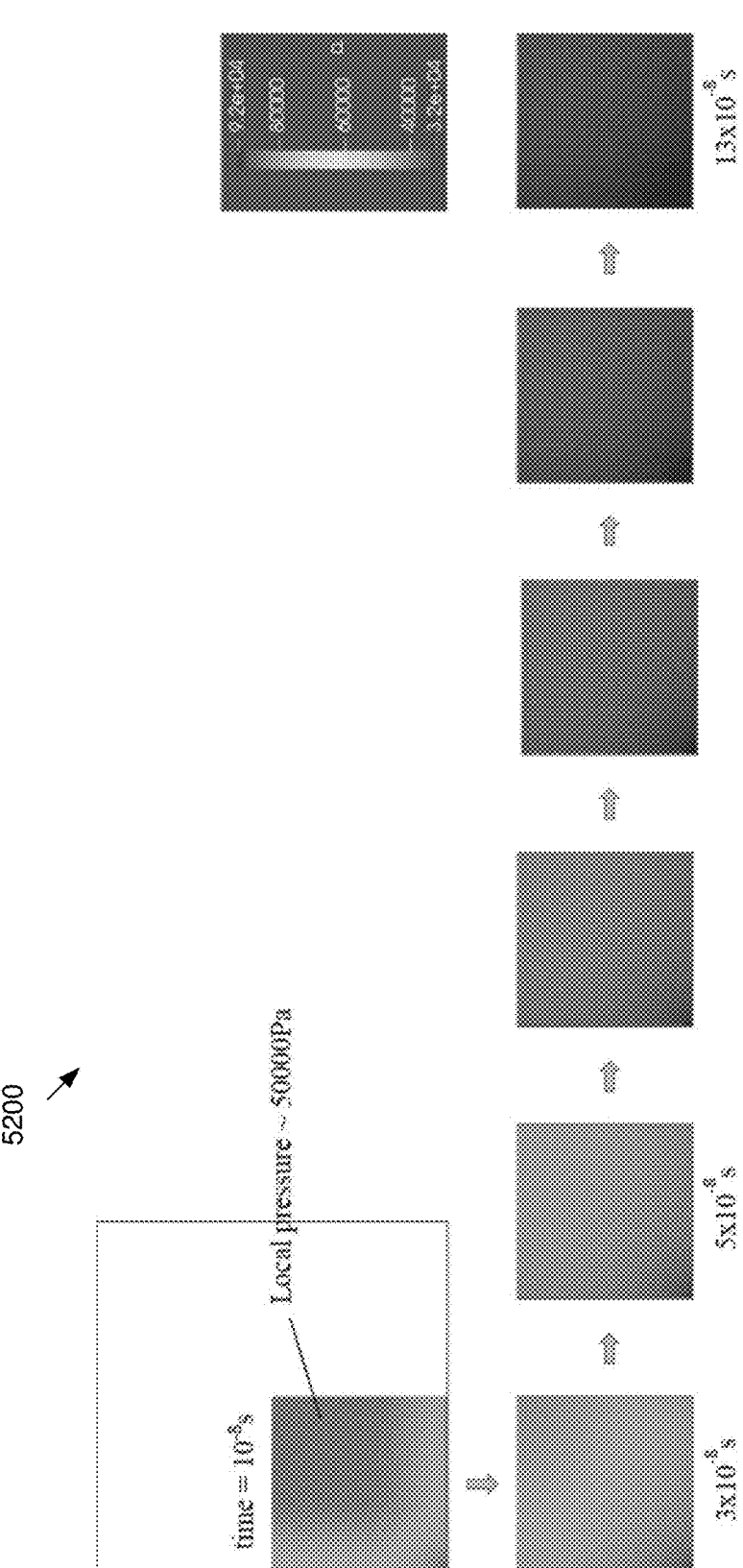
FIG. 52 illustrates an example of a DSMC simulation of pressure in various embodiments of the present technology.
Figure 53:
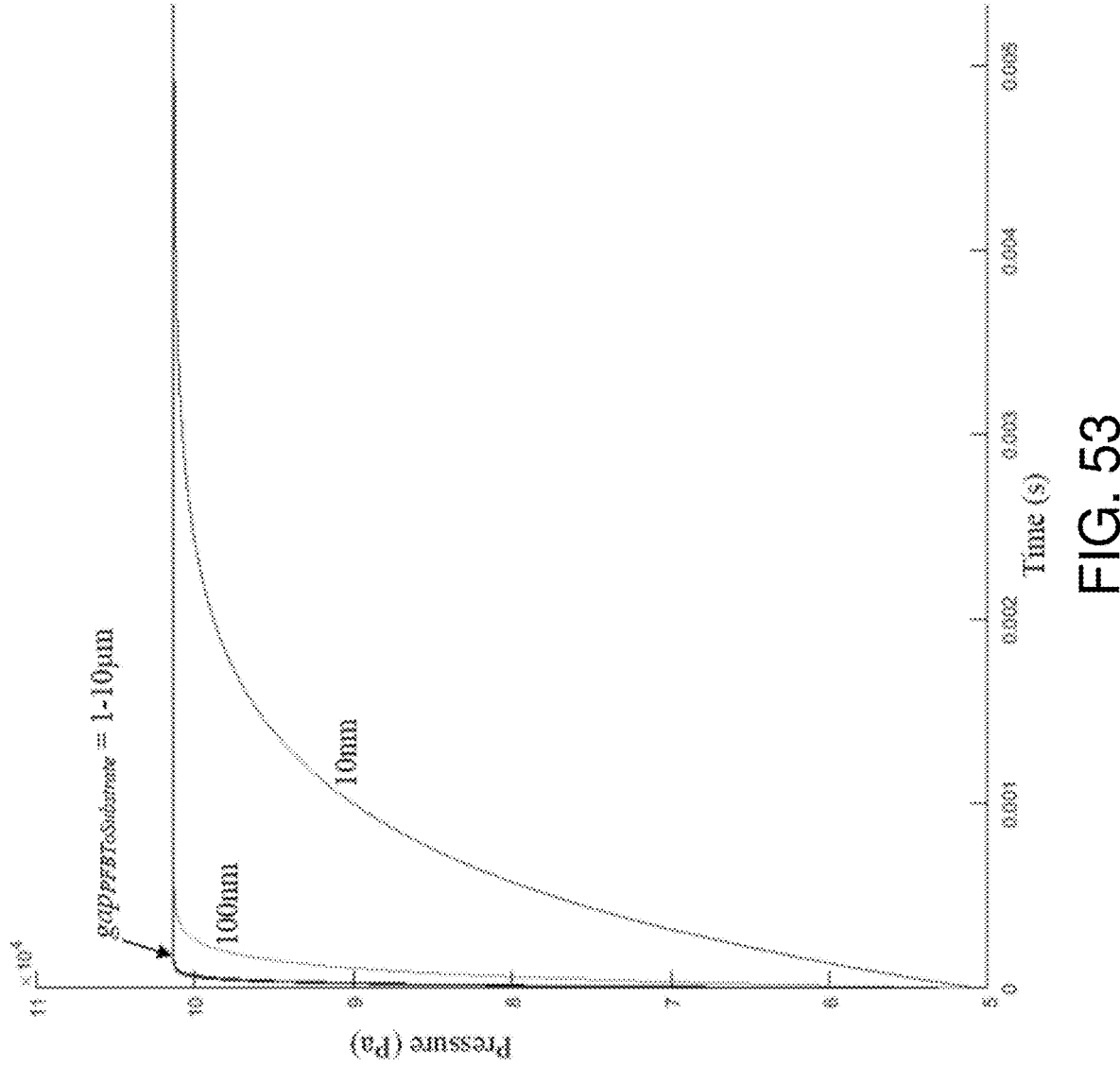
FIG. 53 is a plot illustrating an example of an evolution of average pressure gap in various embodiments of the present technology.

FIG. 51 is a flowchart 5100 illustrating an example of a set of operations that may be used for derivation of a suction-ensuring pickup plan in accordance with some embodiments of the present technology. FIG. 52 illustrates an example of a DSMC simulation 5200 of pressure in various embodiments of the present technology. FIG. 53 shows the evolution 5300 of avg($p_{gap}$) for width$_{PFB}$=5 mm, and at various values of gap$_{PFBToSubstrate}$. Note that the pressure equalization rate starts slowing down significantly around a gap of ~100 nanometers, which is likely when the molecular flow starts dominating.

Figure 54:
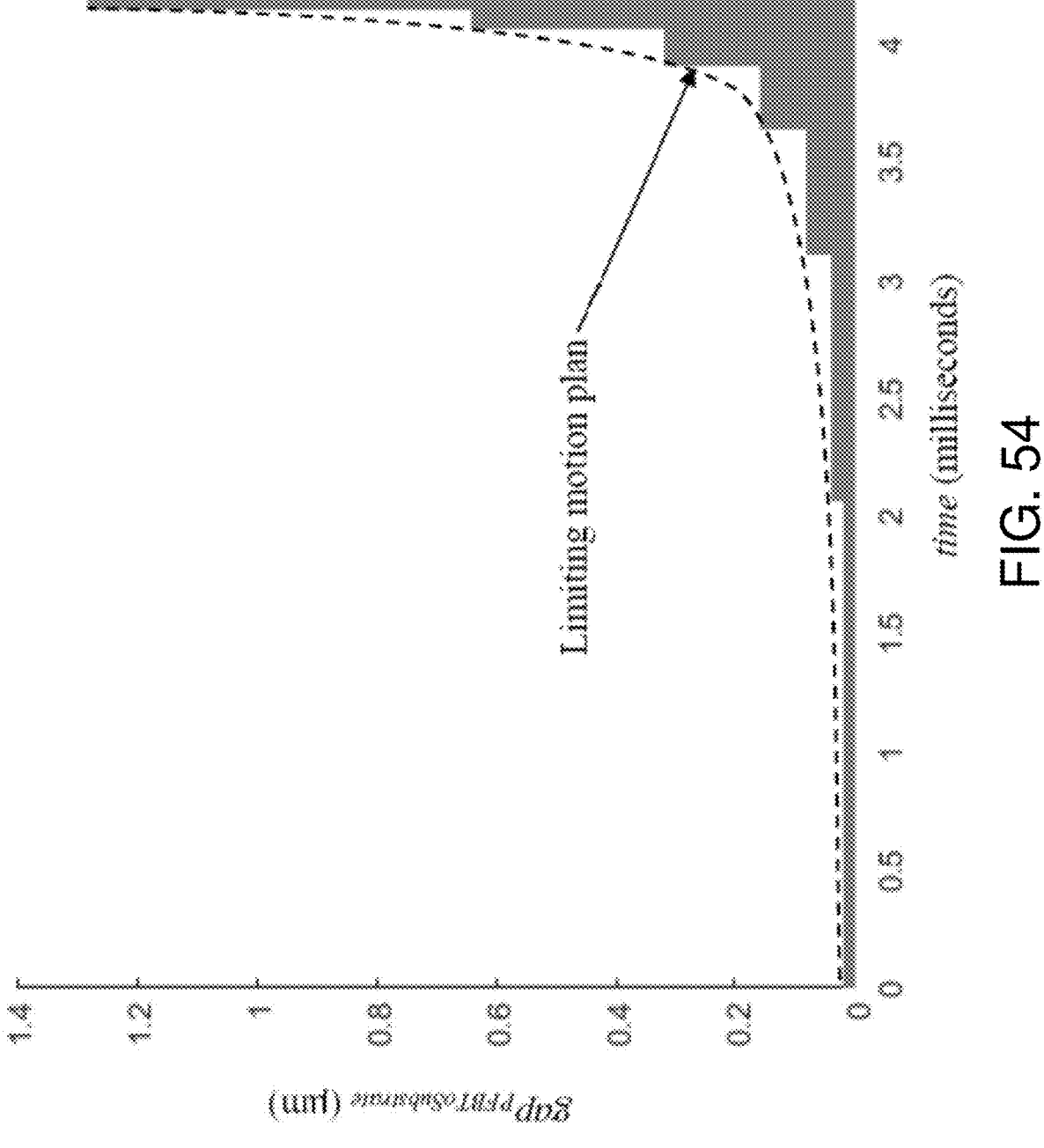
FIG. 54 is a plot of an example of a suction-ensuring motion plan for 2D-die pickup from a source wafer in various embodiments of the present technology.

FIG. 54 shows a suction-ensuring motion plan 5400 derived for a thickness$_{sacrificialLayer}$=0.01 μm, and width$_{PFB}$=5 mm. A suction-ensuring motion plan for 2D-die pickup from the source wafer. Here, thickness$_{sacrificialLayer}$=0.01 μm, and width$_{PFB}$=5 mm. A motion plan would be suction-ensuring, as long as the slope of gap vs time, at any particular gap value, is lower than the corresponding slope of the limiting motion plan above.

DSMC Simulation of PFB Placement

The PFB placement simulation used in some embodiments can include a simulation domain and intrinsic parameters that are the same as that for the pickup case. The extrinsic parameters can be gap$_{PFBToProductWafer}$ and width PFB. Due to computational constraints, the simulation may only be run with small values of gap and width in some embodiments. In the current set of simulations, width$_{PFB}$ is kept below 20 μm, and gap$_{PFBToProductWafer}$ is kept below 4 μm. However, the data can be extrapolated to millimeter-wide volumes. For a given set of values of gap$_{PFBToProductWafer}$ and width$_{PFB}$, the placement time estimate is derived as follows.

Figure 56:
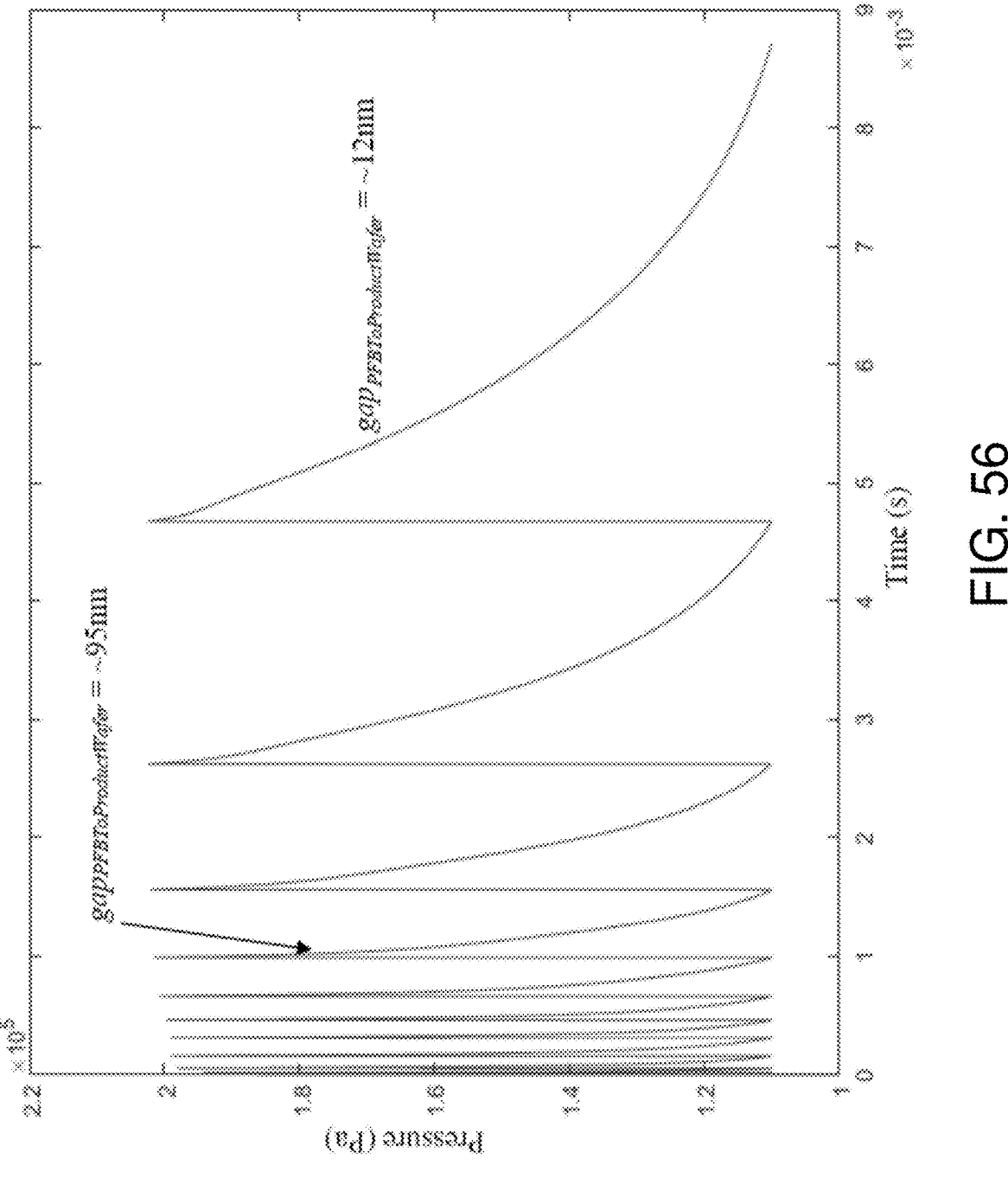
FIG. 56 is a plot illustrating an example of an evolution of an average pressure gap for PFB placement in one or more embodiments of the present technology.

FIG. 55 is a flowchart 5500 illustrating an example of a set of operations for derivation of placement time estimate that may be used in some embodiments of the present technology. FIG. 56 is a plot 5600 illustrating an example of an evolution of an average pressure gap for PFB placement in one or more embodiments of the present technology. As illustrated in FIG. 56, the evolution of avg($p_{gap}$) for width$_{PFB}$=5 mm, based on the algorithm discussed above. The placement time estimate is ~10 milliseconds. Note that this can be increased by constricting the airflow by dispensing more volatile liquid on the edges of the PFB.

Source Wafers for N-MAP

Some embodiments may assume that source wafers with suitable sacrificial layers are available, and given this assumption, the rest of the N-MAP process can be explored. As mentioned earlier, source wafers should ideally be fab agnostic. Since, bulk <100>-orientation silicon is the most widely used substrate in semiconductor fabrication, the source wafers should use this as well. However, bulk silicon does not contain any buried sacrificial layers, and thus, in this native form, cannot be used for N-MAP.

If one could create a buried sacrificial layer in fab-processed bulk silicon wafers without damaging the circuit elements, that would be the ideal technology option for the source wafers. On the other hand, SOI substrates already contain a buried sacrificial layer and do not require the development of any additional post-fab process. However, SOI substrates are currently processed by only one of the four major semiconductor fabs around the world. Various embodiments provide for source wafer technology options ranging from SOI on one end, to (potential) methods for creation of post-fab bulk-silicon sacrificial layers on the other, each of which has its own set of advantages and risks.

Table 5.2 below shows three technology options for source wafers.

TABLE 5.2

Technology options for source wafers with buried sacrificial layers

| | Applications | |
|---|---|---|
| Technology options | Logic | Memory (DRAM) |
| Silicon on Insulator (SOI) | Limited to Global Foundries (GF) | Cost concerns |
| Buried Epitaxial Sacrificial Layers (BESL), which leverages FIPOS (variant 2) | Needs collaboration with a fab | Cost concerns |
| Post-fab sacrificial layer creation in bulk Si | No fab dependence | No fab dependence, or cost concerns |

SOI is the default option in many embodiments, since this already contains a buried sacrificial layer. However, SOI is currently processed at only a single large fab—Global Foundries. Additionally, SOI would have significant cost barriers for memory applications.

BESL, which is based on the second variant of FIPOS, requires collaboration with a fab to process the epitaxial wafers needed to create the porous underlayer. However, recent implementations of epitaxial wafers in advanced logic devices, such as FinFETs and Gate-All-Around FETs, creates an opportunity for this in the logic space. The third option, and the most preferred one from an applicability standpoint, is post-fab creation of sacrificial layers in bulk Si.

Creation of Buried Sacrificial Layers in Bulk Silicon

Figure 57:
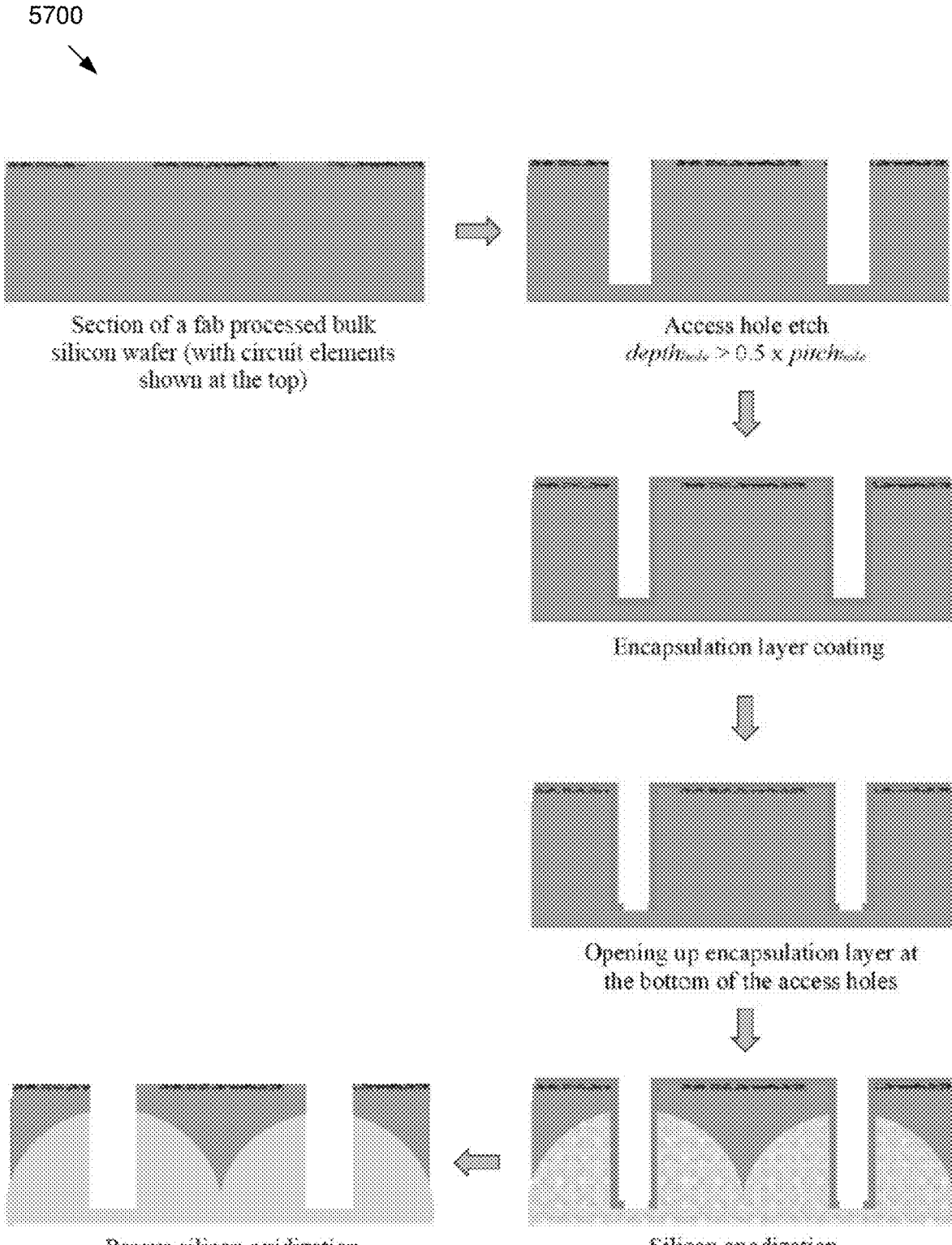
FIG. 57 is an example of a process flow for creation of a buried sacrificial layer in bulk silicon in accordance with various embodiments of the present technology.
Figure 58:
FIG. 58 is an example of a process flow for creation of a buried sacrificial layer in bulk silicon in accordance with some embodiments of the present technology.

FIG. 57 is an example of a process flow 5700 for creation of a buried sacrificial layer in bulk silicon in accordance with various embodiments of the present technology. As illustrated in FIG. 57 the porous layer can subsequently be oxidized to create a post-fab buried sacrificial oxide layer). However, this process sequence is not ideal since large kinks are created on the underside of the PFBs due to the isotropic propagation of porosity. FIG. 58 shows an alternate sequence 5800 in which, by applying an electric field near the surface of the silicon wafer, one can repel holes (which are needed for porosity creation), potentially arresting the vertical etch front and significantly reducing, even eliminating the kinks.

Experimental Validation

Figure 59:
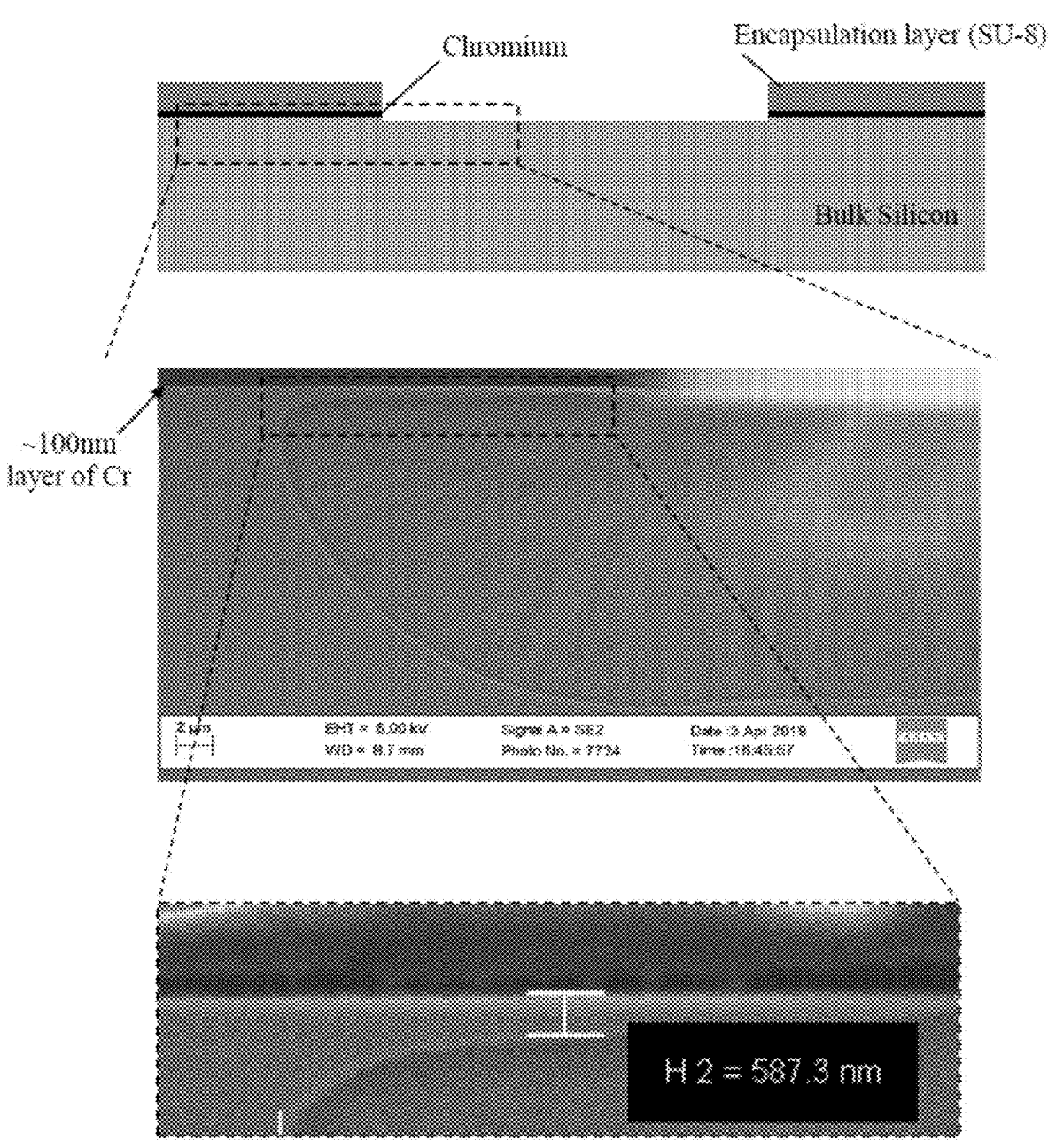
FIG. 59 illustrate porosity repelling in silicon coated with a thin chromium layer.

FIG. 59 illustrates porosity repelling in silicon coated with a thin chromium layer. The metal layer voltage, $V_{metal}$, was simply the electrolyte potential in this case. The anodization was conducted using an in-house etcher. FIG. 60 illustrate a photoelectrochemical etcher for porosity creation that may be used in various embodiments of the present technology.

Air Bearing Stiffness

Figure 61:
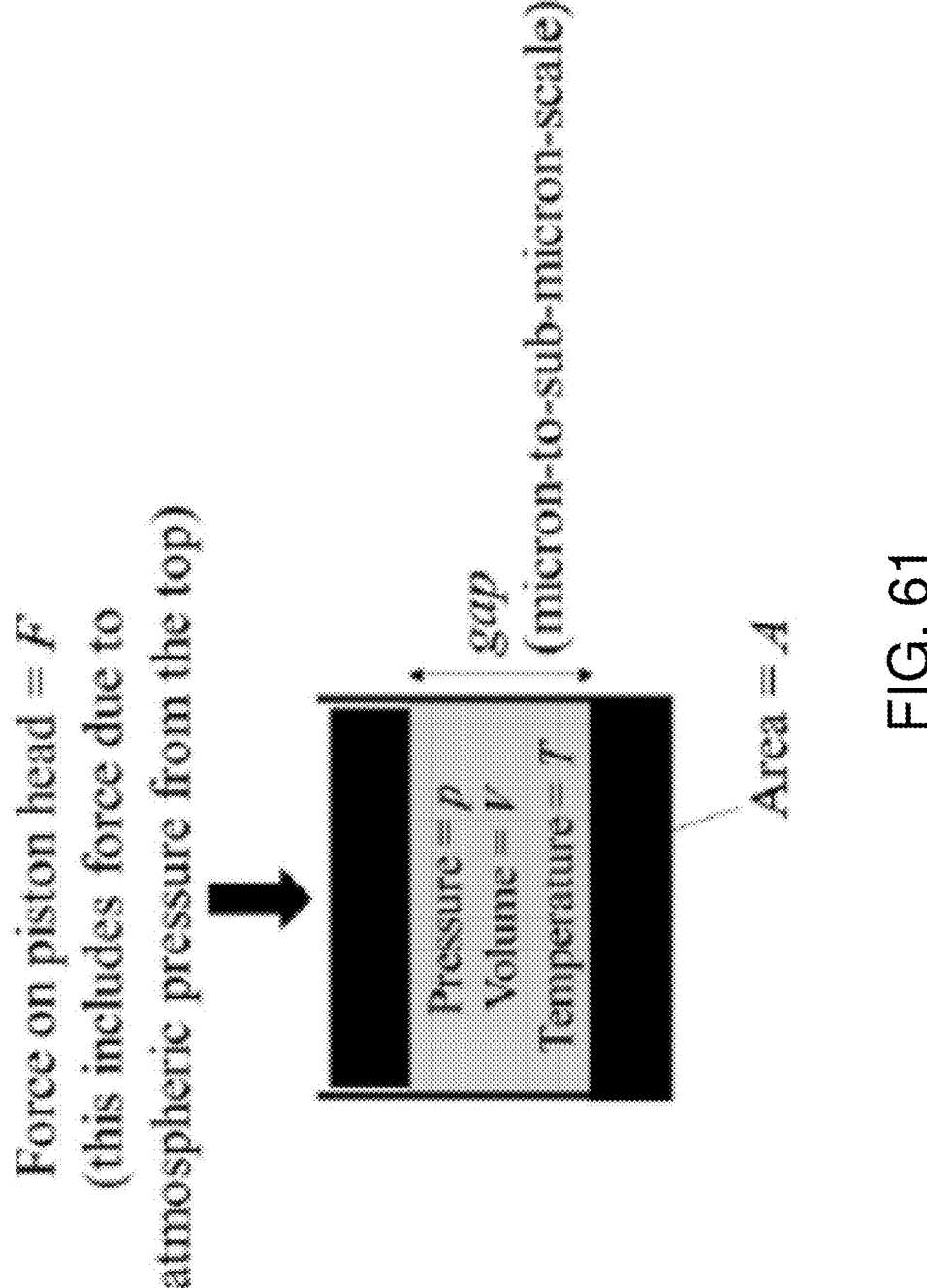
FIG. 61 illustrate an example of an air bearing for stiffness calculation in accordance with various embodiments of the present technology.

FIG. 61 illustrate an example of an air bearing 6100 for stiffness calculation in accordance with various embodiments of the present technology. The air bearing stiffness at a specific gap can be found using the ideal gas law for gases. FIG. 62 illustrates an example 6200 of an air bearing gap decreasing 10-fold. As an example, if the gap goes down from ~1 um to ~100 nm, the stiffness of the air bearing increases ~100 fold.

The PFB Chuck

Figure 63:
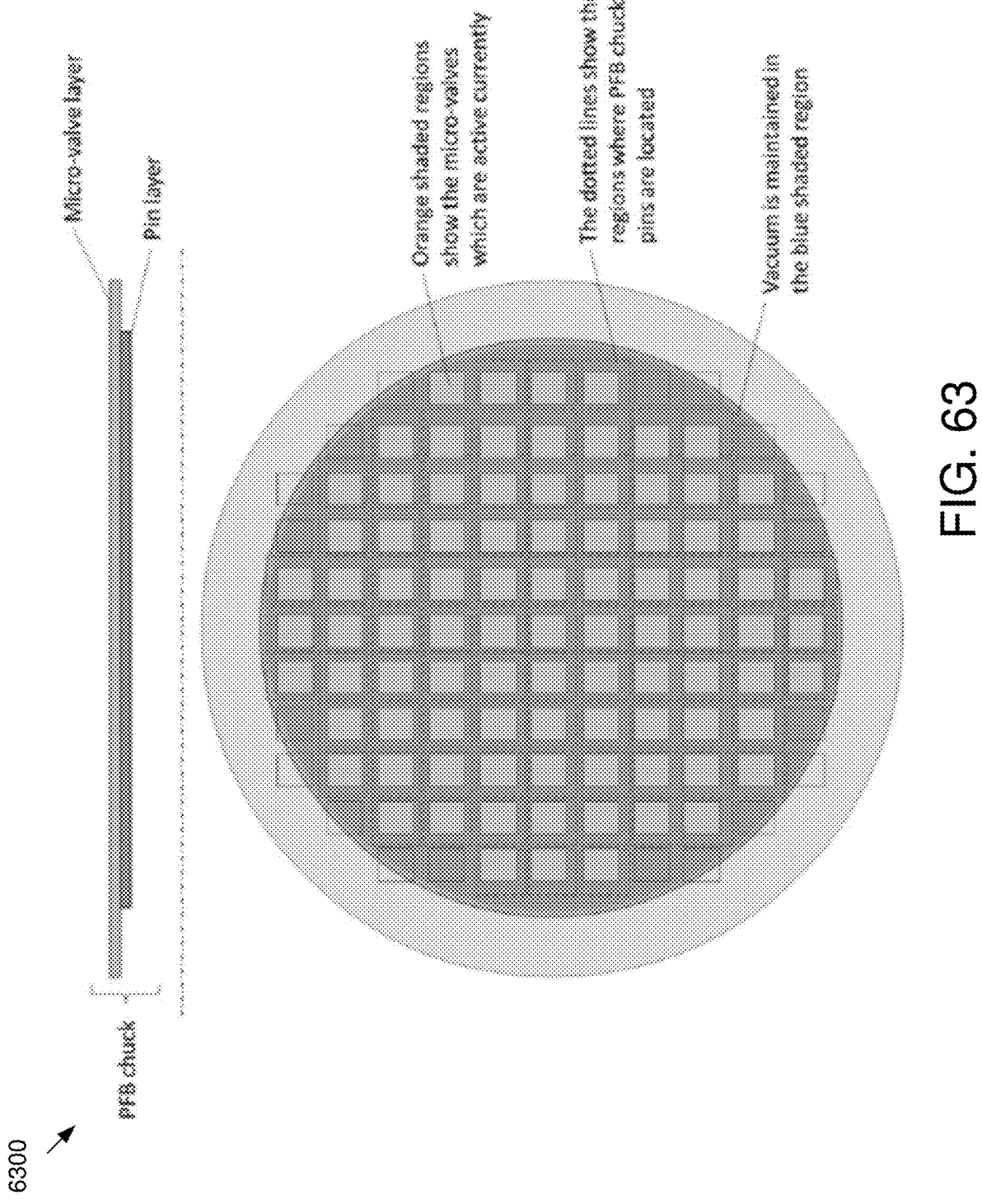
FIG. 63 illustrates an example of a PFB chuck showing separate micro-valve and pin layers.

PFB chuck pin distribution would have to change based on the dimensions of the PFBs. To avoid having to fabricate a new valve array for each new type of PFB, the valve array could reside in a separate layer, and be attached to the pin layer using vacuum suction. The pin layer would be fabricated for each specific PFB type and be attached to the valve layer using vacuum suction-based to allow rapid attachment and detachment of the two layers. For the design shown in the figure below, the pitch of the micro-valve array should be ~70% of the minimum PFB dimension (that is likely to be encountered). With this configuration, the micro-valve array should be able to control airflow in any arbitrary PFB form factor. FIG. 63 illustrates an example 6300 of a PFB chuck showing separate micro-valve and pin layers.

Super-Lithographic Dies Using N-MAP

Figure 64:
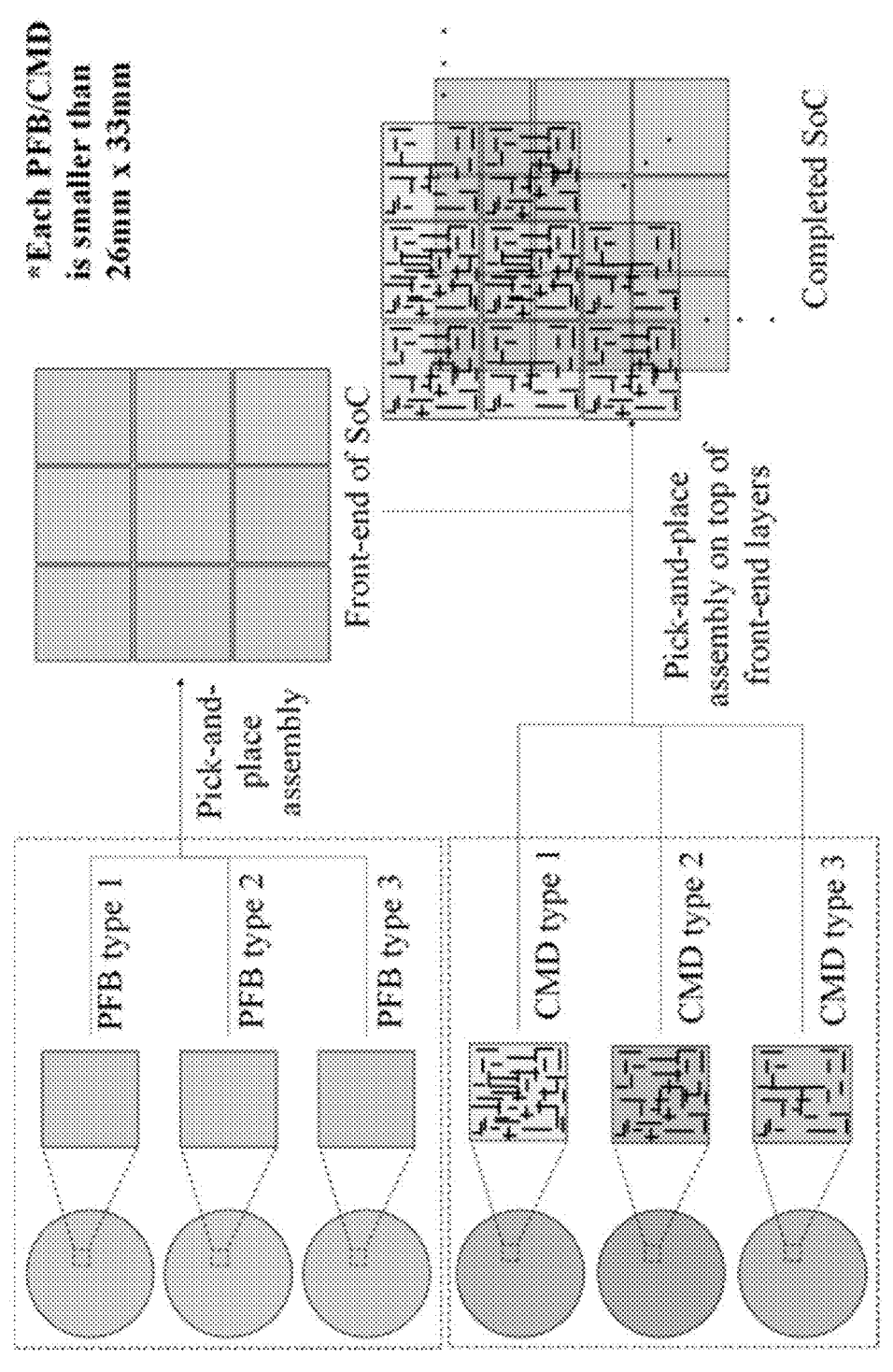
FIG. 64 illustrates example of super-lithographic dies using N-MAP in accordance with various embodiments of the present technology.

FIG. 64 illustrates example 6400 of super-lithographic dies using N-MAP in accordance with various embodiments of the present technology. More specifically, FIG. 64 shows an example of an approach in which PFBs, each smaller than 26 mm×33 mm in size, can be tessellated into super-lithographic form-factors, and linked using CMDs to form a super-lithographic system-on-chip (SoC).

Mini-FAB

Figure 65:
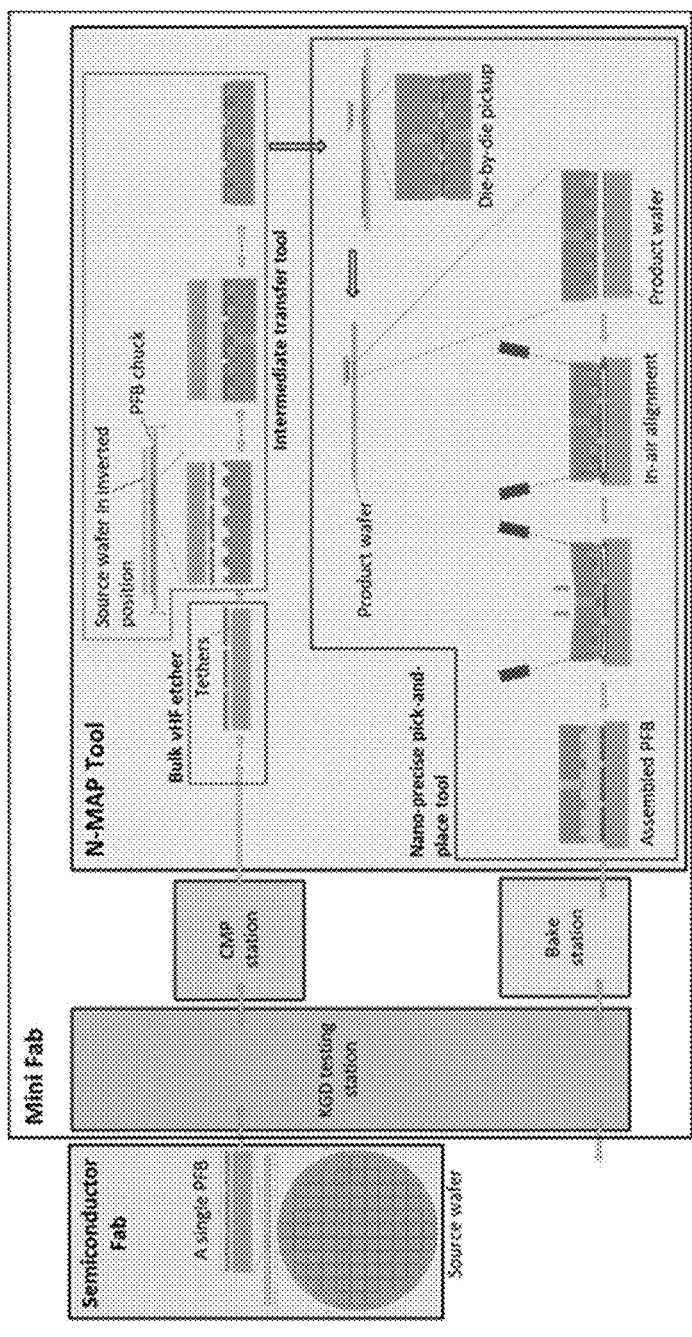
FIG. 65 is a block diagram illustrating various components of a mini-fab that may be used in some embodiments of the present technology.

FIG. 65 is a block diagram 6500 illustrating various components of a mini-fab that may be used in some embodiments of the present technology. The embodiments of the mini-fab illustrated in FIG. 65 can have a significantly smaller footprint and capital requirements than conventional large-scale fabs, and can be used in conjunction with large-scale fabs for fabrication of custom semiconductor devices by entities/companies which don't necessarily specialize in semiconductor fabrication. The mini-fab shown above contains the N-MAP tool, a die testing station and a few other auxiliary tools such as a CMP station and a bake station. Note that the bake station is to improve the bond quality after the bonding step in the nano-precise pick-and-place assembly tool. FIG. 65 also shows a PFB chuck in an inverted configuration. In this configuration, flipping of the PFB would not be required.

Exemplary Computer System Overview

Aspects and implementations of the design tool and/or fabrication system of the disclosure have been described in the general context of various steps and operations. A variety of these steps and operations may be performed by hardware components or may be embodied in computer-executable instructions, which may be used to cause a general-purpose or special-purpose processor (e.g., in a computer, server, or other computing device) programmed with the instructions to perform the steps or operations. For example, the steps or operations may be performed by a combination of hardware, software, and/or firmware.

Figure 66:
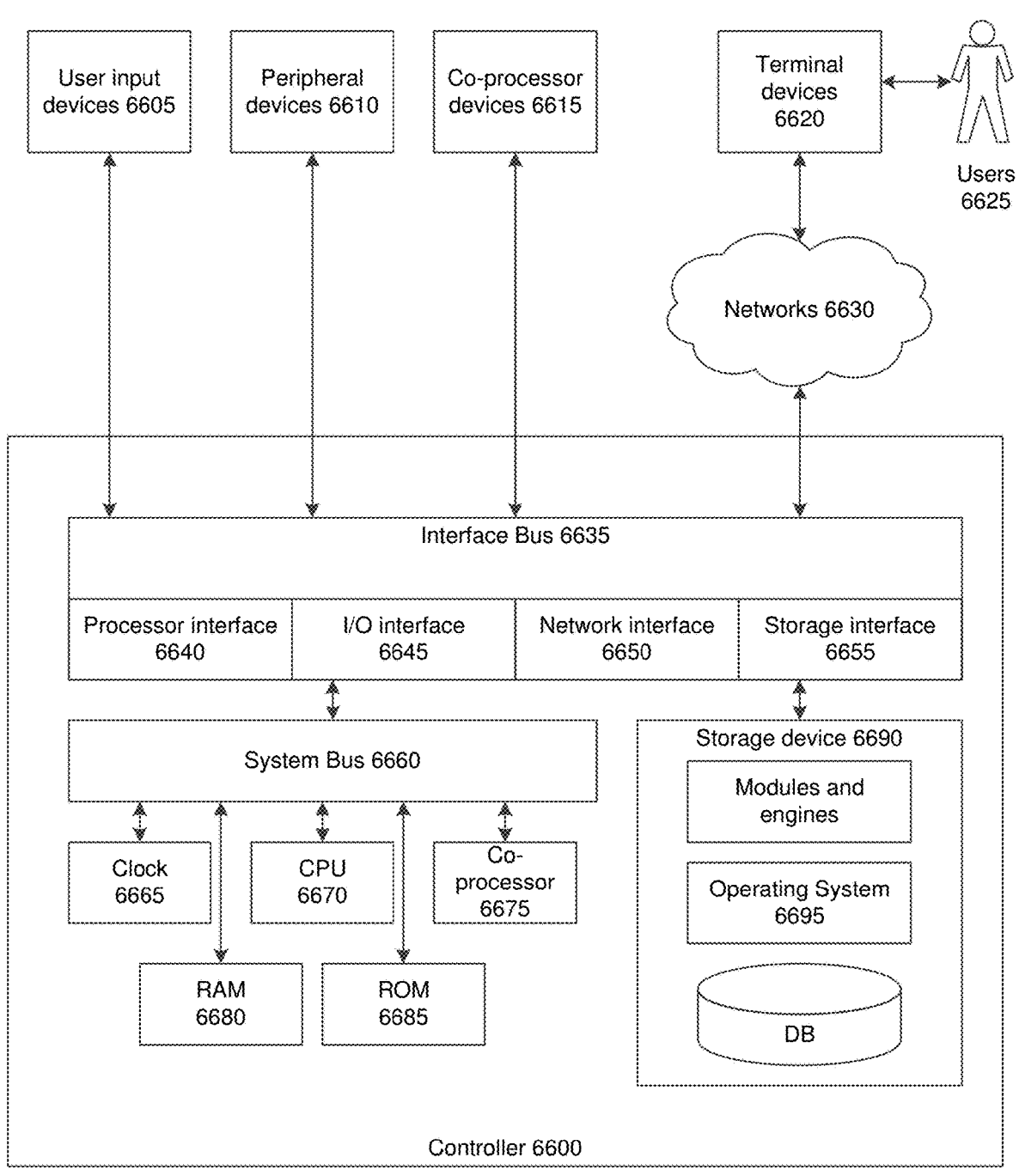
FIG. 66 is an example a computer system that may be used in some embodiments of the present technology.

FIG. 66 is a block diagram illustrating an example machine representing the computer systemization of the design tool and/or fabrication system. The design tool and/or fabrication system controller 6600 may be in communication with entities including one or more users 6625 client/terminal devices 6620, user input devices 6605, peripheral devices 6610, an optional co-processor device(s) (e.g., cryptographic processor devices) 6615, and networks 6630. Users may engage with the controller 6600 via terminal devices 6620 over networks 6630.

Computers may employ central processing unit (CPU) or processor to process information. Processors may include programmable general-purpose or special-purpose micro-processors, programmable controllers, application-specific integrated circuits (ASICs), programmable logic devices (PLDs), embedded components, combination of such devices and the like. Processors execute program components in response to user and/or system-generated requests. One or more of these components may be implemented in software, hardware or both hardware and software. Processors pass instructions (e.g., operational and data instructions) to enable various operations.

The controller 6600 may include clock 6665, CPU 6670, memory such as read only memory (ROM) 6685 and random access memory (RAM) 6680 and co-processor 6675 among others. These controller components may be connected to a system bus 6660, and through the system bus 6660 to an interface bus 6635. Further, user input devices 6605, peripheral devices 6610, co-processor devices 6615, and the like, may be connected through the interface bus 6635 to the system bus 6660. The interface bus 6635 may be connected to a number of interface adapters such as processor interface 6640, input output interfaces (I/O) 6645, network interfaces 6650, storage interfaces 6655, and the like.

Processor interface 6640 may facilitate communication between co-processor devices 6615 and co-processor 6675. In one implementation, processor interface 6640 may expedite encryption and decryption of requests or data. Input output interfaces (I/O) 6645 facilitate communication between user input devices 6605, peripheral devices 6610, co-processor devices 6615, and/or the like and components of the controller 6600 using protocols such as those for handling audio, data, video interface, wireless transceivers, or the like (e.g., Bluetooth, IEEE 1394a-b, serial, universal serial bus (USB), Digital Visual Interface (DVI), 802.11a/b/g/n/x, cellular, etc.). Network interfaces 6650 may be in communication with the network 6630. Through the network 6630, the controller 6600 may be accessible to remote terminal devices 6620. Network interfaces 6650 may use various wired and wireless connection protocols such as, direct connect, Ethernet, wireless connection such as IEEE 802.11a-x, and the like.

Examples of network 6630 include the Internet, Local Area Network (LAN), Metropolitan Area Network (MAN), a Wide Area Network (WAN), wireless network (e.g., using Wireless Application Protocol WAP), a secured custom connection, and the like. The network interfaces 6650 can include a firewall which can, in some aspects, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including, for example, the access and operation rights of an object by an individual, a machine, and/or an application, and the circumstances under which the permission rights stand. Other network security functions performed or included in the functions of the firewall, can be, for example, but are not limited to, intrusion-prevention, intrusion detection, next-generation firewall, personal firewall, etc., without deviating from the novel art of this disclosure.

Storage interfaces 6655 may be in communication with a number of storage devices such as, storage devices 6690, removable disc devices, and the like. The storage interfaces 6655 may use various connection protocols such as Serial Advanced Technology Attachment (SATA), IEEE 1394, Ethernet, Universal Serial Bus (USB), and the like.

User input devices 6605 and peripheral devices 6610 may be connected to I/O interface 6645 and potentially other interfaces, buses and/or components. User input devices 6605 may include card readers, finger print readers, joysticks, keyboards, microphones, mouse, remote controls, retina readers, touch screens, sensors, and/or the like. Peripheral devices 6610 may include antenna, audio devices (e.g., microphone, speakers, etc.), cameras, external processors, communication devices, radio frequency identifiers (RFIDs), scanners, printers, storage devices, transceivers, and/or the like. Co-processor devices 6615 may be connected to the controller 6600 through interface bus 6635, and may include microcontrollers, processors, interfaces or other devices.

Computer executable instructions and data may be stored in memory (e.g., registers, cache memory, random access memory, flash, etc.) which is accessible by processors. These stored instruction codes (e.g., programs) may engage the processor components, motherboard and/or other system components to perform desired operations. The controller 6600 may employ various forms of memory including on-chip CPU memory (e.g., registers), RAM 6680, ROM 6685, and storage devices 6690. Storage devices 6690 may employ any number of tangible, non-transitory storage devices or systems such as fixed or removable magnetic disk drive, an optical drive, solid state memory devices and other processor-readable storage media. Computer-executable instructions stored in the memory may include the design tool and/or fabrication platform having one or more program modules such as routines, programs, objects, components, data structures, and so on that perform particular tasks or implement particular abstract data types. For example, the memory may contain operating system (OS) component 6695, modules and other components, database tables, and the like. These modules/components may be stored and accessed from the storage devices, including from external storage devices accessible through an interface bus.

The database components can store programs executed by the processor to process the stored data. The database components may be implemented in the form of a database that is relational, scalable and secure. Examples of such database include DB2, MySQL, Oracle, Sybase, and the like. Alternatively, the database may be implemented using various standard data-structures, such as an array, hash, list, stack, structured text file (e.g., XML), table, and/or the like. Such data-structures may be stored in memory and/or in structured files.

The controller 6600 may be implemented in distributed computing environments, where tasks or modules are performed by remote processing devices, which are linked through a communications network, such as a Local Area Network ("LAN"), Wide Area Network ("WAN"), the Internet, and the like. In a distributed computing environment, program modules or subroutines may be located in both local and remote memory storage devices. Distributed computing may be employed to load balance and/or aggregate resources for processing. Alternatively, aspects of the controller 6600 may be distributed electronically over the Internet or over other networks (including wireless networks). Those skilled in the relevant art(s) will recognize that portions of the design tool and/or fabrication system may reside on a server computer, while corresponding portions reside on a client computer. Data structures and transmission of data particular to aspects of the controller 6600 are also encompassed within the scope of the disclosure.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for", but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

The invention claimed is:

1. A method for assembling die onto a product substrate, the method comprising;

selectively picking one or more die from a source wafer by a superstrate attached to said one or more die;

placing and bonding said selectively picked one or more die onto said product substrate with precision overlay, wherein said precision overlay is enabled by a volatile liquid deployed between said one or more die and said product substrate, wherein said volatile liquid comprises one of the following: isopropyl alcohol and water, wherein said precision overlay comprises a difference between a vector position of points on said one or more die and a vector position of corresponding points on said product substrate;

performing coarse alignment using stage actuators as said selectively picked one or more die are brought to said product substrate; and performing fine alignment after said one or more die are touching said volatile liquid deployed between said one or more die and said product substrate.

2. The method as recited in claim 1, wherein said one or more die comprise multiple die.

3. The method as recited in claim 1, wherein said selectively picking and said placing are performed in a massively parallel manner.

4. The method as recited in claim 1, wherein said assembling is performed to achieve one of the following: sub-100 nm, sub-25 nm overlay, sub-10 nm overlay and sub-5 nm overlay precision between said one or more die and said product substrate.

5. The method as recited in claim 1, wherein said precision overlay between said one or more die and said product substrate is achieved using a nanometer overlay metrology scheme.

6. The method as recited in claim 1, wherein said precision overlay between said one or more die and said product substrate is achieved using a moiré metrology scheme.

7. The method as recited in claim 1, wherein said precision overlay between said one or more die and said product substrate is achieved using an IR moiré metrology scheme.

8. The method as recited in claim 1 further comprising:

dispensing said volatile liquid between said one or more die and said product substrate near edges of said one or more die with air in regions between said one or more die and said product substrate not occupied by said volatile liquid;

wherein said dispensing of said volatile liquid and said air enables said precision overlay between said one or more die and said product substrate.

9. The method as recited in claim 8 further comprising:

subsequently making a first contact between said one or more die and said product substrate near a center of said one or more die; and subsequently expanding a region of contact to a full extent of said one or more die.

10. The method as recited in claim 1, wherein a topography of said one or more die is varied during said placement and bonding using said superstrate.

11. The method as recited in claim 10, wherein said superstrate comprises piezoelectric actuators to enable said topography variation.

12. The method as recited in claim 1, wherein said superstrate has one or more connected or unconnected sub-superstrates.

13. The method as recited in claim 1, wherein distortion control of said one or more die is utilized to enable said precision overlay.

14. The method as recited in claim 13, wherein said distortion control is enabled by thermal actuators.

15. The method as recited in claim 1, wherein said superstrate incorporates valves to activate vacuum holes on said superstrate to enable vacuum-based pickup and placement.

16. The method as recited in claim 15, wherein said activation of said vacuum holes is performed in an addressable manner.

17. The method as recited in claim 1, wherein a thickness of said one or more die is less than one of: 10 μm, 1 μm and 100 nm.

18. The method as recited in claim 1, wherein a surface activation of said one or more die is performed prior to said assembling to enable said assembling.

19. The method as recited in claim 1, wherein said bonding comprises one of the following: self-assembly, direct bonding, fusion bonding and hybrid bonding.

20. The method as recited in claim 1, wherein said source wafer is one of the following: a silicon wafer, a non-silicon wafer comprising GaN, GaAs, InP or SiC, and sapphire.

21. The method as recited in claim 1, wherein said source wafer incorporates a sacrificial layer.

22. The method as recited in claim 21, wherein said source wafer incorporated with said sacrificial layer is constructed from a substrate with two or more layers of differing doping levels and/or types.

23. The method as recited in claim 1 further comprising: testing said one or more die on said source wafer to identify known good dies for said assembling.

24. The method as recited in claim 23, wherein said testing determines known good dies by functionality and connectivity checks.

25. The method as recited in claim 24, wherein said functionality and connectivity checks are performed using one or more of the following: built-in self-test (BIST), scan-chain-based testing and stuck-at fault techniques.

26. The method as recited in claim 23, wherein said testing utilizes areas on an inside, periphery or outside of said one or more die.

27. The method as recited in claim 23, wherein goodness of said one or more die is inferred by testing select portions of said one or more die, and extrapolating using statistical models.

28. A method for assembling die onto a product substrate, the method comprising;
  selectively picking one or more die from a source wafer by a vacuum superstrate attached to said one or more die;
  placing said selectively picked one or more die onto said product substrate with precision overlay, wherein said precision overlay is enabled by a volatile liquid deployed between said one or more die and said product substrate;
  securely attaching said selectively picked one or more die onto said product substrate using direct bonding by holding onto said one or more die using said vacuum superstrate until said attachment occurs;
  performing coarse alignment using stage actuators as said selectively picked one or more die are brought to said product substrate; and
  performing fine alignment after said one or more die are touching said volatile liquid deployed between said one or more die and said product substrate.

29. The method as recited in claim 28, wherein said one or more die comprise multiple die.

30. The method as recited in claim 28, wherein said selectively picking and said placing are performed in a massively parallel manner.

31. The method as recited in claim 28, wherein said assembling is performed to achieve one of the following: sub-100 nm, sub-25 nm overlay, sub-10 nm overlay and sub-5 nm overlay precision between said one or more die and said product substrate.

32. The method as recited in claim 28, wherein said precision overlay between said one or more die and said product substrate is achieved using a nanometer overlay metrology scheme.

33. The method as recited in claim 28, wherein said precision overlay between said one or more die and said product substrate is achieved using a moiré metrology scheme.

34. The method as recited in claim 28, wherein said precision overlay between said one or more die and said product substrate is achieved using an IR moiré metrology scheme.

35. The method as recited in claim 28 further comprising:
  dispensing said volatile liquid between said one or more die and said product substrate near edges of said one or more die with air in regions between said one or more die and said product substrate not occupied by said volatile liquid;

wherein said dispensing of said volatile liquid and said air enables said precision overlay between said one or more die and said product substrate.

36. The method as recited in claim 35 further comprising:
  subsequently making a first contact between said one or more die and said product substrate near a center of said one or more die; and
  subsequently expanding a region of contact to a full extent of said one or more die.

37. The method as recited in claim 28, wherein a topography of said one or more die is varied during said placement and bonding using said vacuum superstrate.

38. The method as recited in claim 37, wherein said vacuum superstrate comprises piezoelectric actuators to enable said topography variation.

39. The method as recited in claim 28, wherein said vacuum superstrate has one or more connected or unconnected sub-superstrates.

40. The method as recited in claim 28, wherein distortion control of said one or more die is utilized to enable said precision overlay.

41. The method as recited in claim 40, wherein said distortion control is enabled by thermal actuators.

42. The method as recited in claim 28, wherein said vacuum superstrate incorporates valves to activate vacuum holes on said vacuum superstrate to enable vacuum-based pickup and placement.

43. The method as recited in claim 42, wherein said activation of said vacuum holes is performed in an addressable manner.

44. The method as recited in claim 28, wherein a thickness of said one or more die is less than one of the following: 10 μm, 1 μm and 100 nm.

45. The method as recited in claim 28, wherein a surface activation of said one or more die is performed prior to said assembling to enable said assembling.

46. The method as recited in claim 28, wherein said bonding comprises one of the following: self-assembly, direct bonding, fusion bonding and hybrid bonding.

47. The method as recited in claim 28, wherein said source wafer is one of the following: a silicon wafer, a non-silicon wafer comprising GaN, GaAs, InP or SiC, and sapphire.

48. The method as recited in claim 28, wherein said source wafer incorporates a sacrificial layer.

49. The method as recited in claim 48, wherein said source wafer incorporated with said sacrificial layer is constructed from a substrate with two or more layers of differing doping levels and/or types.

50. The method as recited in claim 28 further comprising:
  testing said one or more die on said source wafer to identify known good die for said assembling.

51. The method as recited in claim 50, wherein said testing determines known good die by functionality and connectivity checks.

52. The method as recited in claim 51, wherein said functionality and connectivity checks are performed using one or more of the following: built-in self-test (BIST), scan-chain-based testing and stuck-at fault techniques.

53. The method as recited in claim 50, wherein said testing utilizes areas on an inside, periphery or outside of said one or more die.

54. The method as recited in claim 50, wherein goodness of said one or more die is inferred by testing select portions of said one or more die, and extrapolating using statistical models.

* * * * *